United States Patent
Ozasa et al.

(10) Patent No.: US 7,656,422 B2
(45) Date of Patent: Feb. 2, 2010

(54) PULSE WIDTH MODULATON DEVICE AND IMAGE FORMING APPARATUS

(75) Inventors: Dan Ozasa, Kanagawa (JP); Naruhiro Masui, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 390 days.

(21) Appl. No.: 11/681,561

(22) Filed: Mar. 2, 2007

(65) Prior Publication Data

US 2007/0206234 A1 Sep. 6, 2007

(30) Foreign Application Priority Data

Mar. 6, 2006 (JP) ............................. 2006-059010

(51) Int. Cl.
*B41J 2/435* (2006.01)
*B41J 2/47* (2006.01)
*H03L 7/00* (2006.01)
*H03L 1/00* (2006.01)
*H04N 1/40* (2006.01)

(52) U.S. Cl. ............ 347/250; 331/16; 331/175; 347/235; 347/237; 358/471

(58) Field of Classification Search ............... 331/16, 331/175; 347/129, 235, 237, 239, 247, 248, 347/249, 250; 358/471
See application file for complete search history.

(56) References Cited

U.S. PATENT DOCUMENTS

| 2004/0032482 | A1* | 2/2004 | Ozasa et al. ............ 347/237 |
| 2004/0160509 | A1* | 8/2004 | Nihei et al. ............ 347/247 |
| 2005/0243163 | A1* | 11/2005 | Ozasa et al. ............ 347/243 |

FOREIGN PATENT DOCUMENTS

| JP | 2000-152001 | 5/2000 |
| JP | 2001-183600 | 7/2001 |
| JP | 2003-103830 | 4/2003 |
| JP | 2004-262101 | 9/2004 |
| WO | WO 2006/115282 | * 11/2006 |

OTHER PUBLICATIONS

Machine Translation of JP 2000-152001 to Bahramian et al.*

* cited by examiner

*Primary Examiner*—Benny Q Tieu
*Assistant Examiner*—Eric A Rust
(74) *Attorney, Agent, or Firm*—Oblon, Spivak, McClelland, Maier & Neustadt, L.L.P.

(57) ABSTRACT

A disclosed device for generating a pulse-width modulated signal according to image data and based on a pixel clock signal includes a pixel clock generating unit configured to generate the pixel clock signal and a modulated data generating unit configured to generate the pulse-width modulated signal. The pixel clock generating unit includes a multi-phase clock signal generating unit, a comparing unit, a frequency calculation unit, a counting unit, and a pixel clock signal output unit. The modulated data generating unit includes a data converting unit, an edge time calculation unit, and a pulse-width modulated signal output unit.

15 Claims, 48 Drawing Sheets

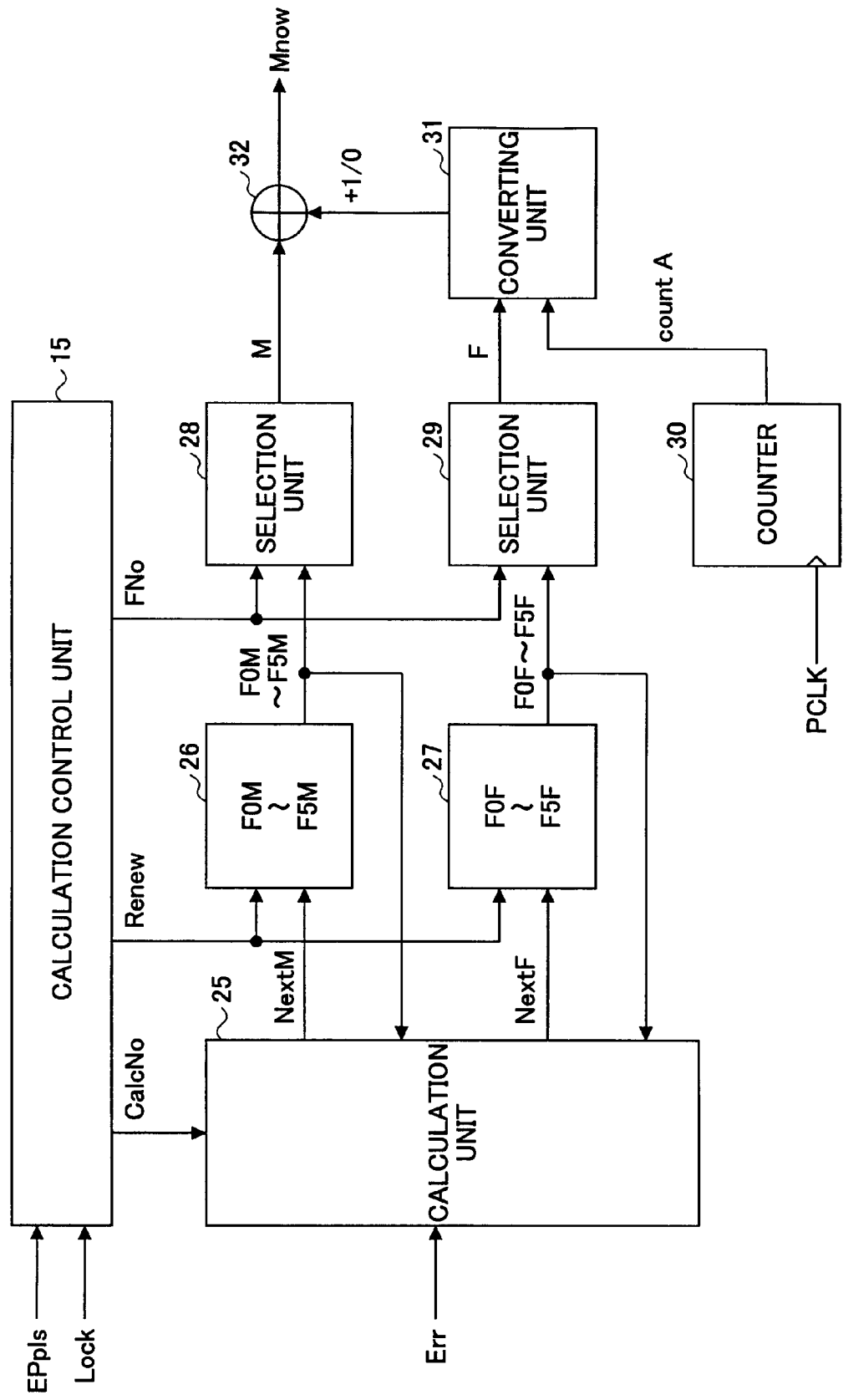

FIG.37

|    | Dfull | Dzero | Dph    | prev' | WPS             | WPR             | prevRST | prev |
|----|-------|-------|--------|-------|-----------------|-----------------|---------|------|
| S1 | H     | X     | X      | L     | setph           | –               | –       | H    |
| S2 | H     | X     | X      | H     | –               | –               | –       | H    |
| S3 | L     | H     | X      | L     | –               | –               | –       | L    |
| S4 | L     | H     | X      | H     | –               | –               | setph   | L    |
| S5 | L     | L     | LEFT   | L     | setph           | setph+Dpwm      | –       | L    |
| S6 | L     | L     | LEFT   | H     | –               | setph+Dpwm      | –       | L    |
| S7 | L     | L     | RIGHT  | L     | nextpos−Dpwm    | –               | –       | H    |
| S8 | L     | L     | RIGHT  | H     | nextpos−Dpwm    | –               | setph   | H    |
| S9 | L     | L     | MIDDLE | L     | centpos−Dpwm/2  | centpos+Dpwm/2  | –       | L    |
| S10| L     | L     | MIDDLE | H     | centpos−Dpwm/2  | centpos−Dpwm/2  | setph   | L    |

PULSE WIDTH MODULATON DEVICE AND IMAGE FORMING APPARATUS

BACKGROUND OF THE INVENTION

1. Field of the Invention

The present invention generally relates to a pulse width modulation device and an image forming device.

2. Description of the Related Art

FIG. 26 is a drawing illustrating an exemplary configuration of a conventional image forming apparatus such as a laser printer or a digital copier. As shown in FIG. 26, a laser beam emitted from a semiconductor laser unit 1009 is deflected by a rotating polygon mirror 1003, passes through a scanning lens 1002, and forms a light spot on a photoconductor 1001 that is a target object to be scanned, thereby exposing the photoconductor 1001 and forming an electrostatic latent image. A photodetector 1004 detects the scanning beam for each line.

A phase-locked loop 1006 receives a clock signal from a clock generating circuit 1005, generates a phase-synchronized image clock signal (pixel clock signal) for each line based on an output signal from the photodetector 1004, and supplies the generated image clock signal to an image processing unit 1007 and a laser driving circuit 1008. The laser driving circuit 1008 controls the light emitting time of the semiconductor laser unit 1009 according to image data generated by the image processing unit 1007 and the phase-synchronized image clock signal generated by the phase-locked loop 1006 for each line and thereby controls the formation of an electrostatic latent image on the photoconductor 1001.

In a scanning optical system as described above, variation in scanning speed leads to irregularity in an image and therefore degrades image quality. Especially, when forming a color image, variation in scanning speed causes misalignment of color dots in the main scanning direction and thereby causes color shift and reduces color reproducibility and image resolution. Therefore, to improve image quality, it is necessary to reduce the variation in scanning speed.

Major types of scanning speed variation (error in scanning speed) are described below.

(1) Error in Scanning Speed Relating to Reflecting Surfaces of Polygon Mirror

Error in scanning speed may be caused by difference in distance of the reflecting surfaces of a deflector such as a polygon mirror from the rotation shaft (decentering of the axis of a polygon mirror) and difference in precision of the reflecting surfaces. Error in scanning speed relating to the above causes occurs periodically every several scan lines (for example, the number of scan lines corresponding to the number of reflecting surfaces of a polygon mirror).

(2) Error in Average Scanning Speed

Average scanning speed is an average of scanning speeds of the reflecting surfaces of a polygon mirror. Error in average scanning speed is caused by, for example, variation in rotational speed of a polygon mirror and various changes in a scanning optical system caused by environmental changes in temperature, humidity, vibration, and so on. Also, error in average scanning speed may be caused by chromatic aberration in a scanning optical system that occurs when the oscillation wavelength of a semiconductor laser, or a light source, changes because of, for example, temperature change. Error in average scanning speed is moderate compared to other types.

(3) Error in Scanning Speed Relating to Light Source

This type of scanning speed error occurs in a multi-beam optical system including multiple light sources, for example, a semiconductor laser array, where multiple light beams are scanned by the same scanning optical system. Such scanning speed error occurs because of chromatic aberration in a scanning optical system that is caused by different oscillation wavelengths of the light sources. Also, this type of scanning speed error may be caused by inaccurate assembly of multiple light sources. Meanwhile, the scanning speed error as described in (2) may also vary depending on the light source, since the degree of change in oscillation wavelength differs depending on the light source.

(4) Error in Scanning Speed Relating to Scanning Optical System

In an image forming apparatus including multiple photoconductors and scanning optical systems and configured to form a color image, the difference in scanning speeds of the scanning optical systems greatly affects the image quality. The difference in scanning speeds of scanning optical systems may be caused by inaccurate production and assembly of parts in the scanning optical systems and deformation of the parts over time. Also, because of different characteristics of the light sources in the scanning optical systems, scanning speed error as described in (3) may also occur. In this case, scanning speed error as described in (1) and (2) occurs in each of the scanning optical systems and the average scanning speed of the scanning optical systems also fluctuates. There is an image forming apparatus in which some units such as a polygon mirror are shared by multiple scanning optical systems as common units. Even in this case, since the paths of light beams from the light sources to the photoconductors are different, scanning speed error as described in (4) may also occur.

Patent document 1 discloses a method of correcting the error in scanning speed by changing the frequency of a pixel clock signal depending on the scanning speed. In the disclosed method, the frequency of an oscillator for generating a pixel clock signal is controlled (phase-locked-loop (PLL) controlled) so that the count of cycles of the pixel clock signal between the start and end of scanning becomes a specified value.

However, the disclosed method has a disadvantage as described below. In the disclosed method, the frequency of the reference clock signal used for phase comparison corresponds to one scan line and is therefore far lower than (one in several thousands to one in tens of thousands) that of the pixel clock to be generated. Therefore, it is difficult to achieve enough open loop gain of the PLL and to accurately control the frequency of the pixel clock signal. Also, since the frequency of the pixel clock signal is easily affected by disturbance, it is difficult to accurately generate a pixel clock signal. Further, to reduce the difference in scanning speed of the reflecting surfaces of a polygon mirror using the disclosed method, it is necessary to change the control voltage for a voltage-controlled oscillator (VCO) for each scan. With such a method, it takes a long time for the clock frequency to become stable and therefore it takes a long time to generate a pixel clock signal.

Patent document 2 discloses a method of correcting the error in scanning speed by controlling the phase of a pixel clock signal based on a generated high frequency clock signal. In the method disclosed in patent document 2, the phase of a pixel clock signal is controlled so that the count of cycles of the high frequency clock signal between the start and end of scanning becomes a specified value. The high frequency clock signal is accurately generated based on an accurate reference clock signal from, for example, a crystal oscillator. Using such an accurate high frequency clock signal for the phase control of a pixel clock signal makes it possible to accurately generate the pixel clock signal.

However, to correct the error in scanning speed by controlling the phase of a pixel clock signal, it is necessary to generate phase control data for one scan line. Also, to reduce local deviation caused by the phase change of the pixel clock signal and thereby to accurately generate the pixel clock, it is necessary to perform high-resolution phase control. Accordingly, the size of the phase control data becomes large and it is difficult to accurately generate such a large amount of phase control data at high speed. Also, to reduce the difference in scanning speeds of the reflecting surfaces of a polygon mirror using the disclosed method, it is necessary to generate the phase control data for each reflecting surface. Therefore, in this case, the amount of phase control data increases further and it is very difficult to accurately generate such a huge amount of phase control data at high speed. Further, inaccurate production and assembly of parts in a scanning optical system may cause the scanning speed to fluctuate even during the scanning of a line.

(5) Nonlinear Error in Scanning Speed

FIG. 27A is a graph showing exemplary nonlinear error in scanning speed during the scanning of a line. In FIG. 27A, the horizontal axis x shows positions X in a scan line and the vertical axis shows scanning speeds V (X) at the positions X. Also, a one-dot broken line Vavg shows the average scanning speed during the scanning of a line. When the scanning speed fluctuates as shown in FIG. 27A, deviations Δ from a desired value, which is a value when the scanning speed is constant, become as shown by the solid line in FIG. 27B. The deviations Δ indicate misalignment of dots and cause degradation of image quality. In FIG. 27B, the dotted line shows the deviations Δ when the line is scanned in a direction from the position X2 to the position X1. As shown in FIGS. 27A and 27B, when scanning is performed in both directions in a scanning optical system that causes asymmetrical misalignment of dots with respect to the center of scanning, color shift increases and image quality is greatly degraded. Also, the degree and distribution of the deviations Δ may vary depending on the preciseness of each reflecting surface of a polygon mirror. Further, the degree and distribution of the deviations Δ may vary depending on a scanning optical system.

Patent document 3 discloses a method of reducing the nonlinear error in scanning speed by modulating the frequency of a pixel clock signal according to the position in a scan line. However, since the method disclosed in patent document 3 uses a conventional method for generating the center frequency of a pixel clock signal, as described above, it is difficult to generate an accurate pixel clock signal and to effectively correct the error in scanning speed. Thus, the method disclosed in patent document 3 is not sufficient to improve image quality.

[Patent document 1] Japanese Patent Application Publication No. 2001-183600

[Patent document 2] Japanese Patent Application Publication No. 2004-262101

[Patent document 3] Japanese Patent Application Publication No. 2000-152001

SUMMARY OF THE INVENTION

The present invention provides a pulse width modulation device and an image forming device that substantially obviate one or more problems caused by the limitations and disadvantages of the related art.

Embodiments of the present invention provide a pulse width modulation device configured to generate a pixel clock signal that can effectively correct the error and nonlinear error in scanning speed caused by various factors and to perform pulse width modulation at high resolution and with high halftone reproducibility, and an image forming apparatus including the pulse width modulation device.

According to an embodiment of the present invention, a device for generating a pulse-width modulated signal according to image data and based on a pixel clock signal includes a pixel clock generating unit that is configured to generate the pixel clock signal and a modulated data generating unit that is configured to generate the pulse-width modulated signal. The pixel clock generating unit includes a multi-phase clock signal generating unit configured to generate multi-phase clock signals each having a cycle T, wherein a number of the multi-phase clock signals is P and a phase difference between each adjacent pair of the multi-phase clock signals is T/P; a comparing unit configured to measure a period of time between a time when a first synchronizing signal is detected and a time when a second synchronizing signal is detected, to compare the measured period of time with a target value, and to output a difference between the measured period of time and the target value; a frequency calculation unit configured to calculate a pixel clock frequency setting value based on the difference between the measured period of time and the target value and to generate a frequency specifying signal based on the calculated pixel clock frequency setting value which frequency specifying signal specifies a frequency of the pixel clock signal; a counting unit configured to calculate a rise timing and a fall timing of the pixel clock signal by counting a number of time units each corresponding to the phase difference T/P according to the frequency specifying signal; and a pixel clock signal output unit configured to generate the pixel clock signal according to the rise timing and the fall timing of the pixel clock signal and based on the multi-phase clock signals. The modulated data generating unit includes a data converting unit configured to convert density data specifying density of a dot in the image data into pulse width data expressed in units of the phase difference T/P according to one of conversion rules predetermined based on the frequency of the pixel clock signal; an edge time calculation unit configured to calculate a rise timing and a fall timing of the pulse-width modulated signal according to the pulse width data and the rise timing of the pixel clock signal; and a pulse-width modulated signal output unit configured to generate the pulse-width modulated signal according to the rise timing and the fall timing of the pulse-width modulated signal and based on the multi-phase clock signals.

According to another embodiment of the present invention, an image forming apparatus that forms an image by driving a light source with a pulse-width modulated signal and by scanning a target object with a light beam emitted from the light source driven with the pulse-width modulated signal includes a pulse width modulation device that is configured to generate the pulse-width modulated signal according to image data. The pulse width modulation device includes a multi-phase clock signal generating unit configured to generate multi-phase clock signals each having a cycle T, wherein a number of the multi-phase clock signals is P and a phase difference between each adjacent pair of the multi-phase clock signals is T/P; a comparing unit configured to measure a period of time between a time when a first synchronizing signal is detected and a time when a second synchronizing signal is detected, to compare the measured period of time with a target value, and to output a difference between the measured period of time and the target value; a frequency calculation unit configured to calculate a pixel clock frequency setting value based on the difference between the measured period of time and the target value and to generate a frequency specifying signal based on the calculated pixel clock frequency setting value which frequency specifying signal specifies a frequency of a pixel clock signal; a counting unit configured to calculate a rise timing and a fall timing of the pixel clock signal by counting a number of time units each corresponding to the phase difference T/P according to the frequency specifying signal; a data converting unit configured to convert density data specifying density of a dot in the image data into pulse width data expressed in units of the phase difference T/P according to one of conversion rules predetermined based on the frequency of the pixel clock signal; an edge time calculation unit configured to calculate a rise timing and a fall timing of the pulse-width modulated signal according to the pulse width data and the rise timing of the pixel clock signal; a set/reset signal generating unit configured to generate a set signal, a reset signal, a set phase signal, and a reset phase signal according to the rise timing and the fall timing of the pulse-width modulated signal; and a modulated data output unit configured to generate the pulse-width modulated signal according to the set signal, the reset signal, the set phase signal, and the reset phase signal and based on the multi-phase clock signals.

According to still another embodiment of the present invention, an image forming apparatus that forms an image by driving a light source with a pulse-width modulated signal and by scanning a target object with a light beam emitted from the light source driven with the pulse-width modulated signal includes a pulse width modulation device that is configured to generate the pulse-width modulated signal according to image data. The pulse width modulation device includes a multi-phase clock signal generating unit configured to generate multi-phase clock signals each having a cycle T, wherein a number of the multi-phase clock signals is P and a phase difference between each adjacent pair of the multi-phase clock signals is T/P; a comparing unit configured to measure a period of time between a time when a first synchronizing signal is detected and a time when a second synchronizing signal is detected, to compare the measured period of time with a target value, and to output a difference between the measured period of time and the target value; a frequency calculation unit configured to calculate a pixel clock frequency setting value based on the difference between the measured period of time and the target value; a frequency modulation data generating unit configured to generate frequency modulation data indicating a difference from the pixel clock frequency setting value for each of segments of the period of time between the time when the first synchronizing signal is detected and the time when the second synchronizing signal is detected; a frequency modulation unit configured to add the pixel clock frequency setting value and the frequency modulation data and to generate a frequency specifying signal based on a result of the addition which frequency specifying signal specifies a frequency of a pixel clock signal; a counting unit configured to calculate a rise timing and a fall timing of the pixel clock signal by counting a number of time units each corresponding to the phase difference T/P according to the frequency specifying signal; a data converting unit configured to convert density data specifying density of a dot in the image data into pulse width data expressed in units of the phase difference T/P according to one of conversion rules predetermined based on the frequency of the pixel clock signal; a data correction unit configured to correct the pulse width data according to the frequency modulation data; an edge time calculation unit configured to calculate a rise timing and a fall timing of the pulse-width modulated signal according to the rise timing of the pixel clock signal and the pulse width data corrected by the data correction unit; a set/reset signal generating unit configured to generate a set signal, a reset signal, a set phase signal, and a reset phase signal according to the rise timing and the fall timing of the pulse-width modulated signal; and a modulated data output unit configured to generate the pulse-width modulated signal according to the set signal, the reset signal, the set phase signal, and the reset phase signal and based on the multi-phase clock signals.

BRIEF DESCRIPTION OF THE DRAWINGS

FIG. 8 is a block diagram illustrating another exemplary configuration of the exemplary frequency calculation unit;

FIG. 37 is a table used to describe exemplary calculations performed by an exemplary edge time calculation unit;

DESCRIPTION OF THE PREFERRED EMBODIMENTS

Preferred embodiments of the present invention are described below with reference to the accompanying drawings.

An embodiment of the present invention that makes it possible to correct the error in scanning speed as mentioned above in (1) through (4) is described below.

First Embodiment

Figure 1:
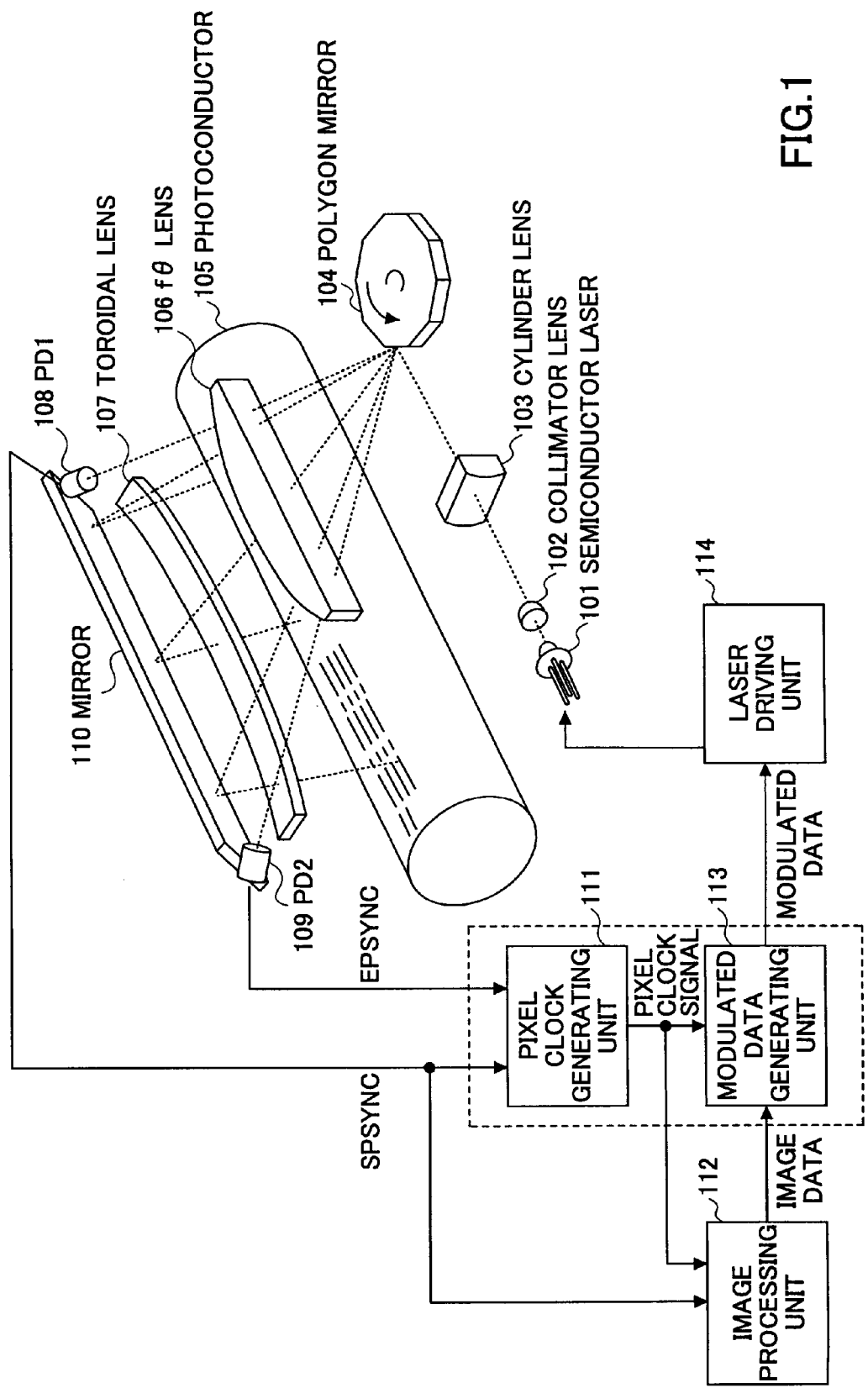
FIG. 1 is a drawing illustrating an exemplary configuration of an image forming apparatus according to a first embodiment of the present invention.

FIG. 1 is a drawing illustrating an exemplary configuration of an image forming apparatus according to a first embodiment of the present invention. In the exemplary image forming apparatus shown in FIG. 1, a laser beam emitted from a semiconductor laser 101 used as a light source is shaped by a collimator lens 102 and a cylinder lens 103 and then deflected by a polygon mirror 104 used as a deflector so as to periodically scan a photoconductor 105. More specifically, the deflected laser beam reaches the photoconductor 105 via an fθ lens 106, a mirror 110, and a toroidal lens 107 and forms a light spot on the photoconductor 105. An image (electrostatic latent image) is thereby formed on the photoconductor 105 according to the output from the semiconductor laser 101.

A photodetector PD1 (108) and a photodetector PD2 (109) are provided on the corresponding ends of the mirror 110. The photodetectors PD1 and PD2 detect the start and end of scanning, respectively. More specifically, a laser beam deflected by the polygon mirror 104 enters photodetector PD1 before scanning a line on the photoconductor 105 and enters the photodetector PD2 after scanning the line. The photodetectors PD1 and PD2 convert the entering laser beam into a first synchronizing signal SPSYNC and a second synchronizing signal EPSYNC, respectively, and send the first and second synchronizing signals SPSYNC and EPSYNC to a pixel clock signal generating unit 111. The pixel clock signal generating unit 111 calculates the period of time needed to scan the line between the photodetectors PD1 and PD2 based on the first and second synchronizing signals SPSYNC and EPSYNC, generates a pixel clock signal PCLK with a frequency that is determined so that a specific number of cycles occur during the calculated period of time, and supplies the pixel clock signal PCLK to an image processing unit 112 and a modulated data generating unit 113. An exemplary configuration of the pixel clock signal generating unit 111 is described later. The first synchronizing signal SPSYNC output from the photodetector PD1 is also supplied to the image processing unit 112 as a line synchronizing signal. The image processing unit 112 generates image data in synchronization with the pixel clock signal PCLK. The modulated data generating unit 113 generates modulated data from the image data based on the pixel clock signal PCLK and thereby causes a laser driving unit 114 to drive the semiconductor laser 101.

An exemplary configuration and operation of the pixel clock signal generating unit 111 in the exemplary image forming apparatus are described below.

Figure 2:
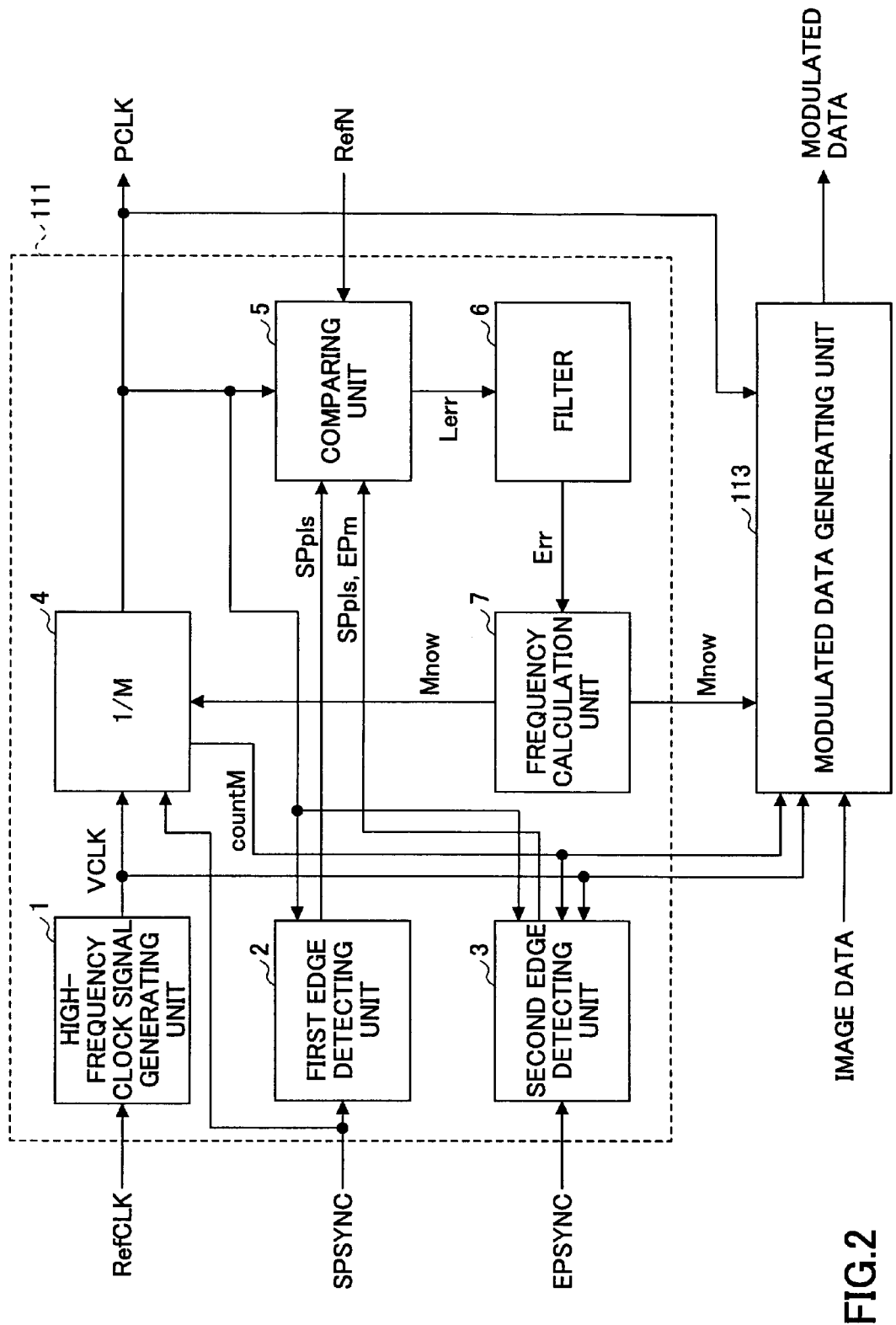
FIG. 2 is a block diagram illustrating a first exemplary configuration of a pixel clock signal generating unit.

FIG. 2 is a block diagram illustrating a first exemplary configuration of a pixel clock signal generating unit. A high-frequency clock signal generating unit 1 of the pixel clock signal generating unit 111 shown in FIG. 2 is made of a phase locked loop (PLL) circuit and configured to generate a high-frequency clock signal VCLK by multiplying the frequency of a reference clock signal RefCLK. To generate the high-frequency clock signal VCLK with high accuracy, the reference clock signal RefCLK is preferably generated by, for example, a high-precision crystal oscillator. The pixel clock signal PCLK is gererated based on the high-frequency clock signal VCLK. A frequency divider 4 generates the pixel clock signal PCLK with a frequency obtained by dividing the frequency of the high-frequency clock signal VCLK into M parts. The frequency divider 4 is made of, for example, an M-decimal counter and outputs a count M. In this case, when the frequency divider 4 is configured to start counting at the rise of the first synchronizing signal SPSYNC, a pixel clock signal phase-locked to scanning start time can be generated. The frequency dividing ratio M of the frequency divider 4 is changed according to a pixel clock frequency specifying signal Mnow from a frequency calculation unit 7. Since the pixel clock signal PCLK is generated, as described above, by dividing the frequency of the high-frequency clock signal VCLK that oscillates stably and accurately, the pixel clock frequency can be instantaneously and stably changed by changing the frequency dividing ratio M. This, in turn, makes it possible for the pixel clock signal generating unit 111 to quickly respond even when the frequency of the pixel clock signal PCLK is changed line by line.

A first edge detecting unit 2 detects a rising edge of the first synchronizing signal SPSYNC based on the high-frequency clock signal VCLK and, when the rising edge is detected, outputs a detection pulse SPpls synchronized with the pixel clock signal PCLK.

A second edge detecting unit 3 detects a rising edge of the second synchronizing signal EPSYNC based on the high-frequency clock signal VCLK and outputs a detection pulse EPpls and a count EPm.

A comparing unit 5 obtains line scanning time Tline elapsed between the first and second synchronizing signals SPSYNC and EPSYNC, calculates the difference between the line scanning time Tline and reference time predetermined according to the writing frequency and the distance between the photodetectors PD1 and PD2, and outputs the difference as line error Lerr of the scan line. In other words, error in scanning speed is obtained as the difference between desired scanning time (reference time) and the actual line scanning time Tline.

The line scanning time Tline may be counted based on the high frequency clock signal VCLK. However, since the high-frequency clock signal VCLK has a very high frequency, the number of bits used for the counting becomes very large. Therefore, calculating the line scanning time Tline based on the high frequency clock signal VCLK has a disadvantage in terms of circuit size and power consumption. In this embodiment, the line scanning time Tline is counted based on the pixel clock signal PCLK and compared with a reference value RefN to obtain the line error Lerr that is based on the high-frequency clock signal.

A filter 6 is a digital filter configured to filter the line error Lerr and outputs error data Err. For example, the filter 6 averages latest line errors Lerr of multiple scan lines and thereby obtains the error data Err.

The frequency calculation unit 7 calculates an appropriate pixel clock frequency based on the error data Err and outputs the calculated pixel clock frequency as the pixel clock frequency specifying signal Mnow. When a high-frequency clock cycle is Tv, a pixel clock cycle is Tp, and Tp=KTv (K is a pixel clock frequency setting value), the error data Err is the difference between Tp and a target value Tp' (=K'Tv). In other words, RefN·Tp'=RefN·Tp+Err·Tv is true. Therefore, a target pixel clock frequency can be calculated with K' obtained by the following formula (1):

$$K'=K+Err/RefN \quad (1)$$

Thus, digital PLL control is performed by the frequency divider 4, the comparing unit 5, the filter 6, and the frequency calculation unit 7. The characteristics of the filter 6 determine the characteristics of the PLL control. In other words, the characteristics of the filter 6 are determined so that the control system operates stably. Also, the value K' can be obtained by a formula $K'=K+\alpha \cdot Err/RefN$ so as to change the loop gain.

The frequency dividing ratio M of the frequency divider 4 is a positive integer. Therefore, to reduce the rounding error and thereby to obtain an accurate pixel clock signal, it is preferable to convert the pixel clock frequency setting value K into the pixel clock frequency specifying signal Mnow as described below. For example, when a value obtained by rounding off the pixel clock frequency setting value K is used as the frequency dividing ratio M and Mnow is set to the obtained frequency dividing ratio M (Mnow=M), the rounding error can be reduced by setting Mnow to M+1 (Mnow=M+1) or to M−1 (Mnow=M−1) once in C cycles (K=M±1/C) of the pixel clock signal. With this method, the rounding error can be evenly distributed and therefore local deviation of the pixel clock signal can be reduced. In this method, the frequency dividing ratio M and the number of cycles C are varied to control the pixel clock signal. This process is described in more detail later.

Figure 3:
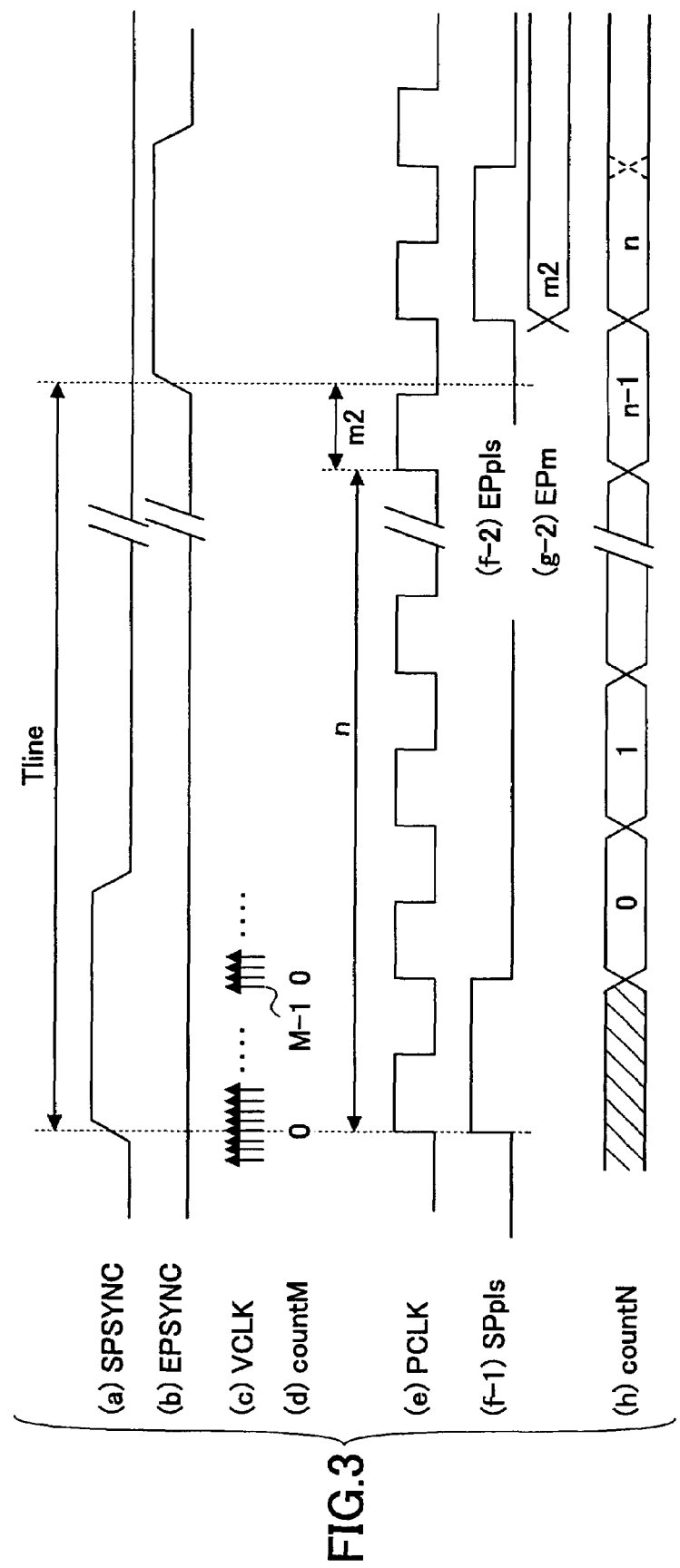
FIG. 3 is a timing chart of exemplary signals in the exemplary pixel clock signal generating unit shown in FIG. 2.
Figure 4:
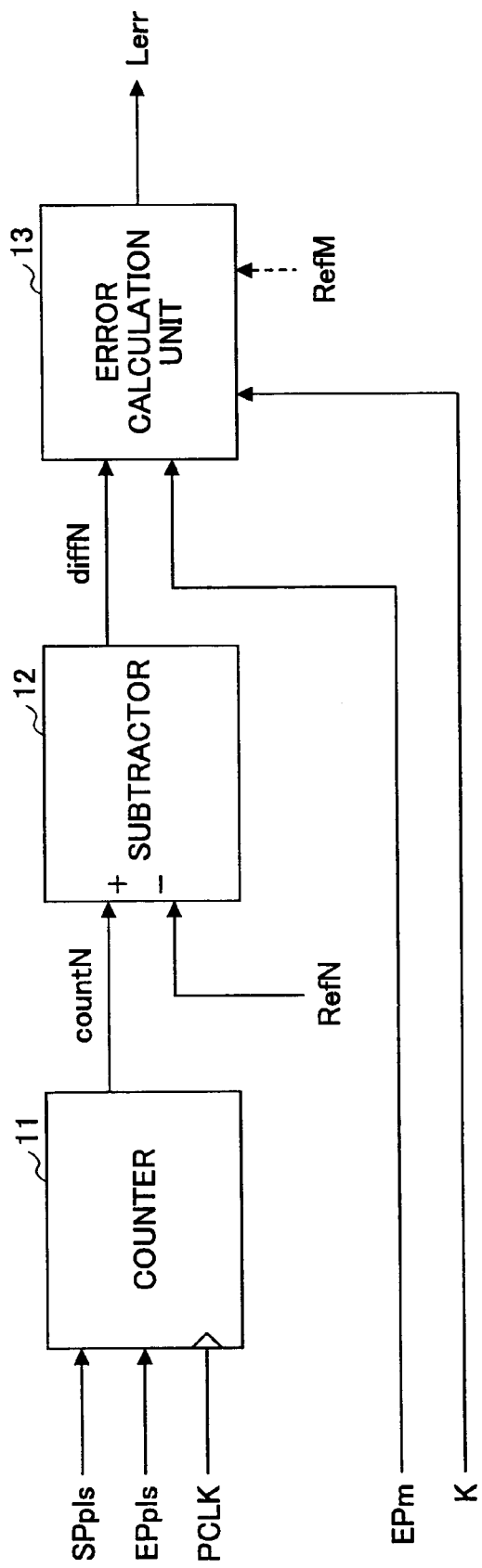
FIG. 4 is a block diagram illustrating an exemplary configuration of an exemplary comparing unit.

FIG. 3 is a timing chart of exemplary signals in the pixel clock signal generating unit 111 shown in FIG. 2. FIG. 4 is a block diagram illustrating an exemplary configuration of the comparing unit 5. The exemplary operation of the comparing unit 5 is described below with reference to FIGS. 3 and 4.

In FIG. 3, (a) SPSYNC shows the first synchronizing signal SPSYNC that indicates the start of scanning and is supplied to the first edge detecting unit 2. (b) EPSYNC shows the first synchronizing signal EPSYNC that indicates the end of scanning and is supplied to the second edge detecting unit 3. (c) VCLK shows the rising edges of the high-frequency clock signal VCLK generated by the high-frequency clock generating unit 1. (d) countM shows the count M counted by the frequency divider 4 based on the frequency clock VCLK and (e) PCLK shows a pixel clock signal that rises when (d) countM is 0. (f-1) SPpls and (f-2) EPpls show the detection pulse SPpls and the detection pulse EPpls that indicate the rise of (a) SPSYNC and (b) EPSYNC, respectively, and are synchronized with (e) PCLK. (g-2) EPm is the value of (d) countM at the rising edge of (b) EPSYNC. (h) countN the value of a counter in the comparing unit 5 that counts based on the pixel clock signal PCLK. The counter is reset to 0 by (f-1) SPpls and stopped by (f-2) EPpls.

In the comparing unit 5 shown in FIG. 4, a counter 11 counts the cycles of the pixel clock signal PCLK. The counter 11 is reset to 0 by the detection pulse SPpls and stopped by the detection pulse EPpls. A subtractor 12 subtracts the reference value RefN from the value countN of the counter 11 at the time when the counting is stopped and outputs the result diffN. A error calculation unit 13 performs a calculation expressed by the formula Lerr=diffN·K+EPm and outputs the line error Lerr that is based on the high-frequency clock cycle Tv.

In the above formula, diffN=n−RefN, EPm=m2, Tp=K·Tv, and Tp is the pixel clock cycle.

When the distance between the photodetectors PD1 and PD2 is not an integral multiple of the dot width, in other words, when the reference time is not an integral multiple of a target pixel clock cycle, the pixel clock frequency can be more accurately controlled by converting the fraction into the number of cycles RefM of the high-frequency clock signal VCLK and calculating the line error Lerr by the formula Lerr=diffN·K+EPm−RefM in the error calculation unit 13.

Figure 5:
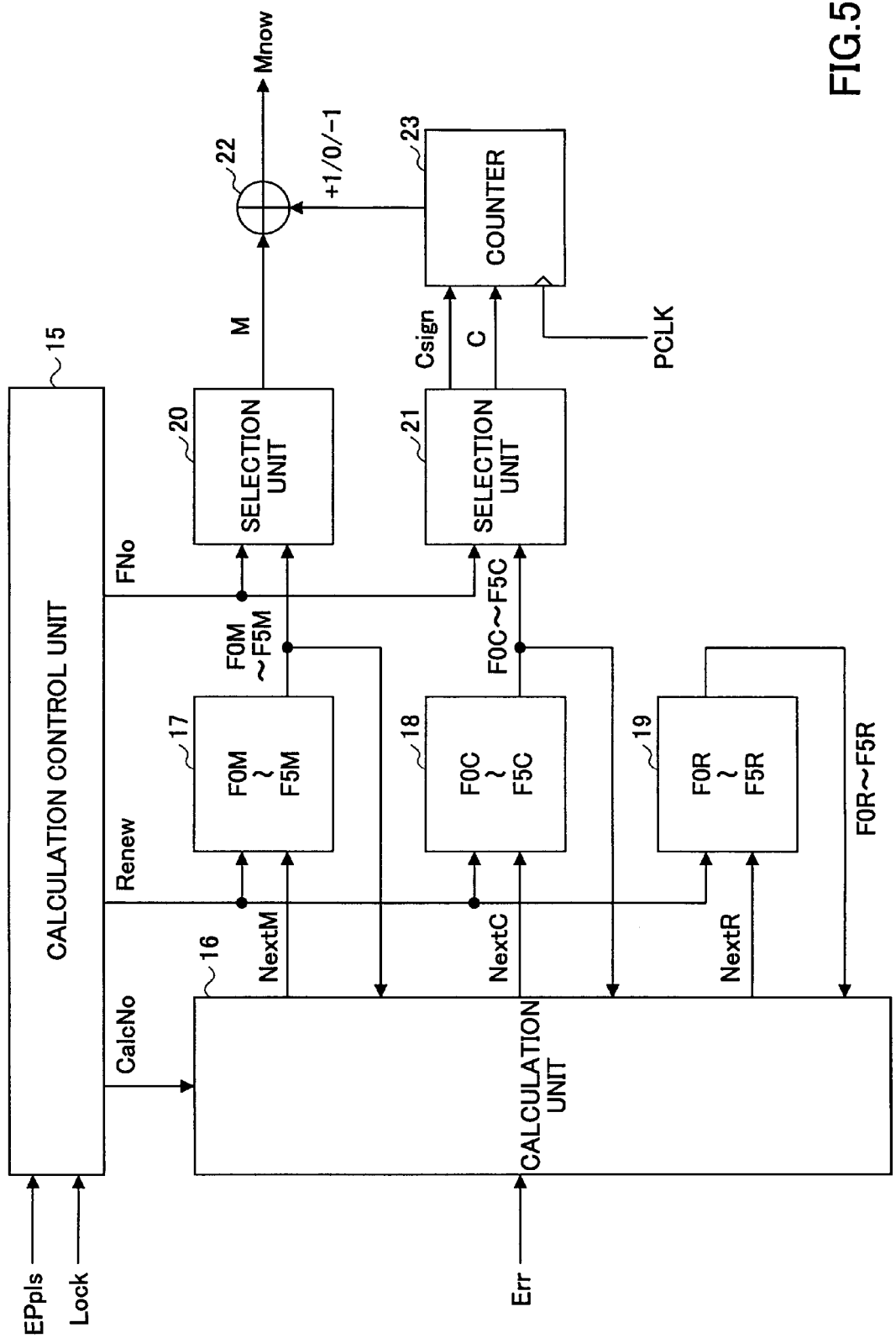
FIG. 5 is a block diagram illustrating an exemplary configuration of an exemplary frequency calculation unit.

FIG. 5 is a block diagram illustrating an exemplary configuration of the frequency calculation unit 7. In the descriptions below, it is assumed that the polygon mirror 104 has six reflecting surfaces and the pixel clock frequency is controlled to reduce the error in scanning speed of the reflecting surfaces.

A calculation unit 16 calculates next values NextM, NextC, and NextR from current values M, C, and R for each of the reflecting surfaces according to a calculation surface determining signal CalcNo. The relationship between M, C, and R is expressed as follows: Tp=(M±1/C)Tv and C=RefN/R. When NextM=M', NextR=R', and RefN=Nr, according to the above relationship and the formula (1), M'+R'/Nr=M+R/Nr+Err/Nr and C'=Nr/R' are true. Therefore, the next values can be calculated through the steps below.

(1) Calculate R+Err (the result is assigned to TmpR).

(2) When TmpR>Nr/2 is true, calculate M' and R' by M'=M+1 and R'=TmpR−Nr; when TmpR<−Nr/2, calculate M' and R' by M'=M−1 and R'=TmpR+Nr; in other cases, calculate M' and R' by M'=M and R'=TmpR.

(3) Calculate Nr÷R' and assign the quotient to C'. In this step, when R' is 0, 0 is assigned to C'.

A register 17 is a data retaining unit for retaining the current values M (F0M through F5M) of the reflecting surfaces of the polygon mirror obtained by the above calculation. The register 17 updates the current value M of each of the reflecting surfaces to NextM according to an update signal Renew. F0 through F5 indicate the numbers of the reflecting surfaces of the polygon mirror. The reflecting surface numbers are relative numbers and do not necessarily correspond to actual reflecting surfaces. The correspondence between the reflecting surface numbers and the actual reflecting surfaces are managed automatically.

Similarly, a register 18 is a data retaining unit for retaining the current values C and a register 19 is a data retaining unit for retaining the current values R. The register 18 updates the current value C of each of the reflecting surfaces to NextC according to the update signal Renew and the register 19 updates the current value R of each of the reflecting surfaces to NextC according to the update signal Renew.

A selection unit 20 selects and outputs one of the values F0M through F5M according to a surface selecting signal FNo. Also, a selection unit 21 selects and outputs one of the values F0C through F5C according to the surface selecting signal FNo. In FIG. 5, Csign indicates a sign of the value C.

A counter 23 counts the value C based on the pixel clock signal PCLK. The range of the value C is between 0 and C-1. When the count reaches C-1, the counter 23 outputs +1 if Csign is positive, outputs −1 if Csign is negative, or outputs 0 in other cases. The counter always outputs 0 when C=0.

An adder 22 adds the value M from the selection unit 20 and the value from the counter 23 and outputs the result as the pixel clock frequency specifying signal Mnow. Thus, 1 is added to or subtracted from the value M once in C cycles of the pixel clock signal PCLK and, as a result, the average pixel clock cycle becomes (M±1/C)Tv.

A calculation control unit 15 generates and outputs the calculation surface determining signal CalcNo, the update signal Renew, and the surface selecting signal FNo and thereby controls the above operations. An exemplary process of generating the above signals is described below with reference to FIG. 6.

Figure 6:
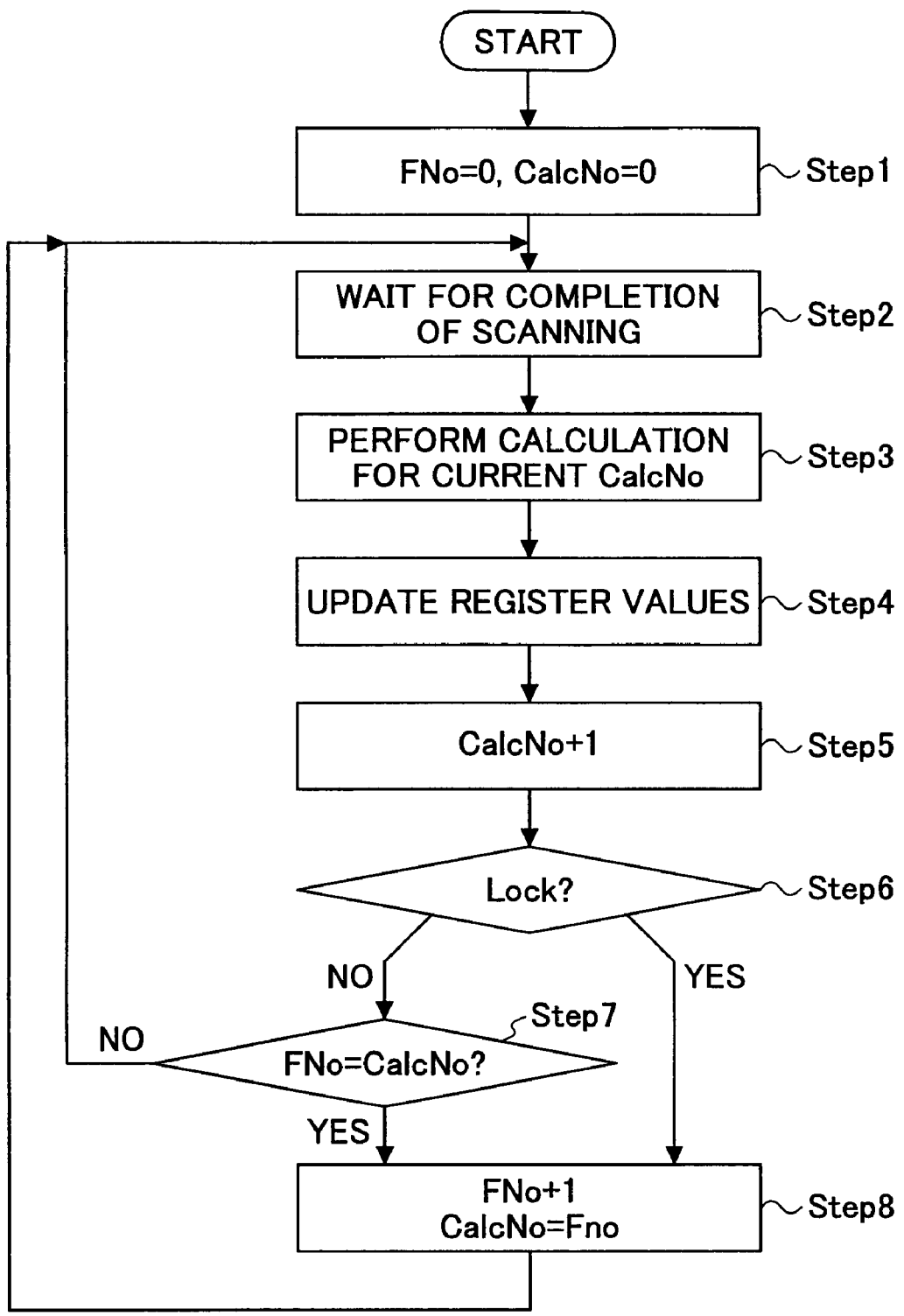
FIG. 6 is a flowchart showing an exemplary process of generating signals in an exemplary calculation control unit.

FIG. 6 is a flowchart showing an exemplary process of generating signals in the calculation control unit 15. In step 1 of the flowchart shown in FIG. 6, the calculation control unit 15 sets FNo and CalcNo equal to 0. In step 2, the calculation control unit 15 waits until the scanning of a line is completed. In other words, the calculation control unit 15 waits until it detects the end of scanning by receiving EPpls. Time necessary to calculate the error data Err is also added to the waiting time.

In step 3, the calculation control unit 15 performs the above mentioned calculations for the reflecting surface corresponding to the current CalcNo. In step 4, the calculation control unit 15 generates the update signal Renew for the reflecting surface corresponding to the current CalcNo and thereby updates the current values in the registers 17 through 19 to next values. In step 5, the calculation control unit 15 increments CalcNo. In this step, when the current CalcNo is 5, the value returns to 0. In step 6, the calculation control unit 15 determines if the pixel clock frequency control is locked based on a lock flag Lock. The lock flag Lock is a signal indicating whether the line error Lerr (or the error data Err) has been within a predetermined range (for example, ±2) for a certain number of lines (for example, six lines). The range of the line error Lerr (or the error data Err) may be determined, for example, based on the range of surface-by-surface variation in error and desired control accuracy. A lock flag generating unit (not shown) for generating the lock flag Lock may be provided in the filter 6. Also, the lock flag generating unit may be configured to generate the lock flag signal when a certain period of time (number of lines) elapses after the pixel clock frequency control is started.

In step 7, when the result of step 6 is No (when the pixel clock frequency control is not locked), the calculation control unit 15 determines whether calculations are performed for all of the reflecting surfaces and all of the current values are updated. When calculations for all of the six reflecting surfaces are completed (FNo=CalcNo), the calculation control unit 15 performs step 8. When the result of step 7 is No, the calculation control unit 15 repeats steps 2 through 6 for the remaining reflecting surfaces.

In step 8, the calculation control unit increments FNo (when the current FNo is 5, the value returns to 0) and assigns the incremented value of FNo to CalcNo. With the above steps, the current values M and C are updated to the next values M and C to generate the pixel clock frequency specifying signal Mnow for the next scan line. The above steps are performed before the scanning of the next line is started (before the first synchronizing signal SPSYNC is received). After step 8, the process returns to step 2 and the above steps are repeated.

As described above, the calculation control unit 15 controls the pixel clock frequency for the reflecting surfaces as a whole until the error data Err of the reflecting surfaces is contained within a predetermined range. This method makes it possible to quickly contain the error data Err. After the error data Err is contained within the predetermined range, the calculation control unit 15 controls the pixel clock frequency for each of the reflecting surfaces individually. Such a method makes it possible to reduce the difference in scanning speed between the reflecting surfaces and to accurately control the pixel clock frequency.

Figure 7:
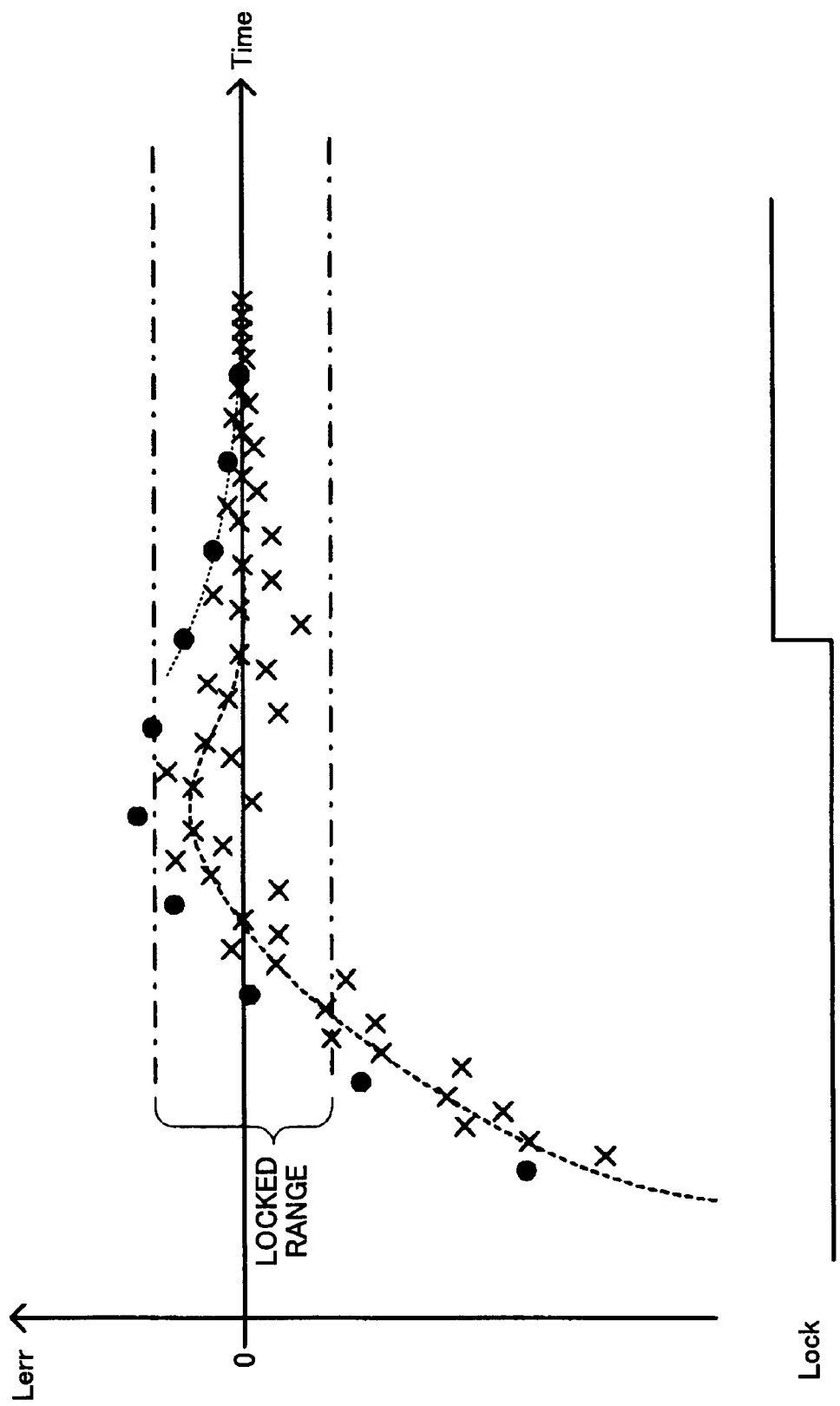
FIG. 7 is a graph used to describe how line error Lerr is contained.

FIG. 7 is a graph used to describe how the line error Lerr is contained within a predetermined range by the pixel clock frequency control process described above. In FIG. 7, the horizontal axis indicates time, the vertical axis indicates the line error Lerr, black dots indicate the line error Lerr of the reflecting surface 0, x marks indicate the line error Lerr of other reflecting surfaces, and the dotted line indicates the average of the line error Lerr of the six reflecting surfaces.

FIG. 8 is a block diagram illustrating another exemplary configuration of the frequency calculation unit 7. In the frequency calculation unit 7 shown in FIG. 8, the calculation control unit 15 has substantially the same configuration as that shown in FIG. 5 and controls calculations in substantially the same manner as described above. A calculation unit 25 calculates next values NextM and NextF from current values M and F and the error data Err for each of the reflecting surfaces according to the calculation surface determining signal CalcNo. In the frequency calculation unit 7 shown in FIG. 8, the pixel clock frequency setting value K is converted into the clock frequency specifying signal Mnow as described below. First, the integer part of the pixel clock frequency setting value K is assigned to M. The fraction part of the pixel clock frequency setting value K is rounded to "a" digits (binary number) and assigned to F. Mnow is set to M+1 (Mnow=M+1) F times in $2^a$ (=Na) cycles and therefore K is defined as (M+F/Na). In this case, the number of digits a is determined so that the maximum rounding error Nref/Na falls within a desired range. Also, to prevent local frequency deviation, F cycles when Mnow is set to M+1 are evenly distributed in $2^a$ cycles. The above conversion process is performed by a converting unit 31 (described later in more detail). When NextF is expressed by F', according to the formula (1) and the formula K=(M+F/Na), K'+F'/Na=M+F/Na+Err/Nr is true. Therefore, the next values NextM and NextF can be calculated through the steps below.

(1) Calculate F+Err/Nr*Na (the result is assigned to TmpF). In this calculation, since Na is $2^a$, "a" higher order bits of Err/Nr*Na are used. Also, since Nr is fixed during the pixel clock frequency control, Err/Nr can be easily calculated by multiplying Err by the inverse number of Nr which inverse number is obtained in advance.

(2) When TmpF>Na is true, calculate M' and F' by M'=M+1 and F'=TmpF−Na; and when TmpF<0, calculate M' and F' by M'=M−1 and F'=TmpF+Na.

A register 26 is a data retaining unit for retaining the values M obtained by the above calculations. The resistor 27 is a data retaining unit for retaining the values F obtained by the above calculations. The values M and F are associated with the reflecting surfaces F0 through F5 of the polygon mirror. The resistor 26 updates the current value M of each of the reflecting surfaces to NextM according to the update signal Renew and the resistor 27 updates the current value F of each of the reflecting surfaces to NextF according to the update signal Renew.

A selection unit 28 selects and outputs one of the values F0M through F5M according to the surface selecting signal FNo. Also, a selection unit 29 selects and outputs one of the parameters F0F through F5F according to the surface selecting signal FNo.

A counter 30 is an "a" bit counter that counts the cycles of the pixel clock signal PCLK and outputs the count as countA. Based on countA, the converting unit 31 assigns 1 to a signal UP at each of F cycles in Na (=$2^a$) cycles or assigns 0 to the signal UP at each of remaining Na−F cycles, and outputs the signal UP. The converting unit 31 may be configured to assign 1 to the signal UP when Arev (countA [0:a-1]), which is obtained by reversing the order of bits in countA [a-1:0], is smaller than F (UP=(Arev<F)) so that F cycles are evenly distributed in Na cycles.

An adder 32 adds the value M from the selection unit 28 and the value of the signal UP from the converting unit 31 and outputs the result as the pixel clock frequency specifying signal Mnow. Thus, 1 is added to the value M at each of F cycles in Na cycles of the pixel clock signal PCLK and, as a result, the average pixel clock cycle becomes (M+F/Na)Tv.

As described above, in the pixel clock frequency control, phase error Lerr is calculated for each scan line and digital PLL control is performed to reduce the phase error Lerr to 0. The filter 6 is a digital filter placed in the control loop. The control range can be determined by changing the characteristics of the filter 6. Exemplary filter settings are described below.

Figure 9A:
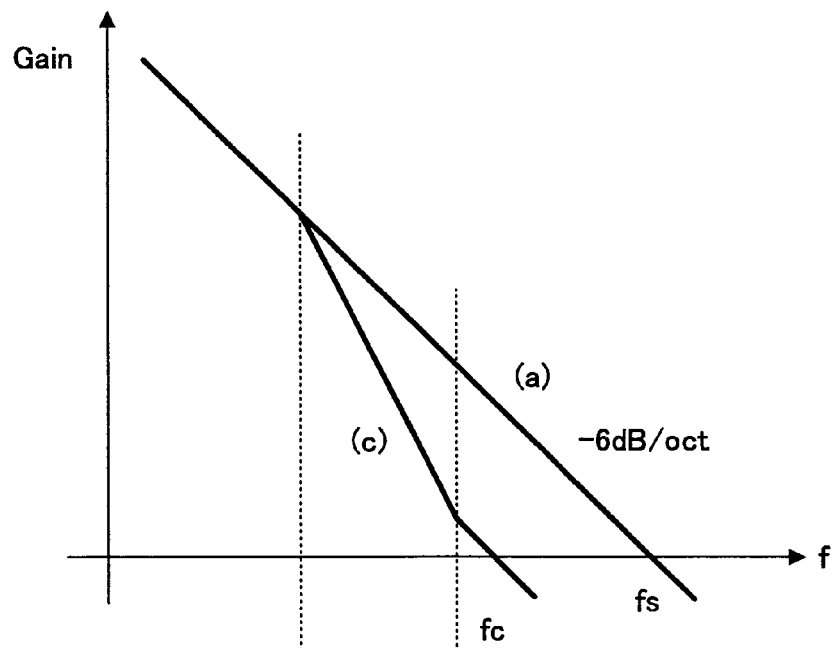
FIGS. 9A and 9B are graphs used to describe exemplary filter characteristics.
Figure 9B:
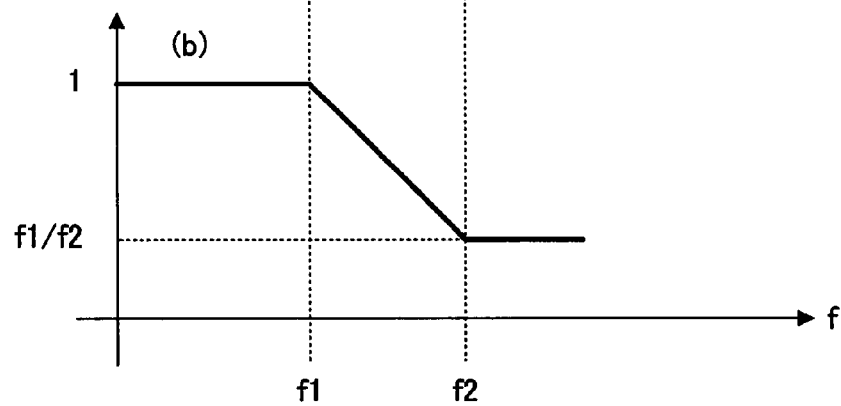

FIGS. 9A and 9B are graphs used to describe exemplary filter characteristics. FIG. 9A (a) shows the loop gain of a DPLL control system without a loop filter. In FIG. 9A, fs indicates a sampling frequency or a line frequency. When a lag-lead filter having characteristics as shown by FIG. 9B (b) is added to the DPLL control system, the loop gain of the DPLL control system changes as shown by FIG. 9A (c) and the DPLL control system becomes stable.

When $\tau1=1/2\Pi f1$ and $\Pi2=1/2\Pi f2$, the transfer function H(s) of a loop filter is expressed by the following formula:

$H(s)=(1+\tau2s)/(1+\tau1s)$

When the above formula is bilinearly transformed ($s=2/T\cdot(1-z^-1)/(1+z^-1)$) into z-transformation format and normalized with T=1, the transfer function H(s) of a loop filter is expressed by the following formula: $H(z)=(b0+b1z^-1)/(1+a1z^-1)$, where $a1=(1-2\tau1)/(1+2\tau1)$, $b0=(1+2\tau2)/(1+2\tau1)$, and $b1=(1-2\tau2)/(1+2\tau1)$.

Figure 10:
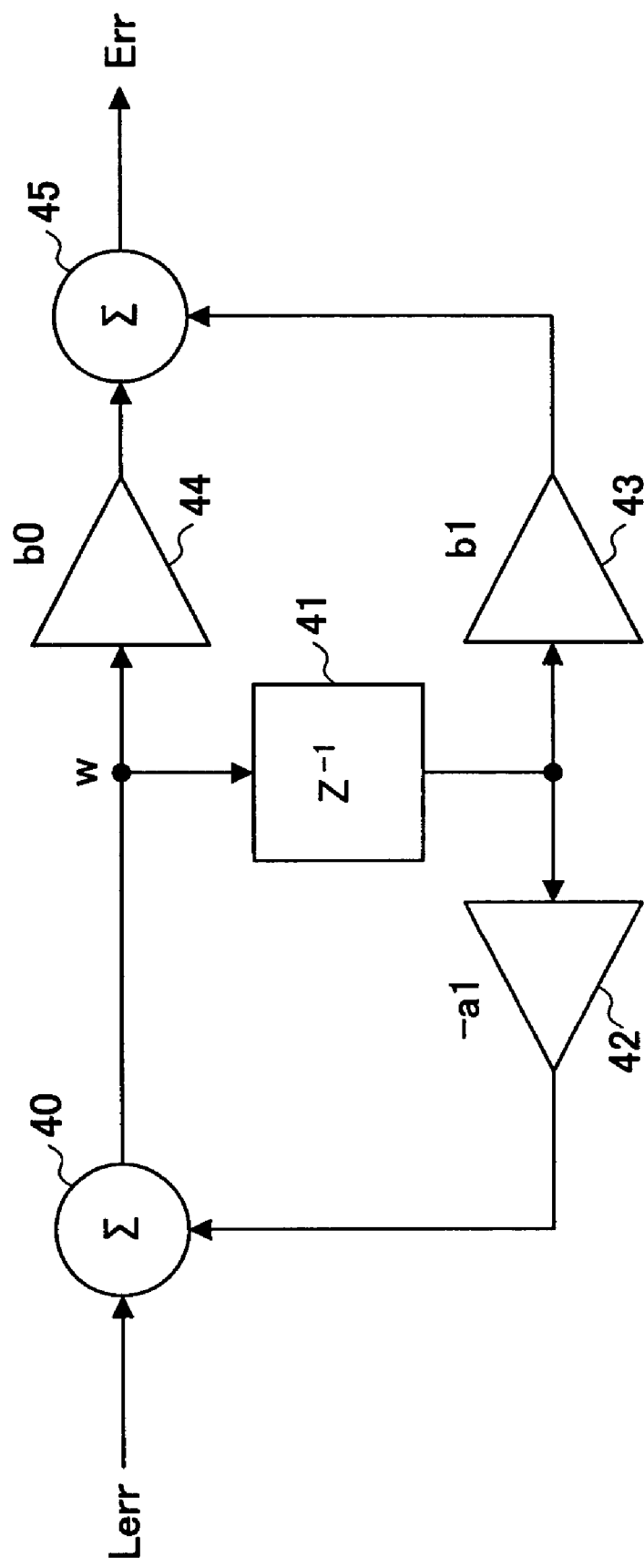
FIG. 10 is a drawing illustrating an exemplary configuration of an exemplary filter with a transfer function H(z)

FIG. 10 is a drawing illustrating an exemplary configuration of the filter 6 with the transfer function H(z) expressed by the above formula. The filter 6 is a primary IIR type filter. Adders 40 and 45 add inputs, multipliers 42, 43, and 44 multiply inputs by coefficients −a1, b1, and b0, respectively, and a delay element 41 delays an intermediate variable w sample by sample (line by line). The error data Err can be obtained by inputting the line error Lerr into the filter 6.

Also, each of the multipliers 42 through 44 may be configured to include a unit for changing the value of the coefficient −a1, b1, or b0 so that the characteristics of the filter 6 can be dynamically changed, for example, according to the lock flag signal Lock described above.

The characteristics and configuration of the filter 6 are provided as examples and a filter with different characteristics and configuration may also be used for the present invention. Since digital filter is a known technology, additional examples are omitted here.

The modulated data generating unit 113 modulates image data based on the pixel clock signal PCLK generated by the pixel clock signal generating unit 111 shown FIG. 2.

Figure 11:
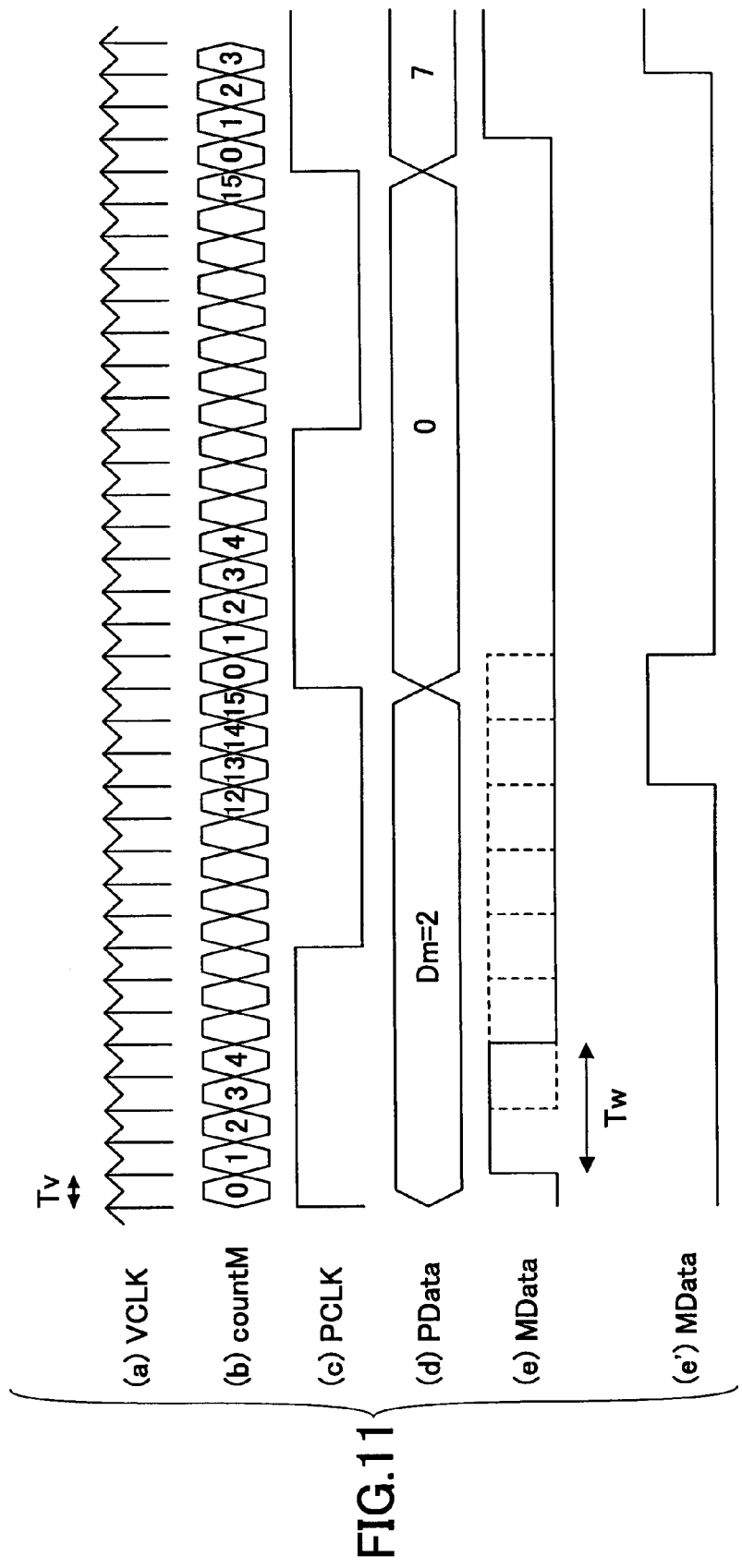
FIG. 11 is a drawing used to describe exemplary operation of an exemplary modulated data generating unit.

FIG. 11 is a drawing used to describe exemplary operations of the modulated data generating unit 113. As an example, a process of generating modulated data MData by performing 8-bit pulse-width modulation according to image data PData is described below. In FIG. 11, (a) VCLK shows rises of the high-frequency clock signal VCLK (cycle Tv) and (b) countM shows counts of the frequency divider 4 on the assumption that Mnow is 16. (c) PCLK shows the pixel clock signal PCLK with a clock cycle of 16 Tv. (d) PData shows image data input into the modulated data generating unit 113. The pulse width Tw of modulated data (e) Mdata to be output is modulated according to the value Dm of PData.

The modulated data MData are generated based on the high-frequency clock signal VCLK. When Dm≠0 and countM=0, the modulated data MData (the signal of the modulated data MData) becomes high. When countM=Dm/Nm·Mnow (Nm indicates the number of gradation levels, in this example Nm is 8), the modulated data signal MData becomes low. Also, the modulated data generating unit 113 may be configured so that the modulated data signal MData becomes high when countM=(Nm−Dm)/Nm·Mnow and becomes low when Dm≠0 and countM=0. In this case, modulated data as shown by (e') MData are generated. Further, the modulated data generating unit 113 may be configured to be able to switch between the above two generation modes dot by dot.

In the above descriptions, the pixel clock frequency is controlled according to the variation in time taken to scan a line between start and end points. However, when the speed of scanning a line is substantially constant, the pixel clock frequency may be controlled according to the variation in time taken to scan a section between any given two points in a line.

As described above, in the pixel clock signal generating unit 111 having the first configuration, a pixel clock signal is generated based on a high-precision high-frequency clock signal and the pixel clock frequency is controlled taking into account the variation in scanning time. Thus, the pixel clock signal generating unit 111 can generate a pixel clock signal that can accurately correct the error in average scanning speed. Also, the pixel clock signal generating unit 111 controls the pixel clock frequency for each reflecting surface of a polygon mirror and is therefore able to generate a pixel clock signal that can accurately correct the error in scanning speed for each reflecting surface. Further, using the pixel clock signal generating unit 111 in an image forming apparatus makes it possible to form a high-quality image based on a pixel clock signal that can accurately correct the error in scanning speed.

Figure 12:
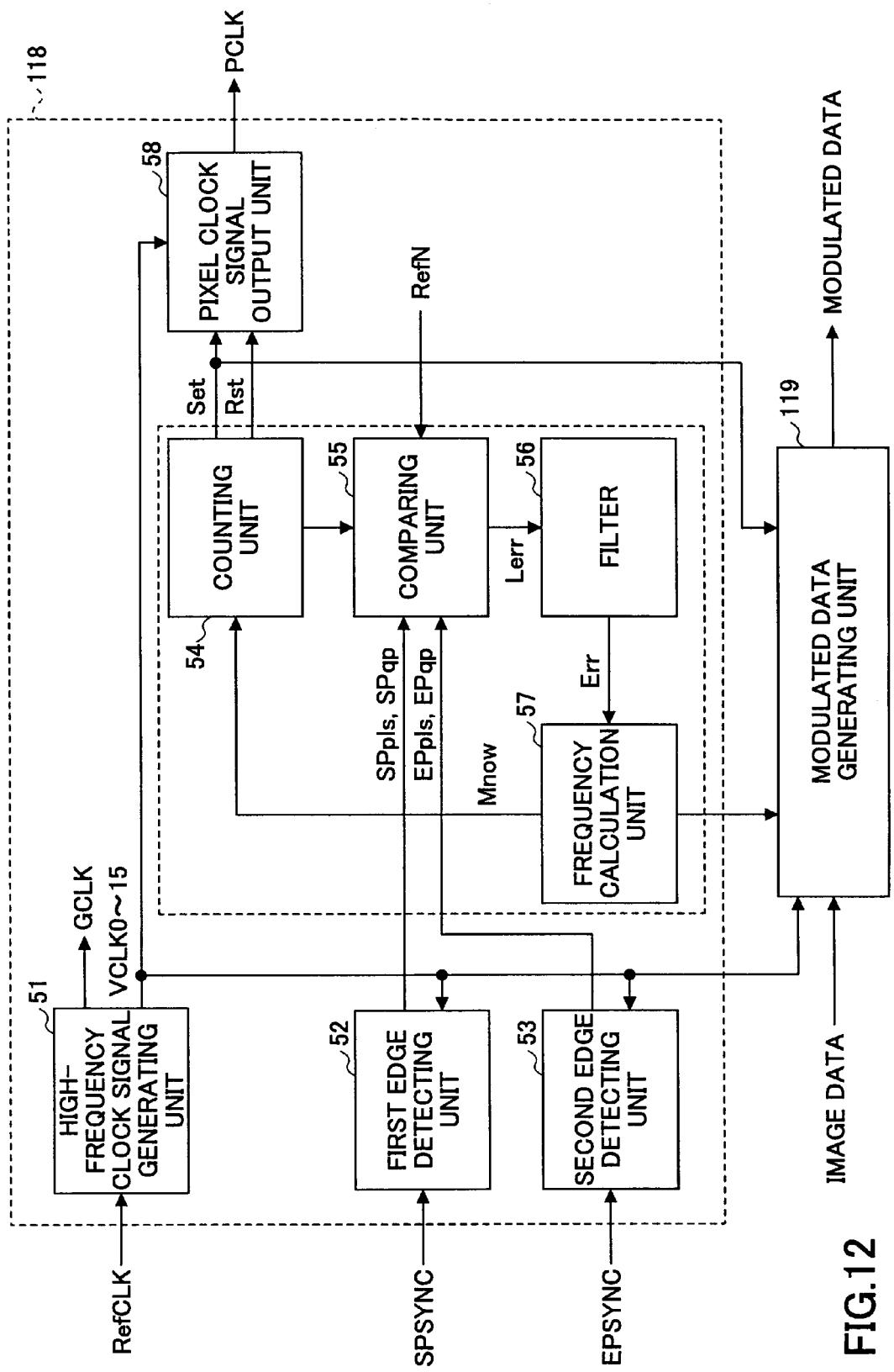
FIG. 12 is a block diagram illustrating a second exemplary configuration of a pixel clock signal generating unit.

FIG. 12 is a block diagram illustrating a second exemplary configuration of a pixel clock signal generating unit. A high-frequency clock signal generating unit 51 of a pixel clock signal generating unit 118 shown in FIG. 12 is configured to generate multi-phase clock signals with equally-spaced phase differences by multiplying the frequency of a reference clock signal RefCLK. In this embodiment, the high-frequency clock signal generating unit 51 generates 16-phase multi-phase clock signals VCLK0 though VCLK15. The high-frequency clock signal generating unit 51 also generates an internal operation clock signal GCLK by dividing the frequency of one of the multi-phase clock signals VCLK into Q parts (in this example, Q=4) and supplies the internal operation clock signal GCLK to corresponding parts in the pixel clock signal generating unit 118.

Figure 13:
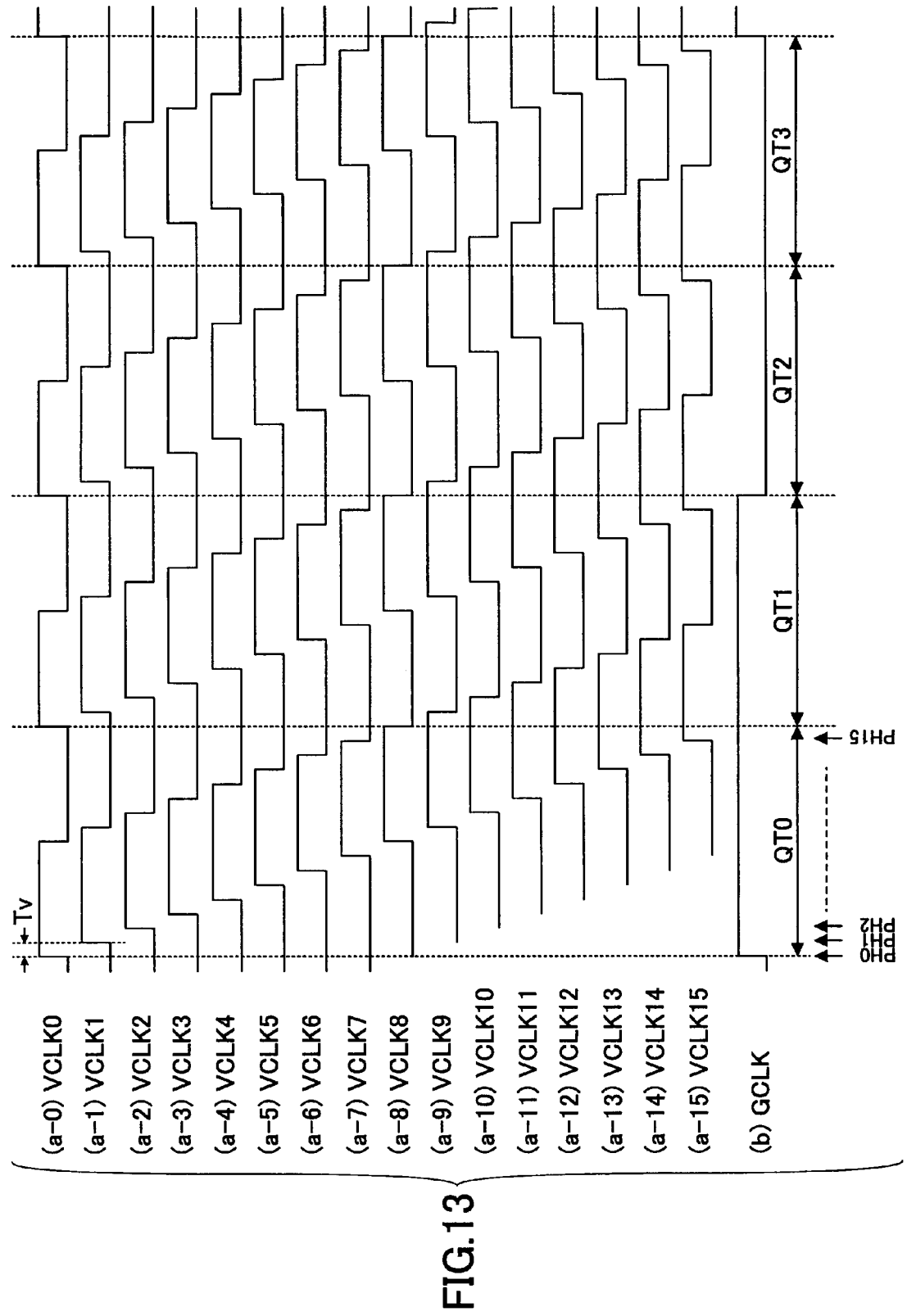
FIG. 13 is a timing chart of clock signals generated by an exemplary high-frequency clock signal generating unit.

FIG. 13 is a timing chart of clock signals generated by the high-frequency clock signal generating unit 51. Signals (a-0) through (a-15) in FIG. 13 show the multi-phase clock signals VCLK0 through VCLK15. There is the same phase difference Tv between each adjacent pair of the multi-phase clock signals VCLK0 through VCLK15. Signal (b) GCLK is the internal operation clock signal GCLK generated by dividing the frequency of (a-0) VCLK0 into four parts. The pixel clock signal generating unit 118 operates basically in synchronization with the internal operation clock GCLK. QT0 through QT3 each indicate one fourth of a GCLK cycle and PH0 through PH15 indicate the timings when the multi-phase clock signals VCLK0 through 15 rise. Time information QP in GCLK is expressed by the period QT0 through QT3 and the timings PH0 through PH15.

The time information QP takes 64 values between 0 and 63. In the pixel clock signal generating unit 118, the pixel clock signal PCLK is generated based on the phase difference Tv between the multi-phase clock signals VCLK. In other words, the pixel clock signal generating unit 118 calculates the time information QP (QT, PH) based on the internal operation clock signal GCLK to control the pixel clock frequency.

In FIG. 12, a first edge detecting unit 52 detects a rising edge of the first synchronizing signal SPSYNC based on the multi-phase clock signals VCLK0 through VCLK15 and, when the rising edge is detected, outputs the detection pulse SPpls synchronized with the internal operation clock signal GCLK and time information SPqp indicating the period QT and the timing PH at the rising edge.

A second edge detecting unit 53 detects a rising edge of the second synchronizing signal EPSYNC based on the multi-phase clock signals VCLK0 through VCLK15 and, when the rising edge is detected, outputs the detection pulse EPpls synchronized with the internal operation clock signal GCLK and time information EPqp indicating the period QT and the timing PH at the rising edge.

A counting unit 54 counts time based on the pixel clock frequency specifying signal Mnow from a frequency calculation unit 57. At each time when the count reaches Mnow, the counting unit 54 generates a Set signal (composed of a SETpls signal synchronized with GCLK and time information SETqp) and generates an Rst signal (composed of an RSTpls signal synchronized with GCLK and time information RSTqp) by calculating time corresponding to Mnow/2 from the Set signal. The unit of time counted above is the phase difference Tv between the multi-phase clock signals VCLK0 through VCLK15.

A pixel clock signal output unit 58 switches the pixel clock signal PCLK between high and low according to the Set signal and the Rst signal from the counting unit 54 and thereby outputs the pixel clock signal PCLK. The configurations and operations of the above units in the pixel clock signal generating unit 118 are described later in more detail.

A comparing unit 55 obtains line scanning time Tline between the first and second synchronizing signals SPSYNC and EPSYNC, calculates the difference between the line scanning time Tline and reference time predetermined according to the writing frequency and the distance between the photodetectors PD1 and PD2, and outputs the difference as line error Lerr of the scan line. In other words, error in scanning speed is obtained as the difference between desired scanning time (reference time) and the actual line scanning time Tline of a scan line. The comparing unit 55 counts the number of SETpls during the period of time between the reception of SPpls and the reception of EPpls, compares the counted number of SETpls and the reference value RefN, and obtains the line error Lerr from the result of the comparison and the time information SPqp and EPqp. The unit of the line error Lerr is the phase difference Tv.

A filter 56 is a digital filter that filters the line error Lerr and thereby outputs the error data Err. The frequency calculation unit 57 calculates an appropriate pixel clock frequency based on the error data Err and outputs the calculated pixel clock frequency as the pixel clock frequency specifying signal Mnow.

When the pixel clock cycle is Tp and Tp=KTv, the error data Err equal the difference between Tp and a target value Tp' (=K'Tv). Therefore, a target pixel clock frequency can be obtained by obtaining K' with the formula (1) in substantially the same manner as described above.

The filter 56 and the frequency calculation unit 57 have substantially the same functions and configurations as those of the filter 6 and the frequency calculation unit 7 shown in FIG. 2. Therefore, detailed descriptions of the filter 56 and the frequency calculation unit 57 are omitted here.

Figure 14:
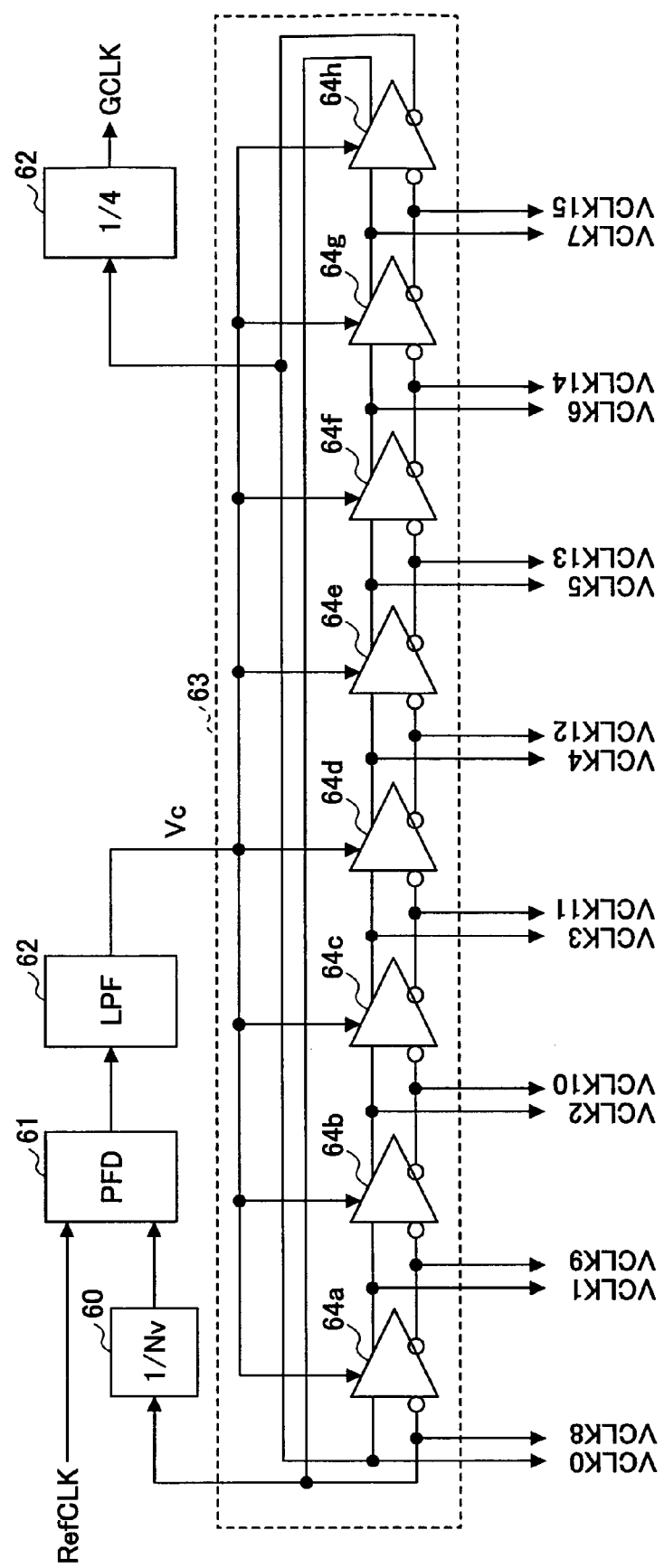
FIG. 14 is a drawing illustrating an exemplary configuration of the exemplary high-frequency clock signal generating unit.

Other parts of the pixel clock signal generating unit 118 are described below. FIG. 14 is a drawing illustrating an exemplary configuration of the high-frequency clock signal generating unit 51. The high frequency clock signal generating unit 51 generates the multi-phase clock signals VCLK0 through VCLK 15 and the internal operation clock signal GCLK from the reference clock signal RefCLK.

A voltage-controlled oscillator VCO 63 is composed of a ring oscillator including eight differential buffers 64a through 64h connected to each other and generates the multi-phase clock signals VCLK0 through VCLK 15. A frequency divider 60 divides the frequency of one of the multi-phase clock signals VCLK (in this example, VCLK8) into Nv parts.

A phase frequency comparator PFD 61 performs phase comparison between the reference clock signal RefCLK and the output from the frequency divider 60 and drives a charge pump (not shown) in the phase frequency comparator PFD based on the result of the phase comparison. A low pass filter LPF 62 smoothes the output of the charge pump and supplies the resulting control voltage Vc to the VCO 63.

The amounts of delay by the differential buffers 64*a* through 64*h* in the VCO 63 change according to the control voltage Vc and phase synchronization control is thereby performed. For example, when the frequency of the reference clock signal RefCLK is 100 MHz and a frequency dividing ratio Nv is 20, the multi-phase clock signals VCLK0 through VCLK15 having substantially the same phase differences and a frequency of 2 GHz are generated. A frequency divider 65 generates the internal operation clock signal GCLK by dividing the frequency of one of the multi-phase clock signals VCLK into Q parts (in this example, Q=4). The number of phases of the multi-phase clock signals is not limited to 16 but is preferably the nth power of 2 to simplify the calculation. For the same reason, the frequency dividing ratio Q used to generate the internal operation clock signal GCLK is preferably the nth power of 2.

Figure 15:
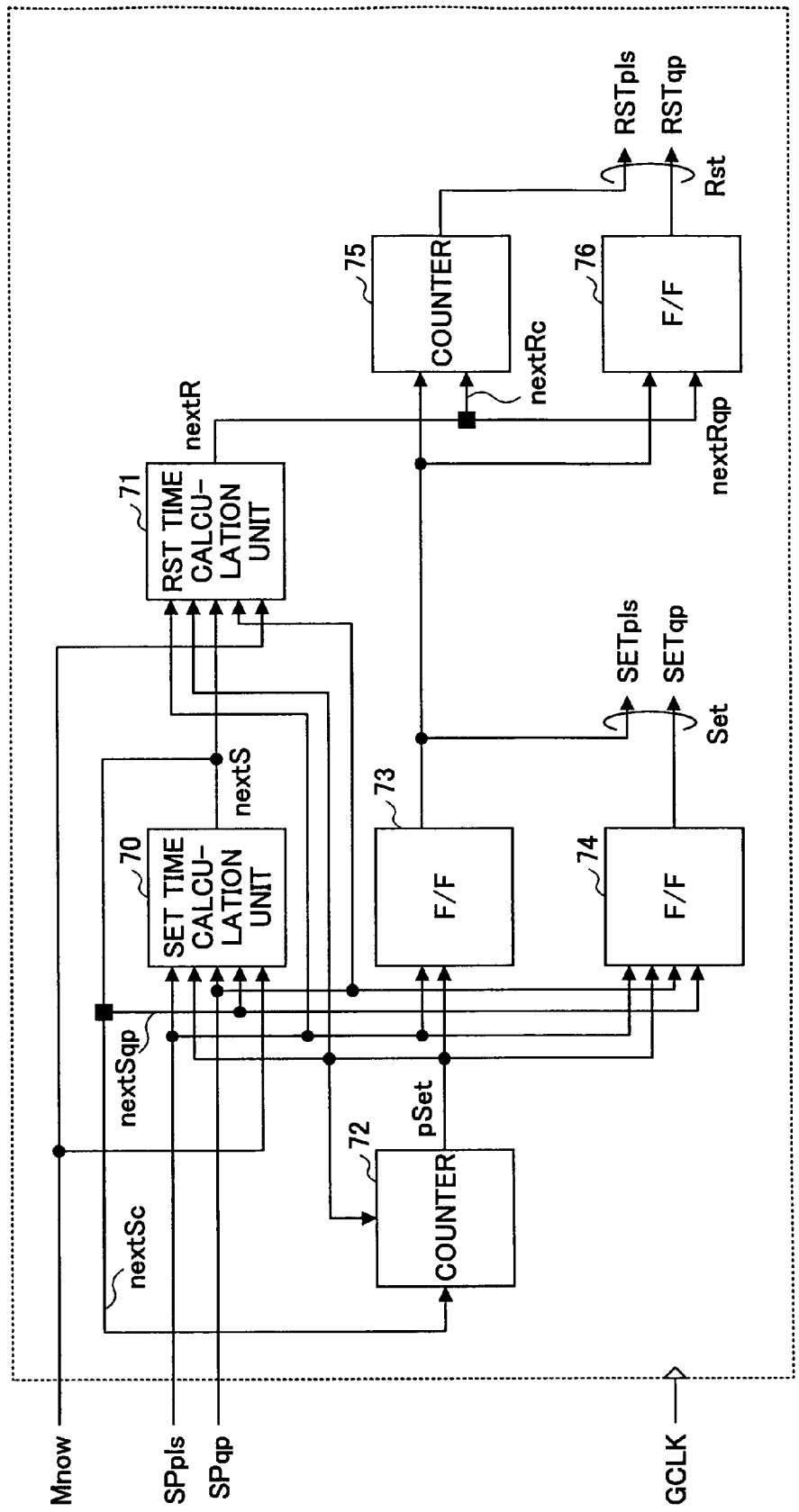
FIG. 15 is a block diagram illustrating an exemplary configuration of an exemplary counting unit.
Figure 16:
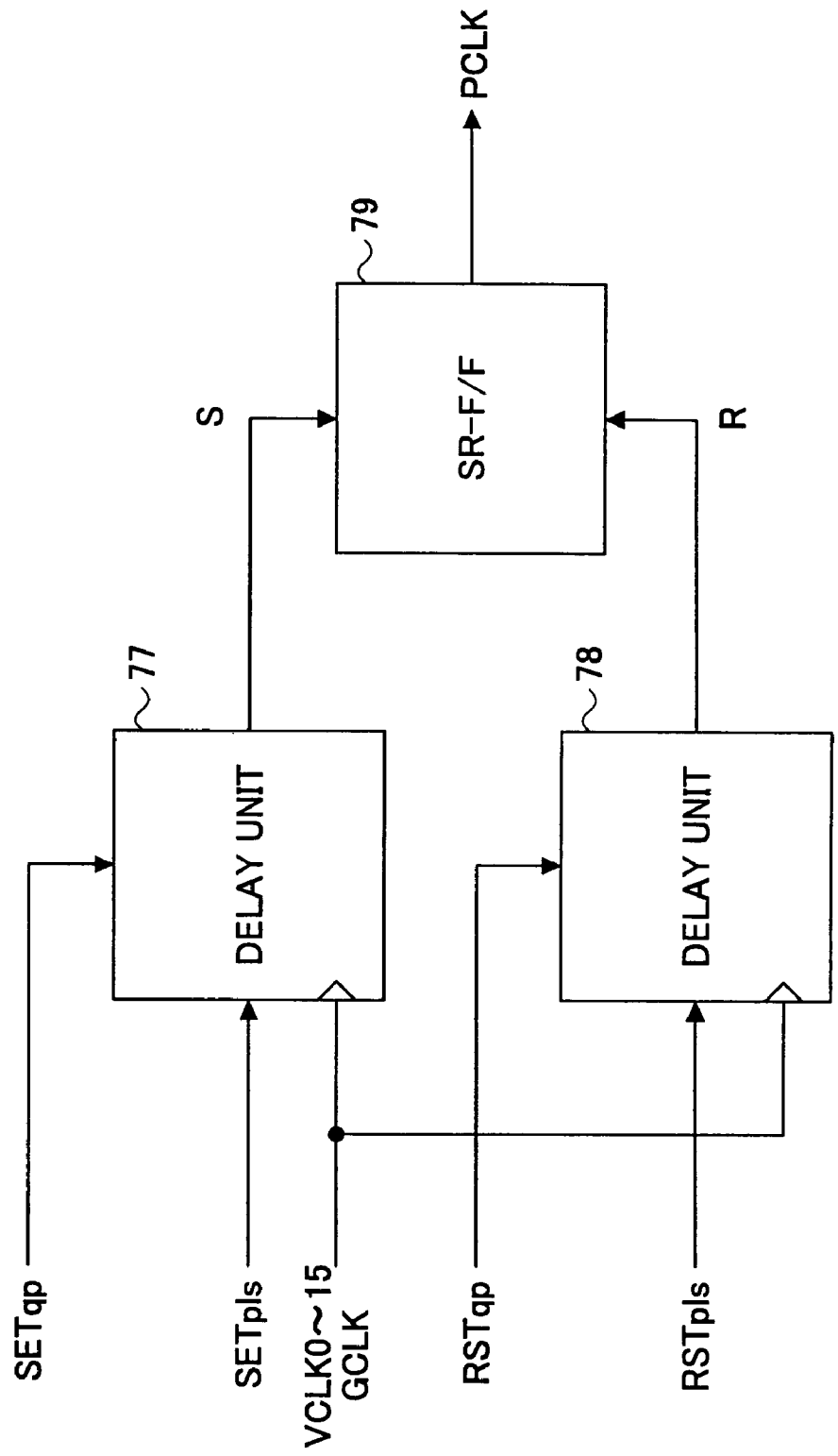
FIG. 16 is a block diagram illustrating an exemplary configuration of an exemplary pixel clock signal output unit.
Figure 17:
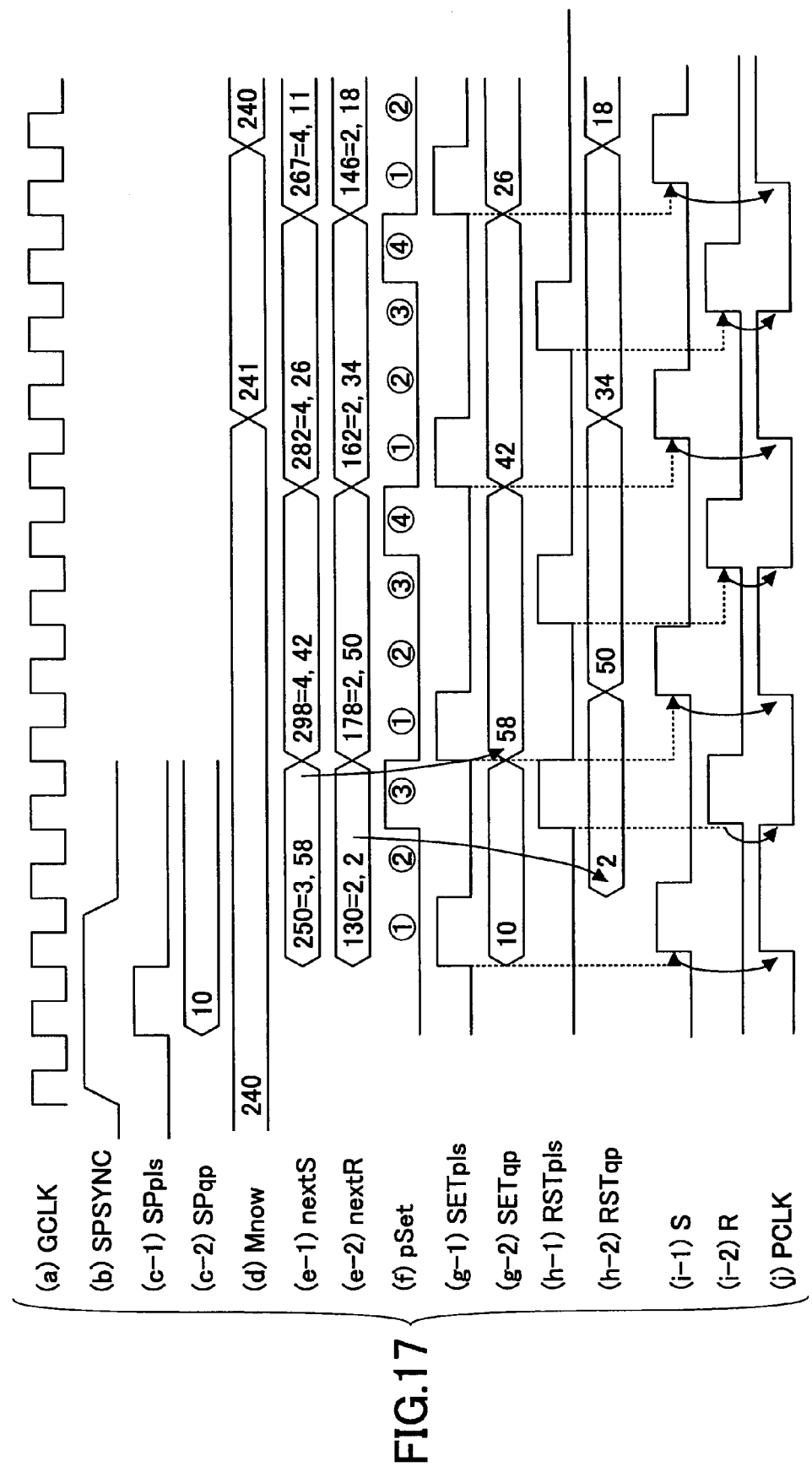
FIG. 17 is a timing chart of signals of the exemplary counting unit and the exemplary pixel clock signal output unit.

FIG. 15 is a block diagram illustrating an exemplary configuration of the counting unit 54. FIG. 16 is a block diagram illustrating an exemplary configuration of a pixel clock signal output unit 58. FIG. 17 is a timing chart of signals of the counting unit 54 and the pixel clock signal output unit 58. An exemplary process of generating the pixel clock signal PCLK according to the pixel clock frequency specifying signal Mnow is described below with reference to FIGS. 15 through 17.

Each part in the counting unit 54 operates in synchronization with the internal operation clock signal GCLK. A SET time calculation unit 70 adds current PCLK rise timing information and the pixel clock frequency specifying signal Mnow and thereby obtains set time information nextS indicating the next PCLK rise timing in response to a pSet signal. In FIG. 15, nextSc indicates the quotient of the set time information nextS divided by 64 and nextSqp indicates the remainder. In other words, nextSc=nextS[MSB:6] and nextSqp=nextS[5:0].

Since the generation of PCLK is started in phase synchronization with the rise of SPSYNC (more precisely, after certain signal processing; in this example, after two cycles of the internal operation clock signal GCLK), SPqp is used as the initial PCLK rise timing information.

An RST time calculation unit 71 adds current PCLK rise timing information and one-half of the pixel clock frequency specifying signal Mnow and thereby obtains reset time information nextR indicating the next PCLK fall timing in response to the pSet signal. In this case, nextRc=nextR[MSB:6] and nextRqp=nextR[5:0]. In the above calculation, Mnow/2 is added to the current PCLK rise timing information so that the duty of PCLK becomes approximately 50%. If 50% duty is not necessary, any value may be used instead of Mnow/2 to simplify the calculation.

A counter 72 counts nextSc cycles based on the internal operation clock signal GCLK and thereby generates a pSet signal. When the pSet signal is high, the counter 72 is reset to 1. The pSet signal is changed to high when the count of the counter 72 matches nextSc.

A F/F 73 is a flip-flop that delays the pSet signal and the SPpls signal one GCLK cycle and thereby generates the SETpls signal. A F/F 74 is a flip-flop that enables the pSet signal and latches nextSqp, enables SPpls and latches SPqp, and thereby generates the SETqp signal. The SETpls signal specifies the rise of PCLK by GCLK cycles and the SETqp signal synchronized with the SETpls signal specifies the rise timing information in a GCLK cycle. The SETpls signal and the SETqp signal (called Set signals) are supplied to the pixel clock signal output unit 58.

A counter 75 counts nextRc cycles based on the internal operation clock signal GCLK and thereby generates an RSTpls signal. When the SETpls signal is high, the counter 75 is reset to 1. The RSTpls signal is changed to high when the count of the counter 72 matches nextRc. A F/F 76 is a flip-flop that enables SETpls and latches nextRqp and thereby generates the RSqp signal. The RSTpls signal specifies the fall of PCLK in GCLK cycles and the RSTqp signal specifies the fall timing information in the GCLK cycles. The RSTpls signal and the RSTqp signal (called Rst signals) are supplied to the pixel clock signal output unit 58.

The timings of signals are not limited to the above described timings as long as the SETqp signal becomes active when the SETpls signal is high and the RSTqp signal becomes active when the RSTpls signal is high.

In FIG. 16, a delay unit 77 delays SETpls from the counting unit 54 according to the time information SETqp and outputs the delayed SETpls as a pulse S based on the multi-phase clock signals VCLK0 through VCLK15. The delay unit 77 also receives the internal operation clock GCLK to identify a period QT in a GCLK cycle. Also, the delay unit 77 may be configured to receive a signal QT indicating the period QT. In this case, the signal QT is generated by the high-frequency clock generating unit 51. In other words, the pulse S is a pulse generated by delaying SETpls for a period of time corresponding to SETqp·Tv.

A delay unit 78 delays RSTpls supplied from the counting unit 54 according to the time information RSTqp and outputs the delayed RSTpls as a pulse R based on the multi-phase clock signals VCLK0 through VCLK15. In other words, the pulse R is a pulse generated by delaying RSTpls for a period of time corresponding to RSTqp·Tv. An SR-F/F 79 is a Set-Reset flip-flop that outputs the pixel clock signal PCLK that is changed (set) to high at the rise of the pulse S and changed (reset) to low at the rise of pulse R.

In FIG. 17, (a) GCLK shows the internal operation clock signal GCLK. When detecting the rise of the first synchronizing signal SPSYNC (b), the first edge detecting unit 52 outputs the SPpls signal (c-1) that becomes high during the next cycle of the GCLK signal and the SPqp singal (c-2) indicating the rise timing (in this example, 10) of the SPpls signal in the GCLK cycle.

(d) Mnow shows the pixel clock frequency specifying signal supplied from the frequency calculation unit 57. (e-1) nextS shows the next rise timing of PCLK and is calculated by the SET time calculation unit 70. Since the first rise of PCLK is synchronized with the rise of SPSYNC, the next rise of PCLK is after SPqp+Mnow=250Tv from the first rise. In (e-1) nextS, the figure before the comma in the right hand side of each equation indicates nextSc and the figure after the comma indicates nextSqp. As shown in (e-1) nextS, the rise of PCLK after next is at nextSqp+Mnow=298.

(e-2) nextR shows the next fall timing of PCLK calculated by the RST time calculation unit 71. The next fall timing of PCLK (130) is calculated by adding Mnow/2 to the rise timing of SPSYNC. In (e-2) nextR, the figure before the comma in the right hand side of each equation indicates nextRc and the figure after the comma indicates nextRqp.

(f) pSet is a pulse for updating the SETqp signal and is output one GCLK cycle before SETpls. pSet becomes high when the count of the counter 72 matches nextSc. In (f) pSet, circled numbers indicate the counts of nextSc.

(g-1) SETpls is a pulse generated by delaying the SPpls and pSet signals for one GCLK cycle and specifies the rise of PCLK by GCLK cycles. (g-2) SETqp is the PCLK rise timing information indicating the delay value of SETpls. The value of (g-2) SETqp is updated to the value of (e-1) nextSqp when (f) pSet is high. (h-1) RSTpls is a pulse that specifies the rise of PCLK by GCLK cycles and becomes high when the count of the counter75 matches nextRc. (h-2) RSTqp is the PCLK fall timing information indicating the delay value of RSTpls.

(i-1) S is a pulse generated by delaying (g-1) SETpls for a period of time equivalent to the corresponding value of (g-2) SETqp. The unit of delay is the phase difference Tv between the multi-phase clock signals VCLK0 through VCLK15. Similarly, (i-2) R is a pulse generated by delaying (h-1) RSTpls for a period of time equivalent to the corresponding value of (h-2) RSTqp. (j) PCLK is the pixel clock signal that becomes high at the rise of (i-1) S and becomes low at the rise of (i-2) R.

Figure 18:
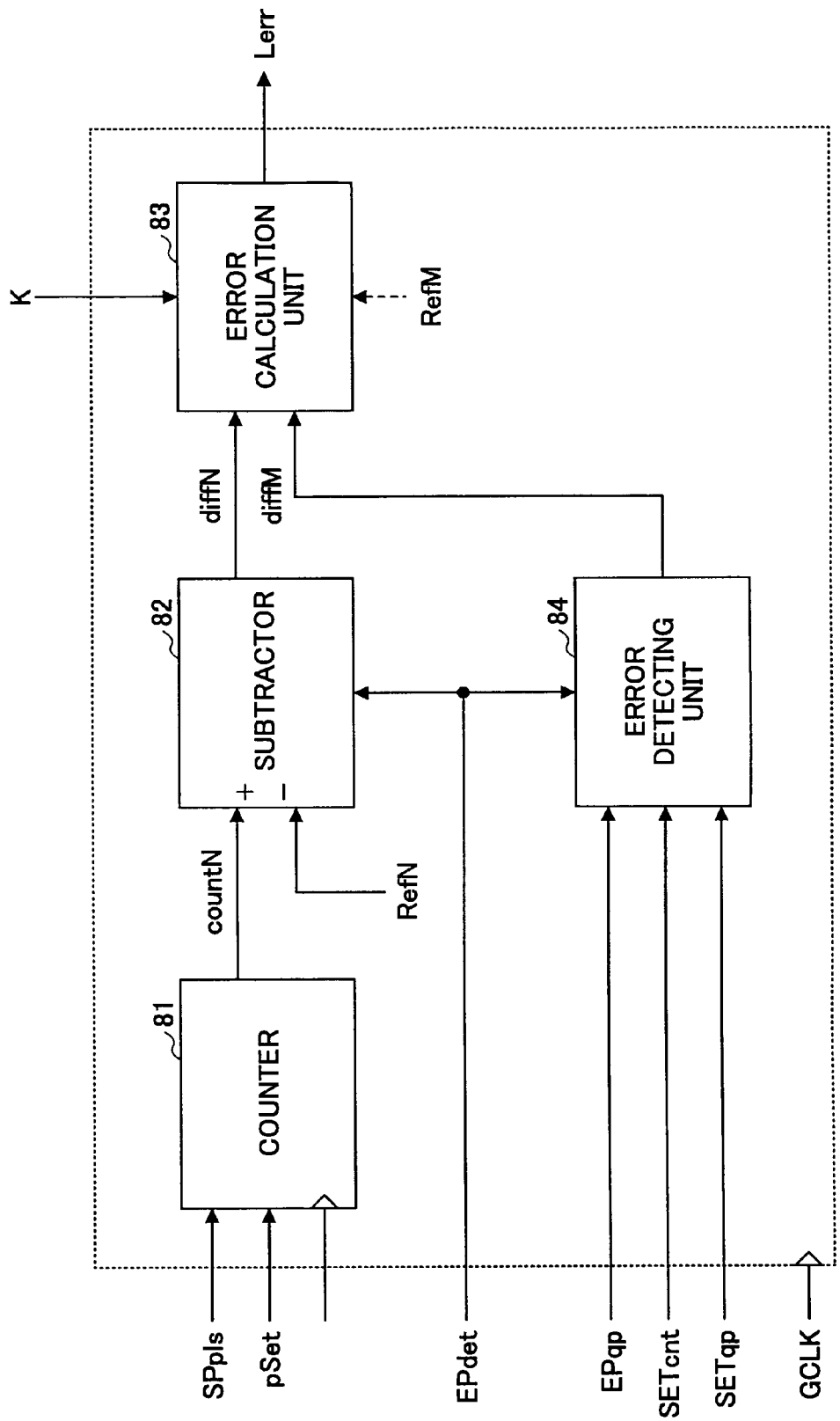
FIG. 18 is a block diagram illustrating an exemplary configuration of an exemplary comparing unit.
Figure 19:
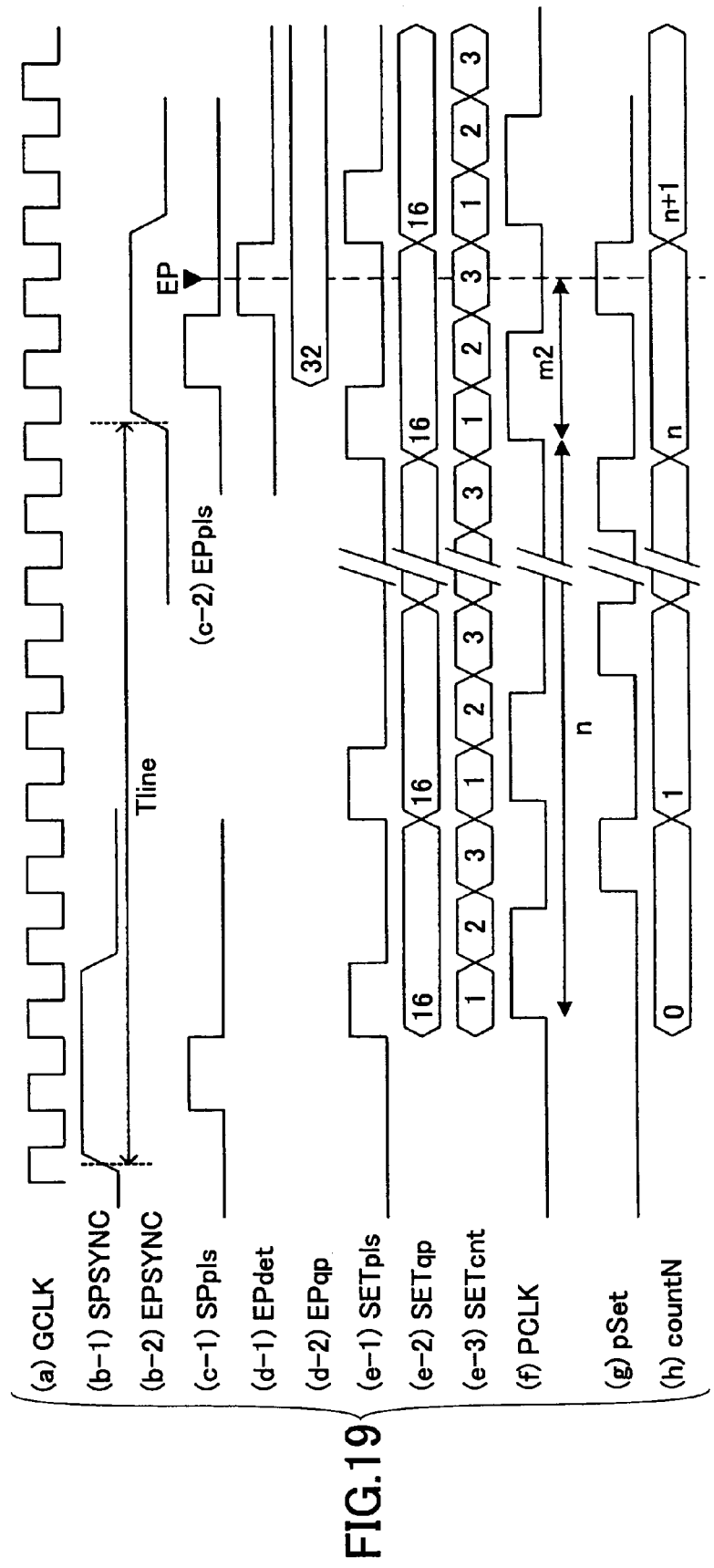
FIG. 19 is a timing chart of signals in the exemplary comparing unit.

FIG. 18 is a block diagram illustrating an exemplary configuration of the comparing unit 55. FIG. 19 is a timing chart of signals in the comparing unit 55. An exemplary operation of the comparing unit 55 is described below with reference to FIGS. 18 and 19.

In FIG. 19, (a) GCLK shows the internal operation clock signal GCLK, (b-1) SPSYNC shows the first synchronizing signal SPSYNC, and (b-2) shows the second synchronizing signal EPSYNC. The difference between the rise timing of SPSYNC and the rise timing of EPSYNC is the line scanning time Tline. (c-1) SPpls and (c-2) EPpls show the detection pulses SPpls and EPpls. (d-2) EPqp shows time information of the second synchronizing signal EPSYNC. (e-1) ETpls and (e-2) SETqp are time information indicating the rise of PCLK. Descriptions of these signals are provided above and therefore omitted here.

(e-3) SETcnt shows the count of the counter 72. In this example, Mnow is fixed at 192. When Mnow=192, (f) PCLK is generated. Since PCLK is generated after two GCLK cycles from SPSYNC, the scanning end point EP is detected after two GCLK cycles from EPSYNC. Therefore, the line error Lerr is obtained based on the corresponding signals at a timing when (d-1) EPdet is high, which (d-1) EPdet is generated by delaying (c-2) EPpls for one GCLK cycle.

(g) pSet shows the pSet signal. (h) countN shows the count of the counter 81 that is reset to 0 by (c-1) SPpls and is incremented by (g) pSet. Thus, the number of cycles n of PCLK from the start of scanning until the scanning end point EP and phase error m2 are obtained.

The counter 81 shown in FIG. 18 is reset to 0 by SPpls, incremented by pSet, and outputs the count countN. Subtracter 82 subtracts the reference value RefN from countN (n is FIG. 19) of the counter 81 when EPdet is high and outputs the result diffN (=n−RefN).

An error detecting unit 84 calculates a phase difference diffM using the following formula:

diffM=Endcnt·Mp+(EPqp−Endqp).

In the above formula, Endqp and Endcnt indicate SETqp and SETcnt when EPdet is high, respectively, and Mp indicates the division number of the GCLK time information (in this example, 64). In the example shown in FIG. 19, diffM=144.

An error calculation unit 83 performs a calculation expressed by the formula Lerr=diffN·K+diffM (Tp=K·Tv, Tp is the PCLK cycle) and outputs the line error Lerr by the phase difference Tv of the multi-phase clock signals VCLK0 through VCLK15.

The error calculation unit 83 may be configured to obtained the line error Lerr by the formula Lerr=diffN·K+diffM−RefM as in FIG. 4 by setting the reference time more precisely so that the pixel clock frequency can be controlled more precisely.

A modulated data generating unit 119 performs pulse width modulation according to image data based on the pixel clock signal PCLK generated by the pixel clock signal generating unit 118 shown FIG. 12. An exemplary configuration and operation of the modulated data generating unit 119 are described below.

Figure 20:
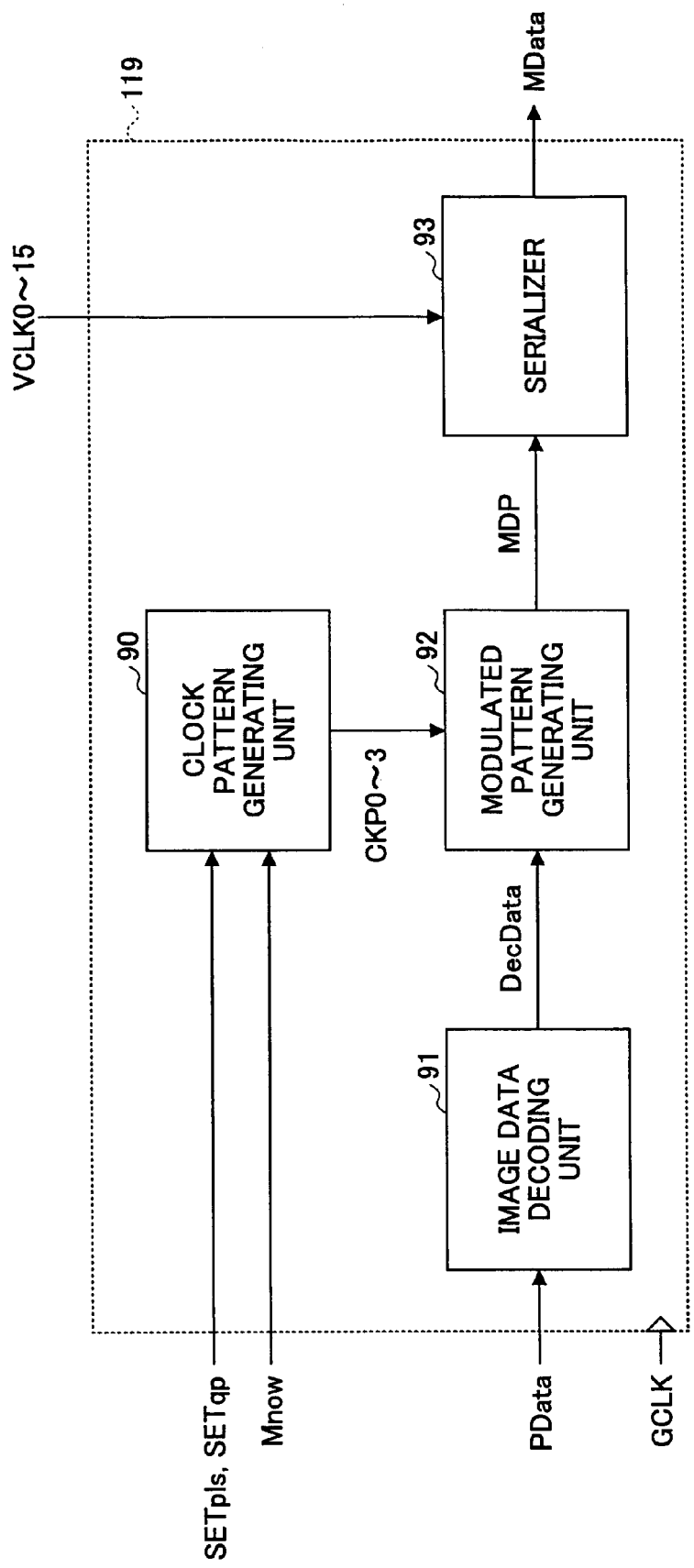
FIG. 20 is a block diagram illustrating an exemplary configuration of an exemplary modulated data generating unit.
Figure 21:
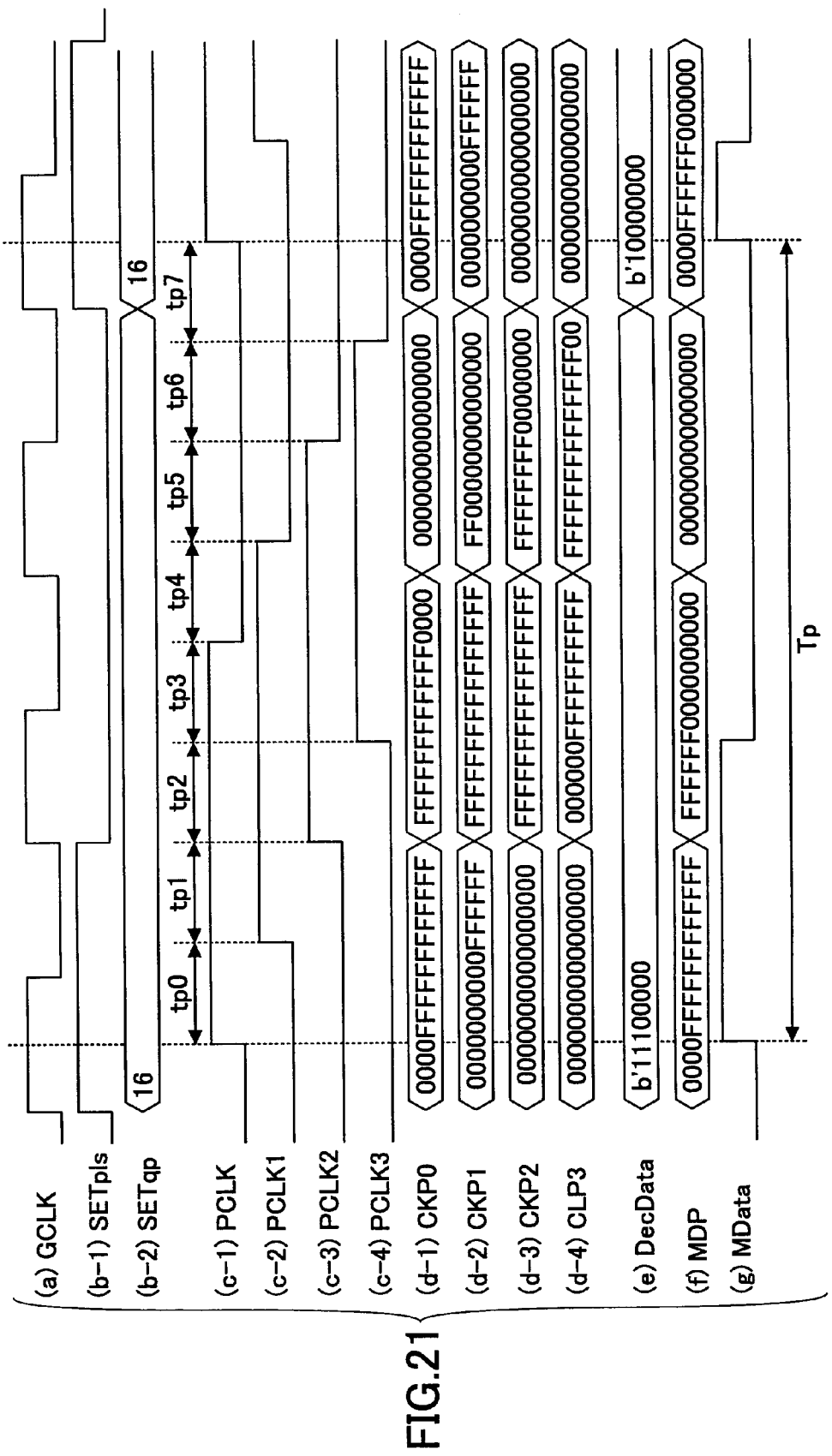
FIG. 21 is a timing chart of signals in the exemplary modulated data generating unit.

FIG. 20 is a block diagram illustrating an exemplary configuration of the modulated data generating unit 119. FIG. 21 is a timing chart of signals in the modulated data generating unit 119. An exemplary operation of the modulated data generating unit 119 is described below with reference to FIGS. 20 and 21. In this example, a process of generating modulated data MData according to image data PData by performing 8-bit pulse-width modulation is described.

The modulated data generating unit 119 operates based on the internal operation clock signal GCLK. A clock pattern generating unit 90 generates a clock pattern signals CKP (CKP0 through CKP3 that are delayed for 0, Π/8, Π/4, and 3Π/8 phases, respectively) each having a certain phase difference with respect to the pixel clock signal PCLK from the Set signal composed of SETpls and SETqp and provided from the pixel clock signal generating unit 118 and the pixel clock frequency specifying signal Mnow. Each of the clock pattern signals CKP changes based on GCLK and is 64 bit data corresponding to 64 periods Tqp obtained by dividing one GCLK cycle by the time information QP. When the period Tqp is high, the corresponding bit of the clock pattern signal CKP is high; and when the period Tqp is low, the corresponding bit of the clock pattern signal CKP is 0.

The clock pattern signals CKP are generated as described below. First, the modulated data generating unit 119 obtains offset data sofs0 through sofs3 indicating the rising edges of the clock pattern signals CKP and offset data rofs0 through rofs3 indicating the falling edges of the clock pattern signals CKP. In this example, sofs0=SETqp, sofs1=SETofs+Mnow/8, sofs2=SETofs+Mnow/4, and sofs3=SETofs+3Mnow/8. rofs0 through rofs3 are obtained by adding Mnow/2 to each of the sofs0 through sofs3. Then, the modulated data generating unit 119 converts, GCLK cycle by GCLK cycle, the bits in each of the clock pattern signals CKP. In each of the clock pattern signals CKP, bits from MSB to sofs are converted to 0s, bits from sofs to rofs are converted to 1s, and bits from rofs are converted to 0s.

When each offset data is 64 or larger, the above conversion is delayed for one GCLK cycle every 64. For example, when Mnow=192 and SETqp=16, sofs=40 and rofs=136 (=2 GCLK+8) for CKP1. In this case, among the bits corresponding to the first GCLK cycle, MSB (=63) to 24th bit are converted to 0s and 23rd to 0th bits are converted to 1s; the bits corresponding to the second GCLK cycle are all converted to 1s; and among the bits corresponding to the third GCLK cycle, 63rd to 56th bits are converted to 1s and 55th to 0th bits are converted to 0s.

An image data decoding unit 91 converts the image data PData into 8-bit pulse width modulated data DecData. The MSB through LSB of the pulse width modulated data DecData correspond to the eight periods obtained by dividing one cycle of the pixel clock signal PCLK. For example, PData=3 is converted into DecData='b11100000 ('b indicates binary notation). The image data decoding unit 91 may also be configured to convert PData=3 into DecData='b00000111 or to add a mode switching signal to image data so that the image data can be switched between PData and DecData. Also, any conversion method other than those described above may be used.

A modulated pattern generating unit 92 generates a modulated pattern signal MDP from the pulse width modulated data DecData and the clock pattern signals CKP0 through CKP3. The modulated pattern signal MDP, as in the case of the clock pattern signal s CKP, changes based on GCLK and is 64 bit data corresponding to 64 periods Tqp obtained by dividing one GCLK cycle by the time information QP.

A serializer 93 serially outputs the modulated pattern signal MDP Tv by Tv from MSB (in order of time) based on the multi-phase clock signals VCLK0 through VCLK15 and thereby generates modulated data MData.

The above process is described below in more detail with reference to FIG. 21. (a) GCLK indicates the internal operation clock signal GCLK. When (b-1) SETpls and (b-2) SETqp constituting the Set signal are supplied as shown in FIG. 21, the pixel clock signal PCLK is generated as shown by (c-1) PCLK. In this example, it is assumed that the value of the pixel clock frequency specifying signal Mnow is 192. Also, in FIG. 21, (c-2) PCLK1, (c-3) PCLK2, and (c-4) PCLK3 the phases of which are delayed for ΠΙ/8, ΠΙ/4, and 3ΠΙ/8, respectively, are provided solely for descriptive purposes ((c-2) PCLK1, (c-3) PCLK2, and (c-4) PCLK3 are not actually generated).

(d-1) through (d-4) are clock pattern signals CKP0 through CKP3 corresponding to PCLK and PCLK1 through PCLK3. Each of the clock pattern signals CKP0 through CKP3 is 64-bit data expressed by hexadecimal notation in order of time from MSB to LSB. Patterns (PT0 through PT7 in order of time) indicating eight periods (tp0 through tp7) obtained by time-dividing the pixel clock signal PCLK can be generated from the clock pattern signals CKP0 through CKP3. In other words, the following equations are true: PT0=CKP0&~CKP1, PT1=CKP1&~CKP2, . . . PT7= ~CKP3&~CKP0. In the above equations, & indicates AND operation and ~ indicates NOT-OR operation.

The pulse width modulated data DecData are converted as shown by (e) DecData. The modulated pattern signal MDP shown by (f) MDP is obtained by calculating the formula ({64{DecData[7−i]}}&PTi) repeatedly by changing "i" from 0 to 7 and by performing OR operation on the results. In the above formula, {64{DecData[i]}} is data obtained by concatenating 64 bits of DecData[i].

The modulated data MData shown by (g) MData are generated by serially outputting the modulated pattern signal MDP generated as described above. In this example, the pulse of the modulated data MData becomes high for the first three-eighth of the pixel clock cycle Tp and becomes low for the remaining five-eighth of the pixel clock cycle Tp.

The modulated data generating unit 119 may also be configured to generate the patterns PT0 through PT7 each indicating one-eighth of the PCLK cycle instead of the clock pattern signals CKP0 through CKP3 that are delayed for 0, ΠΙ/8, ΠΙ/4, and 3ΠΙ/8 phases, respectively, with respect to the pixel clock signal PCLK, and to generate the modulated pattern signal MDP from the patterns PT0 through PT7 and the pulse width modulated data DecData.

In the above example, the modulated data MData are generated by 8-bit pulse-width modulation. However, any other modulation technique may be used. For example, in the case of 16-bit pulse-width modulation, the image data decoding unit 91 converts the image data PData into 16-bit pulse-width modulated data DecData; the clock pattern generating unit 90 generates eight clock pattern signals CKP0 through CKP7 by delaying the phase of the pixel clock signal PCLK for ΠΙ/16 at a time; and the modulated pattern generating unit 92 generates the modulated pattern signal MDP.

The above configuration may be applied to the pixel clock signal output unit 58 shown in FIG. 12. In this case, the pixel clock signal output unit 58 generates the pixel clock signal PCLK by generating a clock pattern signal PCKP (the clock pattern signal CKP0 may be used as the clock pattern signal PCKP) and by serially outputting the clock pattern signal PCKP Tv by Tv from MSB (in order of time) in synchronization with the multi-phase clock signals VCLK0 through VCLK15.

As described above, in the pixel clock generating unit 118 having the second configuration, a pixel clock signal is generated based on the multi-phase clock signals VCLK0 through VCLK15 generated with high precision and the pixel clock frequency is controlled taking into account the variation in scanning time. Thus, the pixel clock generating unit 118 can generate a pixel clock signal that makes it possible to accurately correct the error in average scanning speed. Also, the pixel clock signal generating unit 118 controls the pixel clock frequency for each reflecting surface of a polygon mirror and is therefore able to generate a pixel clock signal that can accurately correct the error in scanning speed for each reflecting surface.

Further, since the pixel clock frequency is accurately controlled on the time scale of the phase difference Tv between the multi-phase clock signals VCLK0 through VCLK15, it is not necessary to increase the oscillation frequency of the multi-phase clock signal. This makes it easier to design a circuit and makes it possible to reduce the power consumption. For example, compared with the pixel clock signal generating unit 111 with the first configuration, the oscillation frequency of the multi-phase clock signals used by the pixel clock signal generating unit 118 with the second configuration may be reduced to one-sixteenth to generate the pixel clock signal at the same resolution. In other words, when the oscillation frequencies are the same, the pixel clock signal generating unit 118 can generate the pixel clock signal at a resolution 16-times higher than that of the pixel clock signal generating unit 111. Thus, the pixel clock signal generating unit 118 can generate a highly accurate pixel clock signal. Also, most parts of the pixel clock signal generating unit 118 operate based on the internal operation clock signal GCLK obtained by dividing the frequency of one of the multi-phase clock signals VCLK0 through VCLK15. Therefore, the pixel clock signal generating unit 118 requires less power than the pixel clock signal generating unit 111.

Further, using the pixel clock generating unit 118 in an image forming apparatus makes it possible to form a high-quality image based on a pixel clock signal that can accurately correct the error in scanning speed.

Second Embodiment

Figure 22:
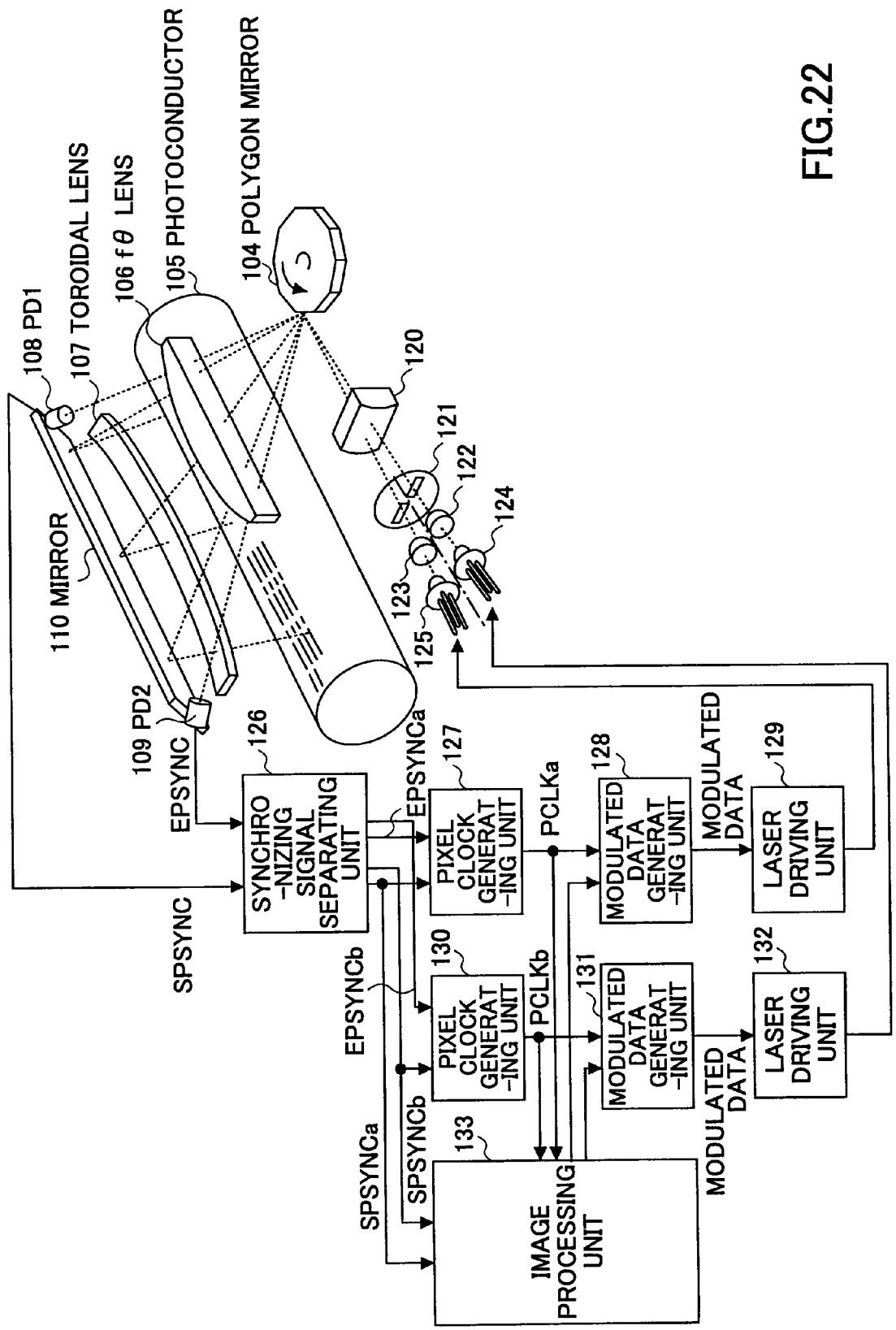
FIG. 22 is a drawing illustrating an exemplary configuration of an image forming apparatus according to a second embodiment of the present invention.

An image forming apparatus according to a second embodiment of the present invention is described below. FIG. 22 is a drawing illustrating an exemplary configuration of an image forming apparatus according to the second embodiment of the present invention. The exemplary image forming apparatus of the second embodiment differs from the exemplary image forming apparatus of the first embodiment in that a multi-beam scanning optical system, where an image (electrostatic latent image) is formed on a photoconductor by scanning multiple light beams from multiple light sources using the same scanning optical system, is used.

As shown in FIG. 22, semiconductor lasers 124 and 125 are positioned so that their light axes conform to the light axes of collimate lenses 122 and 123, their light-emission angles become symmetric in the main scanning direction, and their light-emission axes intersect with each other at a reflecting point on a polygon mirror 104. Multiple laser beams emitted from the semiconductor lasers 124 and 125 pass through the cylinder lens 120, are deflected and scanned by the polygon mirror 104, and form an image on a photoconductor 105 via an fθ lens 106, a mirror 110, and a toroidal lens 110. One line of image data is stored in an image processing unit 133 for each of the semiconductor lasers 124 and 125. Two lines of image data are retrieved for each reflecting surface of the polygon mirror 104 from the image processing unit 133 and are recorded at a time on the photoconductor 105.

A photodetector PD1 (108) and a photodetector PD2 (109) are provided on the corresponding ends of the mirror 110. The photodetectors PD1 and PD2 detect the start and end of scanning, respectively. More specifically, each of the laser beams emitted from the semiconductor lasers 124 and 125 and deflected by the polygon mirror 104 enters PD1 before scanning a line on the photoconductor 105 and enters PD2 after scanning the line.

The photodetectors PD1 and PD2 convert the entering laser beam into a first synchronizing signal SPSYNC and a second synchronizing signal EPSYNC, respectively, and send the first and second synchronizing signals SPSYNC and EPSYNC to a synchronizing signal separating unit 126. The semiconductor lasers 124 and 125 are configured to scan the photoconductor 105 at slightly different timings. Therefore, the synchronizing signal separating unit 126 separates the first synchronizing signal SPSYNC into synchronizing signals SPSYNCa and SPSYNCb corresponding to the semiconductor lasers 124 and 125 and separates the second synchronizing signal EPSYNC into synchronizing signals EPSYNCa and EPSYNCb corresponding to the semiconductor lasers 124 and 125.

Figure 23:
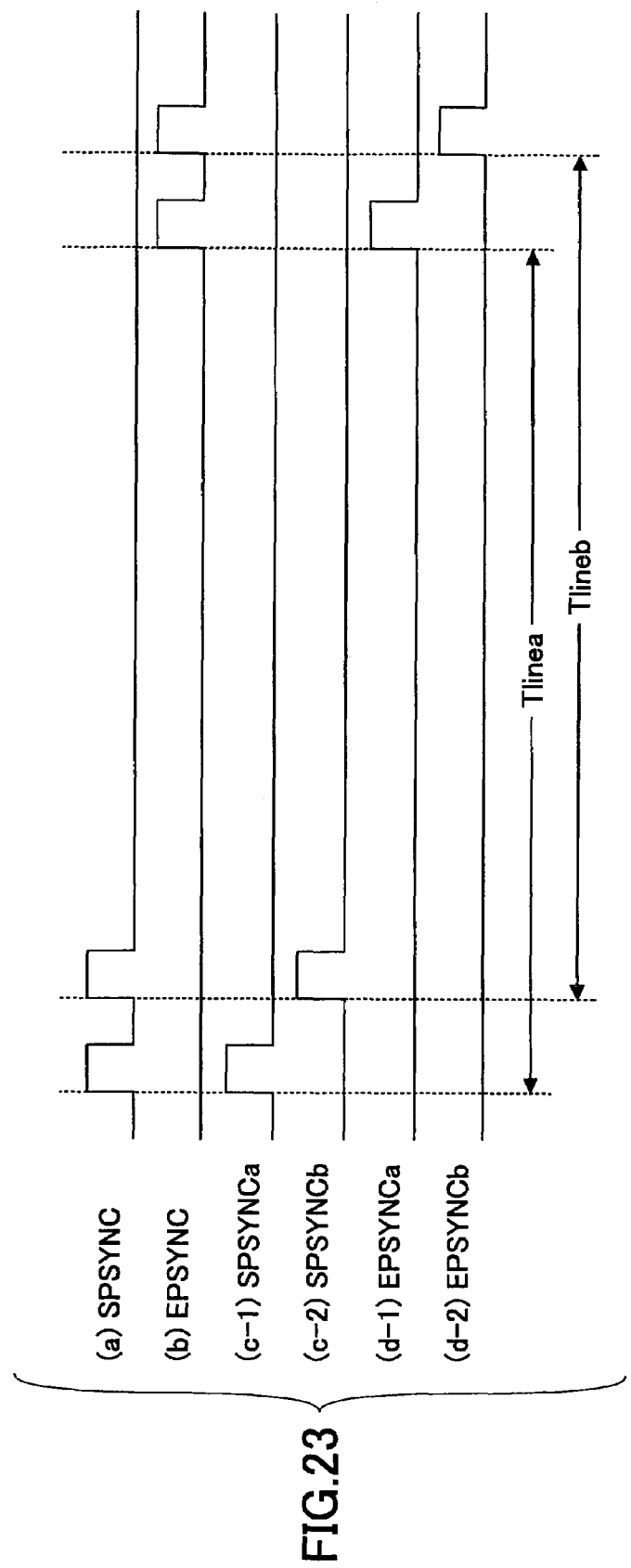
FIG. 23 is a timing chart of synchronizing signals from photodetectors.

FIG. 23 is a timing chart of the synchronizing signals from the photodetectors PD1 and PD2. (a) shows the first synchronizing signal SPSYNC and (b) shows the second synchronizing signal EPSYNC. The synchronizing signal SPSYNC shown by (a) SPSYNC is separated into (c-1) SPSYNCa and (c-2) SPSYNCb. In the example shown in FIG. 23, (c-1) SPSYNCa corresponds to the laser beam from the semiconductor laser 125. Similarly, the synchronizing signal EPSYNC shown by (b) EPSYNC is separated into (d-1) EPSYNCa and (d-2) SPSYNCb.

As shown in FIG. 22, the synchronizing signals SPSYNCa and EPSYNCa are supplied to a pixel clock signal generating unit 127 and the synchronizing signals SPSYNCb and EPSYNCb are supplied to a pixel clock signal generating unit 130.

The pixel clock signal generating unit 127 calculates scanning time Tlinea based on the synchronizing signals SPSYNCa and EPSYNCa and generates a pixel clock signal PCLKa with a frequency that is determined so that a specific number of cycles occur during the scanning time Tlinea. The image processing unit 133 generates image data a based on the pixel clock signal PCLKa.

A modulated data generating unit 128 generates modulated data a from the image data a based on the pixel clock signal PCLKa and thereby causes a laser driving unit 129 to drive the semiconductor laser 125.

Similarly, the pixel clock signal generating unit 130 generates a pixel clock signal PCLKb based on the synchronizing signals SPSYNCb and EPSYNCb; the image processing unit 133 generates image data b based on the pixel clock signal PCLKb; and a modulated data generating unit 131 generates modulated data b from the image data b and causes a laser driving unit 132 to drive the semiconductor laser 124.

Each of the pixel clock signal generating units 127 and 130 has substantially the same configuration and function as those of the pixel clock signal generating unit 111 or the pixel clock signal generating unit 118. Therefore, detailed descriptions of the pixel clock signal generating units 127 and 130 are omitted here. Also, descriptions of the modulated data generating units 128 and 131 are omitted for a similar reason.

In this embodiment, the high-frequency clock signal generating unit 1 or 51 may be provided as a common unit for the pixel clock signal generating units 127 and 130 to reduce the circuit size and the power consumption. Also, the first and second edge detecting units 2 and 3 (or 52 and 53) for detecting the rising edges of the synchronizing signals may be provided as common units for the pixel clock signal generating units 127 and 130 and configured to supply the corresponding detection pulse to each of the pixel clock signal generating units 127 and 130.

Further, since parts of the calculations by the filter 6 or 56 and the frequency calculation unit 7 or 57 are performed only once for each scan line, these units may be provided as common units for the pixel clock signal generating units 127 and 130 and configured to process pixel clock frequency calculations in chronological order.

In the exemplary image forming apparatus according to the second embodiment, the frequencies of the pixel clock signals PCLKa and PCLKb for the two light sources are controlled separately taking into account the variation in scanning speed. Therefore, even when the scanning speed differs depending on the light source as describe in "(3) Error in scanning speed relating to light source" or even when scanning speeds of two light beams differ because of chromatic aberration in a scanning optical system that is caused by different oscillation wavelengths of the two light sources (even when the scanning time Tlinea and the scanning time Tlineb shown in FIG. 23 vary independently), the exemplary image forming apparatus according to the second embodiment can accurately correct the error in scanning speed and thereby form a high quality image.

The multi-beam scanning optical system in the exemplary image forming apparatus may be configured to include a semiconductor laser array instead of multiple semiconductor lasers and to scan multiple laser beams emitted from the semiconductor laser array using the same scanning optical system. The embodiments of the present invention are also applicable to such a multi-beam scanning optical system. Also, although detailed descriptions and figures are omitted, the embodiments of the present invention are even applicable to other types of scanning optical systems than those described above.

Third Embodiment

An image forming apparatus according to a third embodiment of the present invention is described below. The exemplary image forming apparatus according to the third embodiment is a color image forming apparatus including photoconductors for cyan, magenta, yellow, and black and a scanning optical system for each of the photoconductors, where an image (electrostatic latent image) for the corresponding color is formed on each of the photoconductors. A color image is formed by transferring the electrostatic latent images onto an image forming medium (for example, paper).

For example, the exemplary image forming apparatus according to the third embodiment can be implemented by combining four of the image forming apparatuses shown in FIG. 1. Also, there is an image forming apparatus in which some units of the scanning optical systems are provided as common units to reduce the size of the image forming apparatus. However, even in this case, since the paths of light beams from the light sources to the photoconductors are different, it can be assumed that the image forming apparatus includes multiple image forming apparatuses.

Figure 24A:
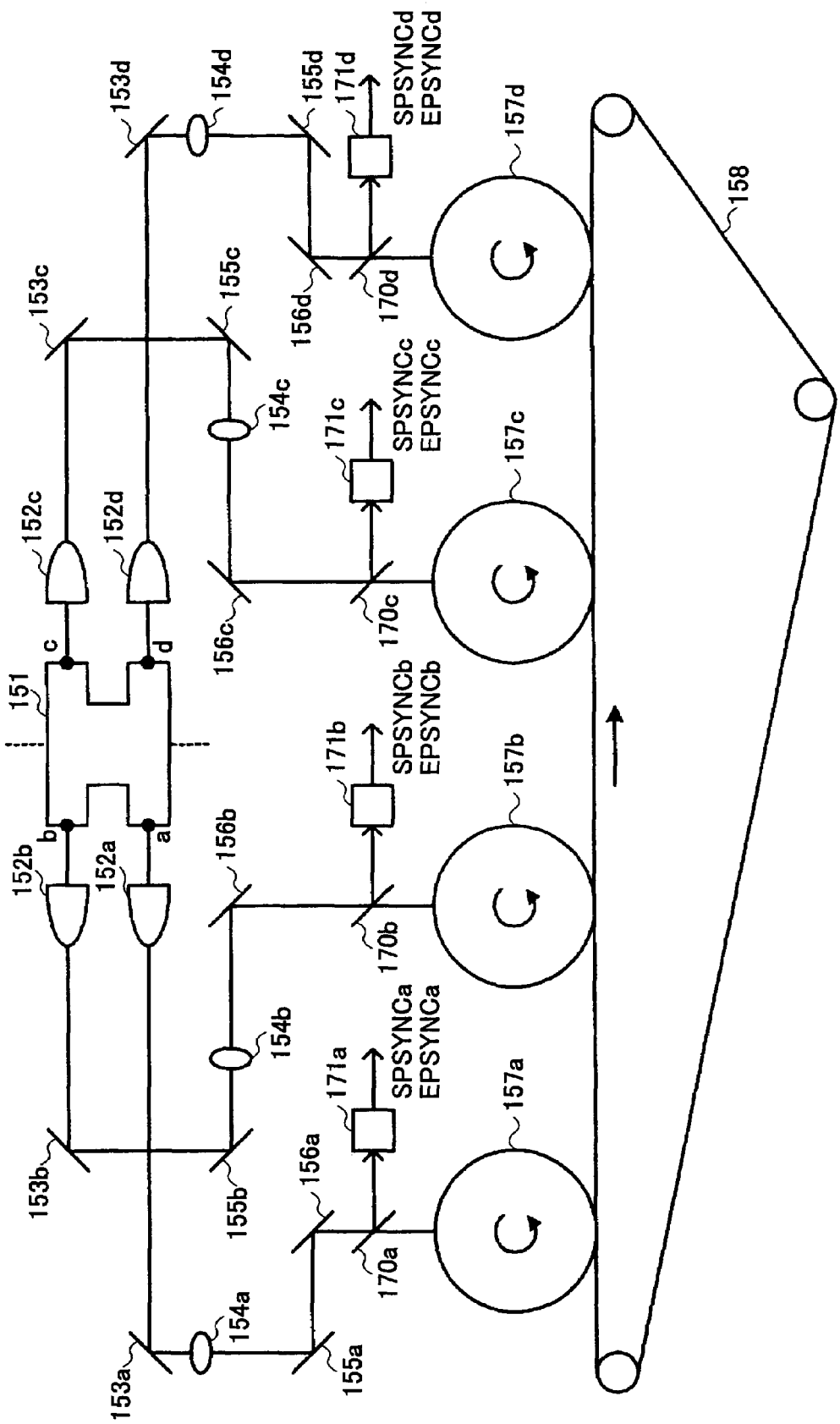
FIGS. 24A and 24B are drawings illustrating an exemplary configuration of an image forming apparatus according to a third embodiment of the present invention.
Figure 24B:
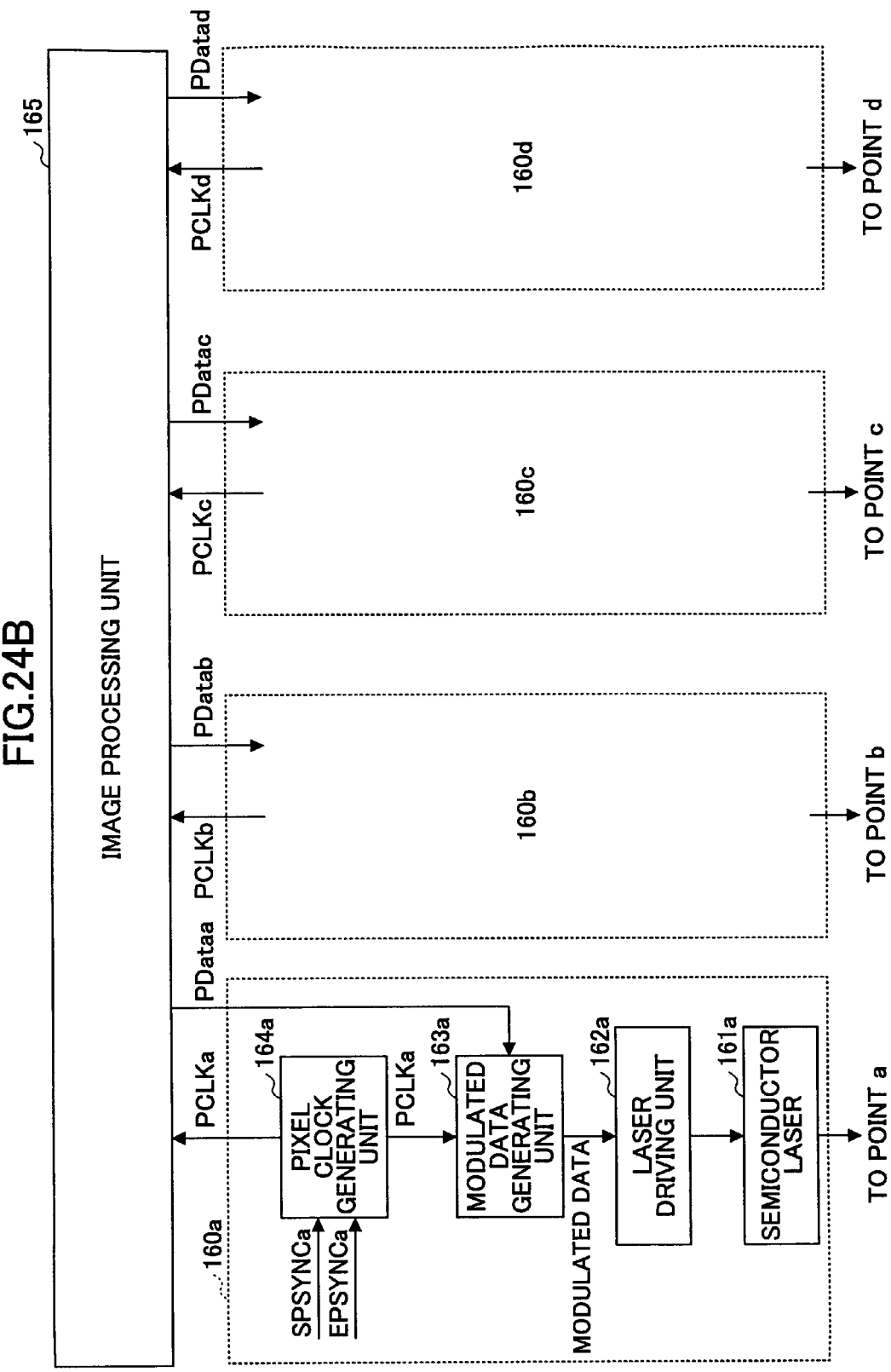

FIGS. 24A and 24B are drawings illustrating an exemplary configuration of the exemplary image forming apparatus according to the third embodiment of the present invention. The exemplary image forming apparatus according to the third embodiment is described below with reference to FIGS. 24A and 24B.

As shown in FIG. 24A, a polygon mirror 151 has two disks, rotates around an axis shown by a dotted line, and is used by four scanning optical systems as a common unit. A laser beam emitted from a semiconductor laser 161a shown in FIG. 24B passes through a collimator lens and a cylinder lens (not shown) and is deflected by the polygon mirror 151 at point a. Similarly, laser beams emitted from semiconductor lasers 161b through 161d (not shown) are deflected by the polygon mirror 151 at points b through d, respectively. Each of the deflected laser beams passes through scanning lenses 152 and 154, is reflected by reflecting mirrors 153, 155, and 156, scans a photoconductor 157 in the main scanning direction (in a direction perpendicular to the plane of FIG. 24A), and thereby forms an image (electrostatic latent image) on the photoconductor 157. Symbols a through d attached to the reference numbers in FIGS. 24A and 24B correspond to the semiconductor lasers 161a through 161d for forming yellow, magenta, cyan, and black images. The yellow, magenta, cyan, and black images formed on the photoconductors 157a through 157d are transferred onto an image forming medium placed on an intermediate transfer belt 158 and moved in the arrow direction. As a result, a color image is formed on the image forming medium.

Mirrors 170 placed at the corresponding ends of the photoconductor 157 outside of its effective scanning area lead the laser beam to the photodetectors 171. The photodetectors 171 detect the start and end of scanning and generate the synchronizing signals SPSYNC and EPSYNC. The synchronizing signals SPSYNC and EPSYNC are supplied to a pixel clock signal generating unit 164 and the pixel clock signal generating unit 164 generates the pixel clock signal PCLK with a frequency that is determined so that the error in scanning speed is corrected. An image processing unit 165 generates image data PData based on the pixel clock signal PCLK. A modulated data generating unit 163 generates modulated data from the image data PData based on the pixel clock signal PCLK and thereby causes a laser driving unit 162 to drive the semiconductor laser 161. The above process is performed for each of the semiconductor lasers 161a through 161d for forming yellow, magenta, cyan, and black images.

The first configuration or the second configuration of the pixel clock signal generating unit described above may be applied to the pixel clock generating unit 164. The scanning speeds of the scanning optical systems in the exemplary image forming apparatus may differ because of inaccurate production and assembly of parts and deformation of the parts over time. Also, the distance between the two photodetectors for detecting the start and end of scanning may vary because of inaccurate assembly. Therefore, it is preferable to obtain the reference value RefN used for the pixel clock frequency control in advance for each of the scanning optical systems, for example, at the production stage (the reference value RefN may be changed when the image quality is degraded over time) and to supply the obtained reference value RefN to the pixel clock signal generating unit 164.

Further, the scanning start detection position of the synchronizing signal SPSYNC may vary depending on the scanning optical system. Therefore, it is preferable to configure each of the scanning optical systems to start writing an image after a predetermined period of time (after a predetermined number of cycles of the pixel clock signal PCLK; the period of time is hereafter called a writing start offset) from the rise of the synchronizing signal SPSYNC and to obtain the writing start offset for each of the scanning optical systems in advance.

Figure 25:
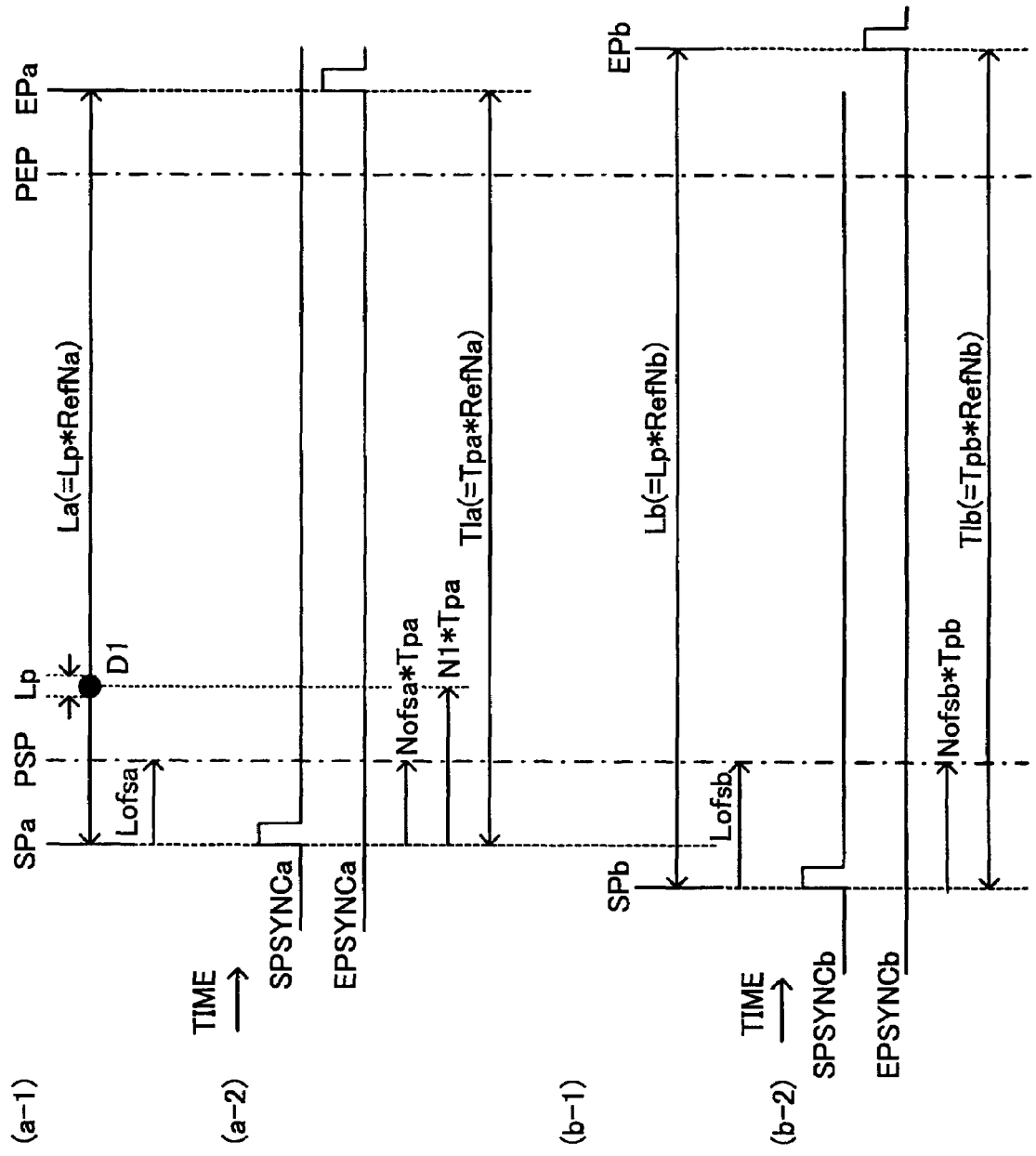
FIG. 25 is a drawing illustrating a relationship between scanning time and a scan width in each scanning optical system.
Figure 26:
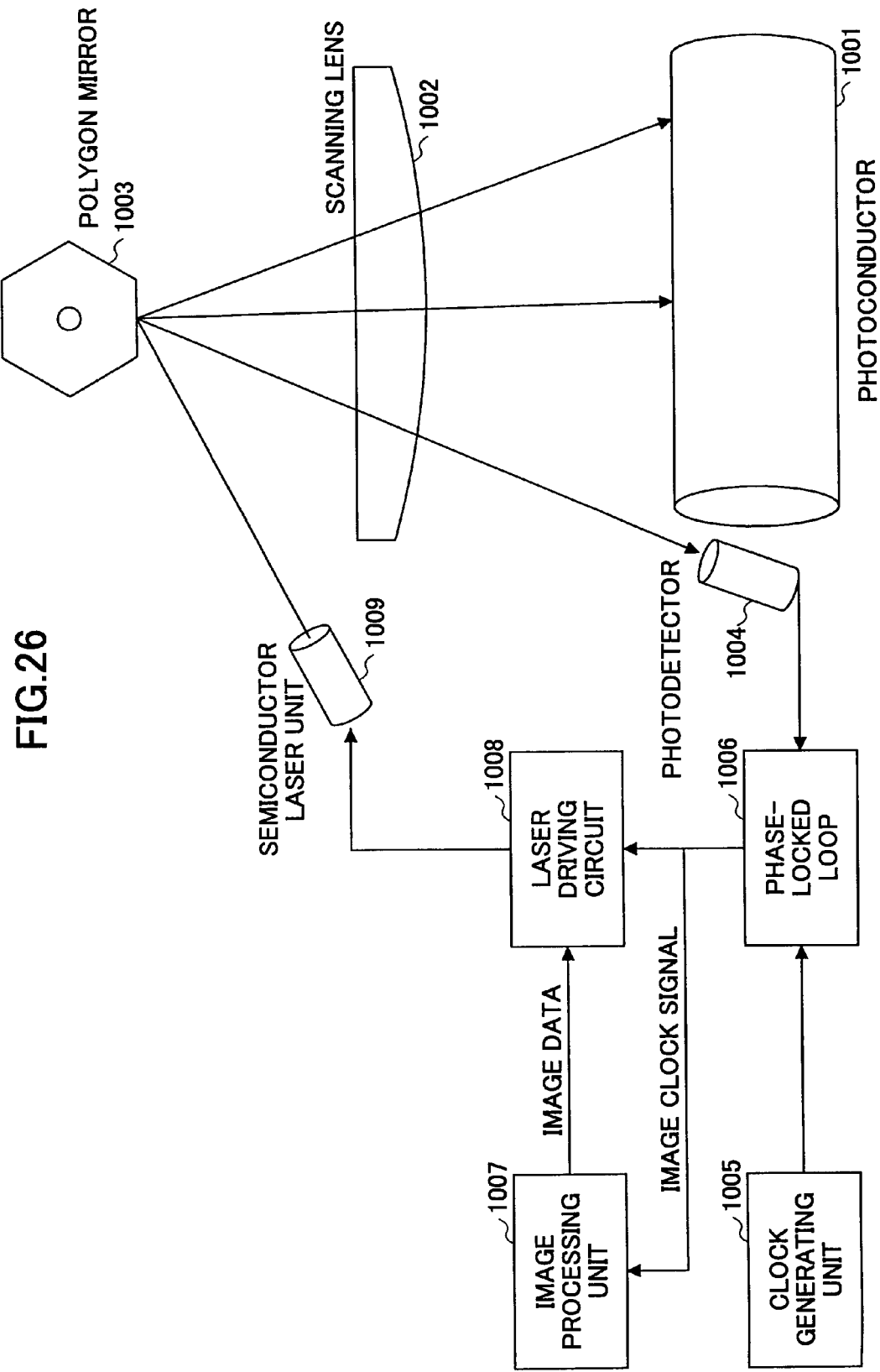
FIG. 26 is a drawing illustrating an exemplary configuration of a conventional image forming apparatus.
Figures 27A, 27B:
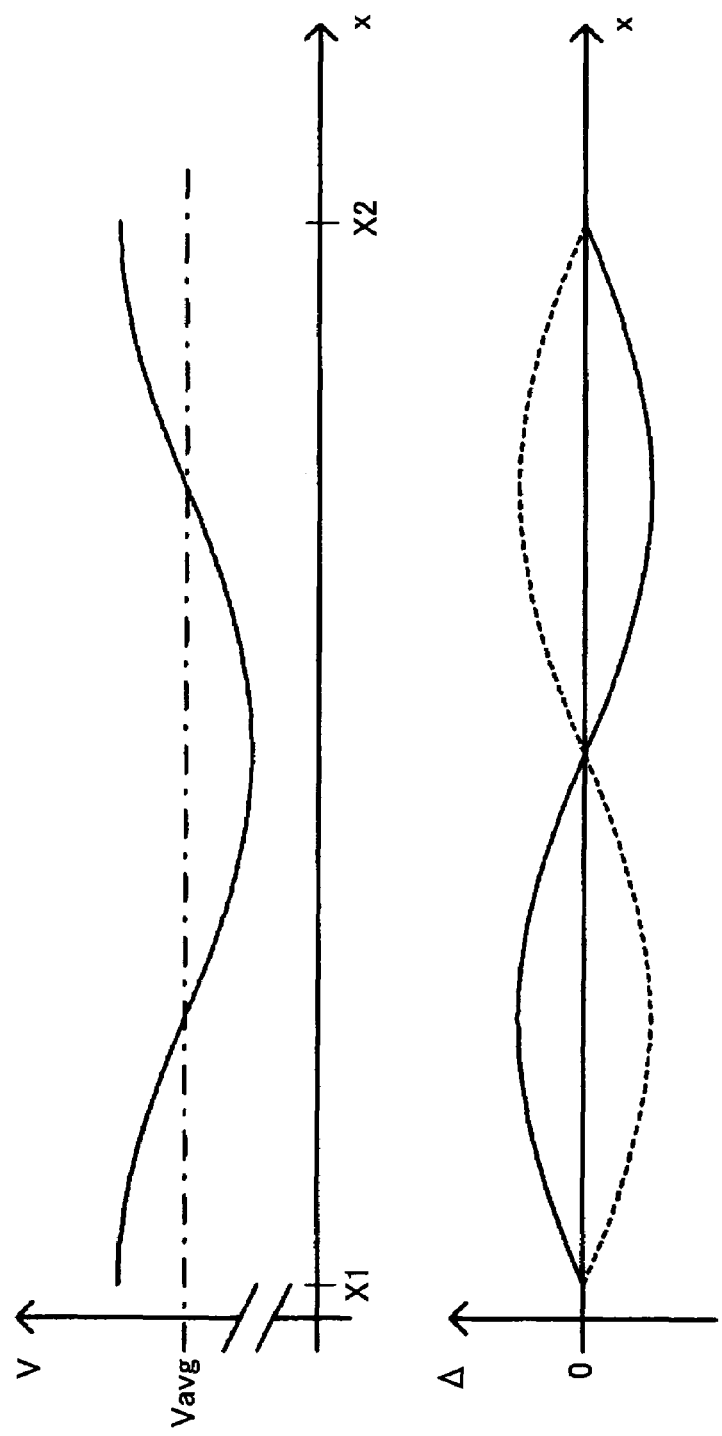
FIGS. 27A and 27B are graphs showing exemplary non-linear error in scanning speed during the scanning of a line.

FIG. 25 is a drawing illustrating a relationship between scanning time and a scan width in each of the scanning optical systems. (a-1) shows a line scan width of a scanning optical system a. A scanning start position SPa and a scanning end position EPa are positions on the photoconductor corresponding to the positions of the photodetectors for detecting the start and end of scanning. La indicates the distance between SPa and EPa. When the width of one image dot is Lp, the number of dots RefNa in one scan line is obtained by La/Lp. In this case, the number of dots RefNa is used as the reference value RefN. An image is formed in an area between PSP and PEP. (a-2) shows line scanning time Tla of the scanning optical system a.

The synchronizing signals SPSYNC and EPSYNC are detected at positions corresponding to the scanning start position SP and the scanning end position EP. The line scanning time Tla is the period of time between the synchronizing signals SPSYNC and EPSYNC. Although the line scanning time Tla changes because of various factors as described above, since a pixel clock cycle Tpa is controlled so that Tpa=Tla/RefNa becomes true, writing pulses to be output are controlled so as to form dots (D1 and D2) always in the same positions on the scan line after predetermined PCLK cycles (N1 and N2) from the synchronizing signal SPSYNC. In FIG. 25, writing of an image is started after Nofsa cycles.

Similarly, (b-1) shows a line scan width of a scanning optical system b and Lb indicates the distance between a scanning start position SPb and a scanning end position EPb. In this case, Lb/Lp=RefNb is used as the reference value RefN. (b-2) shows line scanning time Tlb of the scanning optical system b. The line scanning time Tlb is the period of time between the synchronizing signals SPSYNC and EPSYNC. A pixel clock cycle Tpb is controlled so that Tpb=Tlb/RefNb becomes true. Also, a writing start offset Nofsb is determined taking into account the distance between the scanning start positions SPa and SPb so that an image is formed in the area between PSP and PEP as in the case of the scanning optical system a. In other words, an image can be formed in the area between PSP and PEP regardless of the scanning optical system.

In the exemplary image forming apparatus according to the third embodiment, the frequencies of the pixel clock signals PCLK for the light sources corresponding to different colors are controlled separately taking into account the error in scanning speed or the difference in scanning speed between the light sources. Therefore, even when the scanning speed varies because of the difference in scanning speed between the light sources or because of other factors, the exemplary image forming apparatus according to the third embodiment can form a high quality image without causing color shift and without reducing color reproducibility and image resolution.

As described above, the first through third embodiments of the present invention make it possible to accurately correct the scanning speed errors described in (1) through (4) in "2. Description of the Related Art". Also, a fourth embodiment of the present invention described below makes it possible to accurately correct the nonlinear error in scanning speed.

Fourth Embodiment

Figure 28:
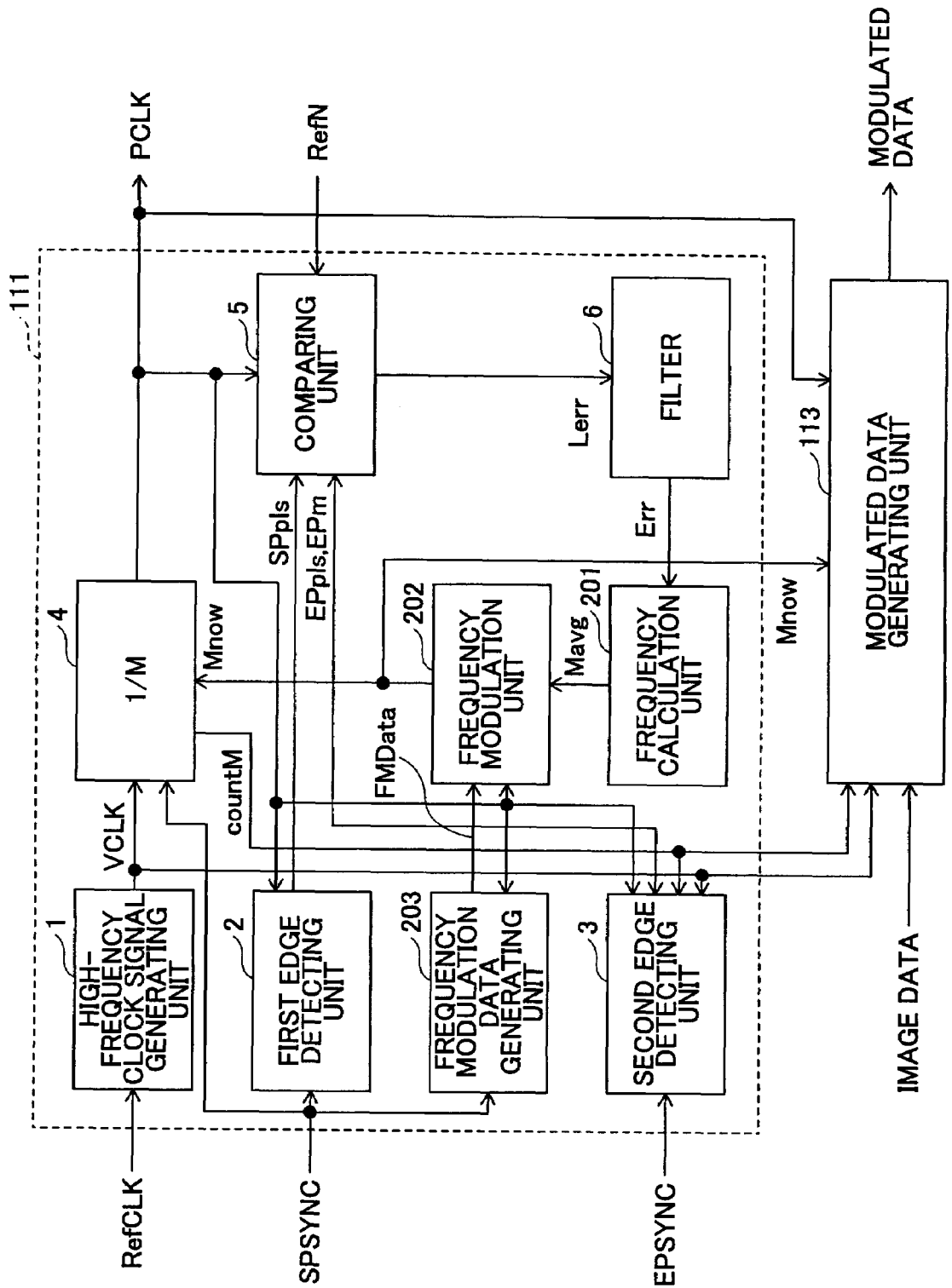
FIG. 28 is a block diagram illustrating a third exemplary configuration of a pixel clock signal generating unit.

The fourth embodiment of the present invention is described below with reference to the accompanying drawings. FIG. 28 is a block diagram illustrating a third exemplary configuration of a pixel clock signal generating unit. A pixel clock signal generating unit 111 shown in FIG. 28 may be used as the pixel clock signal generating unit of each of the exemplary image forming apparatuses shown in FIGS. 1, 22, 24A, and 24B. In FIG. 28, the same reference numbers are used for parts corresponding to those shown in FIG. 2, and descriptions of those parts are omitted.

A frequency calculation unit 201 calculates an appropriate pixel clock frequency based on the error data Err in substantially the same manner as the frequency calculation unit 7 shown in FIG. 2 and outputs the calculated pixel clock frequency as an average pixel clock frequency signal Mavg.

A frequency modulation unit 202 converts the average pixel clock frequency signal Mavg into a pixel clock frequency specifying signal Mnow for frequency modulation according to a frequency modulation data FMData supplied from a frequency modulation data generating unit 203 described later, and supplies the pixel clock frequency specifying signal Mnow to a frequency divider 4. The frequency divider 4 generates the pixel clock signal PCLK by dividing the frequency of the high-frequency clock signal VCLK according to the pixel clock frequency specifying signal Mnow. Therefore, the frequency of the pixel clock signal PCLK can be modulated by modulating the average pixel clock frequency signal Mavg.

The frequency modulation data generating unit 203 generates the frequency modulation data FMData corresponding to a scan position n (the number of cycles n of the pixel clock signal PCLK) relative to the first synchronizing signal SPSYNC. The frequency modulation data FMData are the difference between a pixel clock frequency corresponding to a scanning speed V(n) at the scan position n and the average pixel clock frequency signal Mavg. In this example, the pixel clock frequency corresponding to a scanning speed V(n) at the scan position n is expressed by a frequency dividing ratio M(n) for dividing the frequency of the high-frequency clock signal VCLK.

Figure 29:
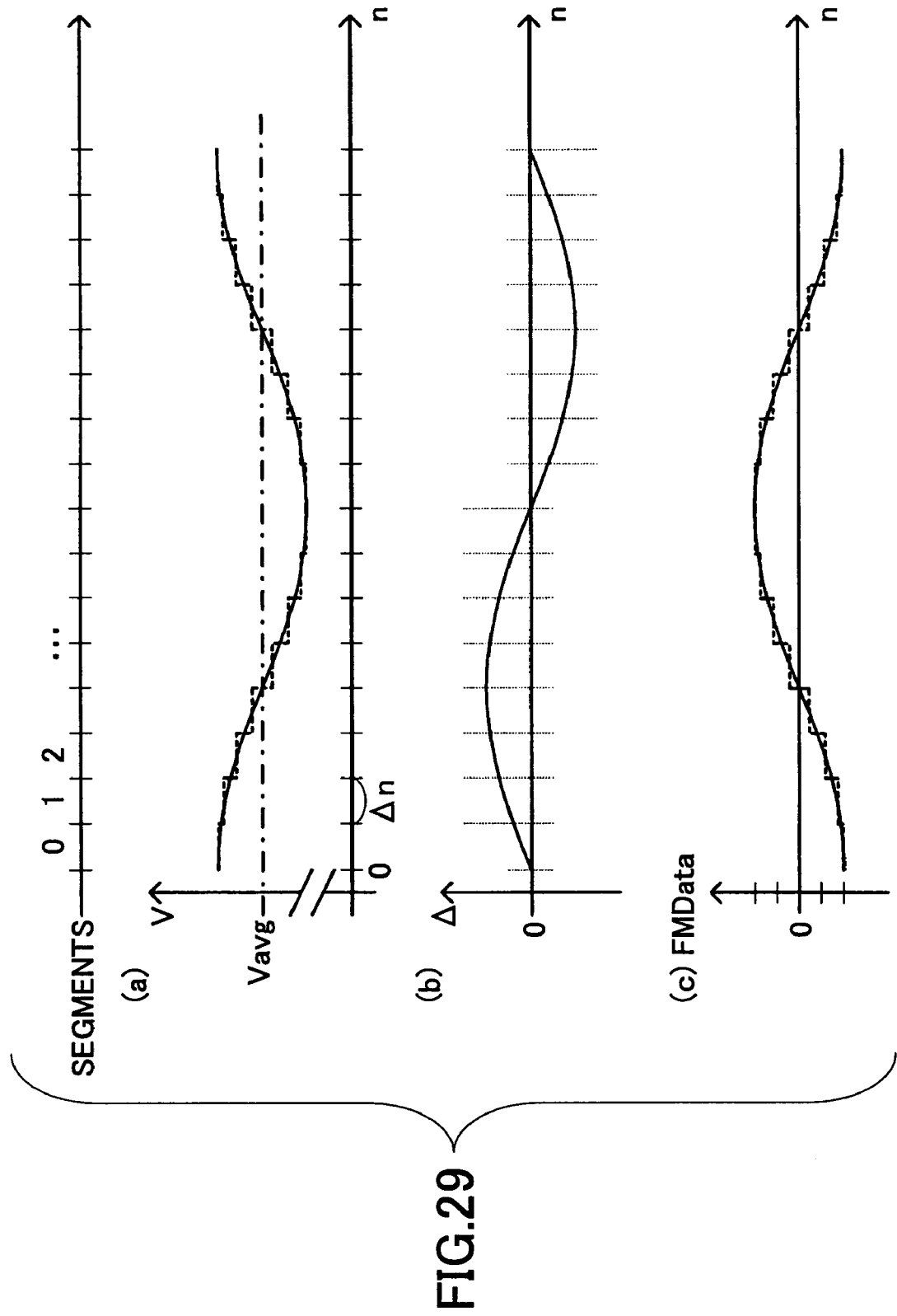
FIG. 29 is a drawing showing examples of scanning speed V(n), deviation Δ(n) from desired position, and frequency modulation data FMData(n)

FIG. 29 is a drawing showing examples of scanning speed V(n) (FIG. 29(a)), deviation Δ(n) from desired position (FIG. 29(b)), and frequency modulation data FMData(n) (FIG. 29(c)). The deviation Δ from desired position is the integral of V(n)−Vavg. Nonlinear error in scanning speed is mainly caused by inaccurate production and assembly of parts of a scanning optical system. Therefore, it is preferable to obtain and store the frequency modulation data FMData in advance, for example, at the production stage. An exemplary method of obtaining the frequency modulation data FMData is described below. First, the deviation Δ from desired position is measured at each scan position while performing scanning with a certain pixel clock frequency. Since the differential of the deviation Δ is the scanning speed V, a pixel clock frequency is obtained from the deviation Δ. Then, the difference between the pixel clock frequency and the average pixel clock frequency signal Mavg is obtained. In a simpler method, a scanning speed V' is approximated from the slope between certain scan positions (segment Δn shown in FIG. 29) and the frequency modulation data FMData (dotted lines in FIG. 29) for the segment Δn are obtained based on the scanning speed V'. This method makes it possible to easily obtain the frequency modulation data FMData. Also, since the obtained frequency modulation data FMData can be used throughout the segment Δn, this method makes it possible to reduce the amount of memory for storing the frequency modulation data FMData. The error in scanning speed can be corrected more accurately by reducing the length of the segment Δn. In short, the frequency modulation data FMData is the difference ΔM between the frequency dividing ratio M and the average pixel clock frequency signal Mavg. In this case, the pixel clock frequency specifying signal Mnow can be obtained by adding the average pixel clock frequency signal Mavg and the difference ΔM.

Also, it is preferable to include not only the frequency dividing ratio M but also its fraction part in the frequency modulation data FMData to perform the pixel clock frequency modulation more accurately. The fraction part may be treated in substantially the same manner as in the case of the value C in FIG. 5 or the value F in FIG. 8. Further, when performing the pixel clock frequency modulation segment (Δn) by segment, setting the segment Δn to an integral multiple (1 or larger) of Na (Na=2^a, a is the number of digits of binary fraction) makes the calculation easier. In the descriptions below, it is assumed that the frequency modulation data FMData include an integer part ΔM and an a-digit fraction part ΔF.

Parts of the pixel clock signal generating unit 111 with the third configuration are described in more detail below. The frequency calculation unit 201 has substantially the same configuration as that of the frequency calculation unit 7 shown in FIG. 8 except that the counter 30, the converting unit 31, and the adder 32 are removed from the configuration of the frequency calculation unit 201. The functions of the counter 30, the converting unit 31, and the adder 32 are provided by the frequency modulation unit 202. The frequency calculation unit 201 outputs the value M from the selecting unit 28 and the value F from the selecting unit 29 as the average pixel clock frequency signal Mavg.

Figure 30:
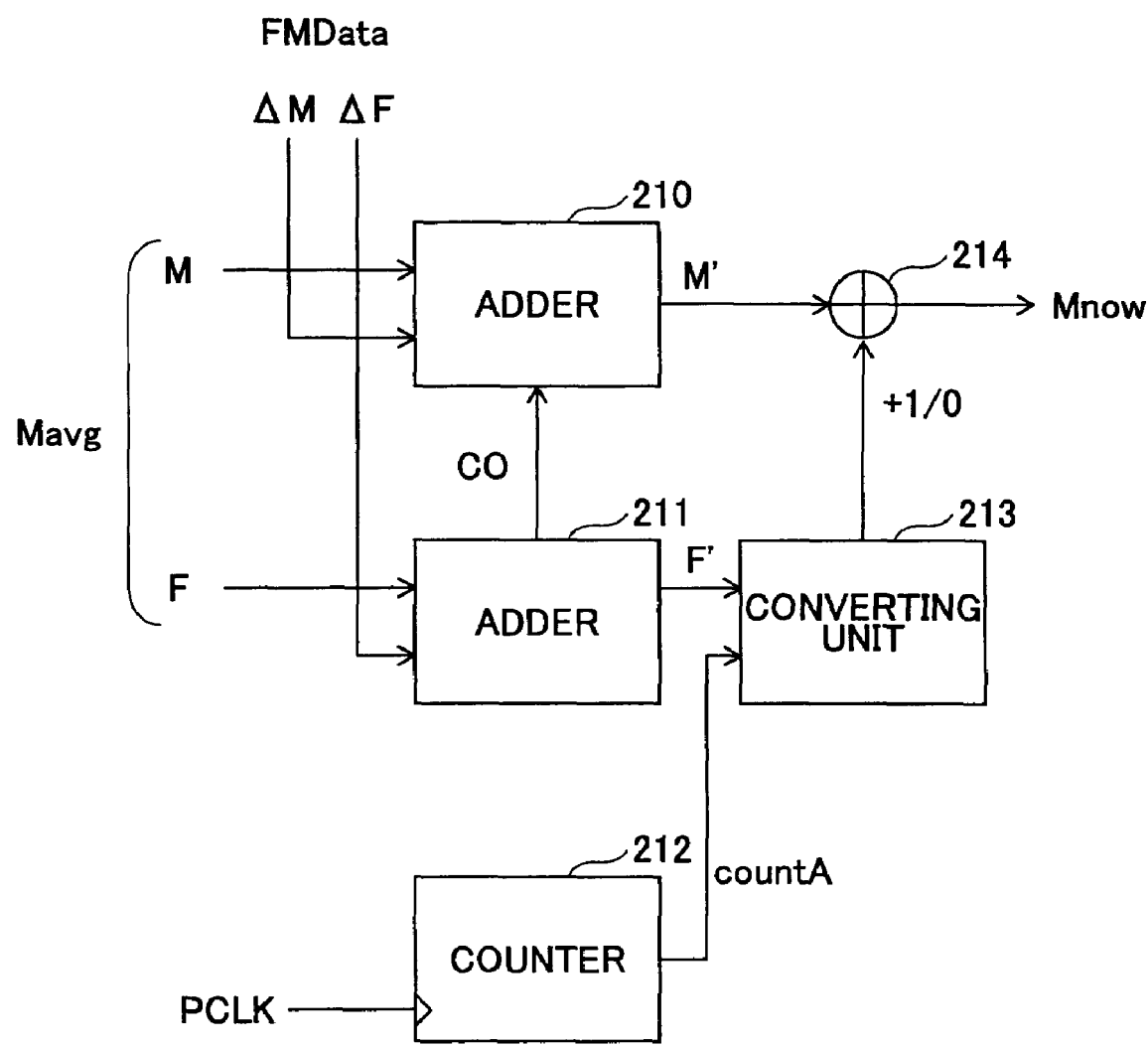
FIG. 30 is a block diagram illustrating an exemplary configuration of an exemplary frequency modulation unit.

FIG. 30 is a block diagram illustrating an exemplary configuration of the frequency modulation unit 202. The frequency modulation unit 202 obtains frequency data (M', F') by adding the average pixel clock frequency signal Mavg (M, F) and the frequency modulation data FMData (ΔM, ΔF) and converts the frequency data (M', F') into the pixel clock frequency specifying signal Mnow. ΔM is either a positive number or a negative number, and ΔF is a positive number. An adder 211 obtains F' by adding F and ΔF. When the addition produces a carry, the adder 211 outputs a carry signal CO. An adder 210 obtains M' by adding M, ΔM, and the carry signal CO. A counter 212, a converting unit 213, and an adder 214 have substantially the same functions, respectively, as those of the counter 30, the converting unit 31, and the adder 32 shown in FIG. 8, and convert M' and F' into the pixel clock frequency specifying signal Mnow. Further descriptions of the counter 212, the converting unit 213, and the adder 214 are omitted here.

Figure 31:
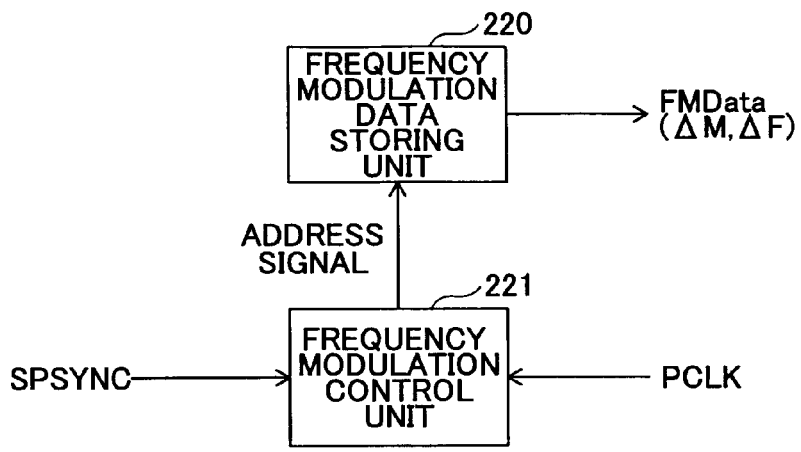
FIG. 31 is a block diagram illustrating an exemplary configuration of an exemplary frequency modulation data generating unit.

FIG. 31 is a block diagram illustrating an exemplary configuration of the frequency modulation data generating unit 203. A frequency modulation data storing unit 220 stores the frequency modulation data FMData for each segment (Δn) in a scan line. The frequency modulation data FMData are associated with an address that is the number of the corresponding segment. The frequency modulation data storing unit 220 outputs the frequency modulation data FMData in response to a corresponding address signal. The frequency modulation data FMData are obtained in advance as described above. The exemplary image forming apparatus may be configured to store the obtained frequency modulation data FMData in another storing unit and to load the frequency modulation data FMData into the frequency modulation data storing unit 220 when the exemplary image forming apparatus is activated. A frequency modulation control unit 221 generates the address signal from the number of each segment (Δn) in a scan line. When receiving the synchronizing signal SPSYNC, the frequency modulation control unit 221 resets the address to 0 and starts counting the cycles of the pixel clock signal PCLK. Each time when the count reaches the length of the segment Δ n, the frequency modulation control unit 221 increments the address signal. The frequency modulation control unit 221 may be configured to receive the detection pulse SPpls instead of the synchronizing signal SPSYNC. Also, the frequency modulation control unit 221 may be configured to increment the address signal every time when the count reaches one of predetermined segment lengths. This configuration makes it possible to change the segment length according to the amount of frequency change and thereby makes it possible to improve the accuracy in correcting the pixel clock frequency as well as to reduce the amount of memory for storing the frequency modulation data FMData.

Meanwhile, when the scanning speed or the pixel clock frequency is changed, it is necessary to change the frequency modulation data FMData accordingly. For example, when the pixel clock frequency is changed to change the pixel density with the scanning speed (rotation speed of the polygon mirror) unchanged, the frequency modulation data FMData obtained in advance are changed according to the ratio of changing the pixel clock frequency. For example, when the pixel clock frequency is reduced to one half to reduce the pixel density to one half, the frequency modulation data FMData are reduced to one half.

The pixel clock signal generating unit with the third configuration has the same advantages as those of the pixel clock signal generating unit with the first configuration. In addition, the pixel clock signal generating unit with the third configuration makes it possible to generate a highly accurate pixel clock signal that can correct even the nonlinear error in scanning speed. Also, using the pixel clock generating unit with the third configuration in an image forming apparatus makes it possible to form a high-quality image based on a pixel clock signal that can accurately correct the error in scanning speed. When the nonlinear error in scanning speed occurs every several scan lines, for example, when the nonlinear error in scanning speed varies depending on the reflecting surface of a polygon mirror, it is preferable to obtain the frequency modulation data for each reflecting surface and to use the obtained frequency modulation data for scanning by the corresponding reflecting surface.

Figure 32:
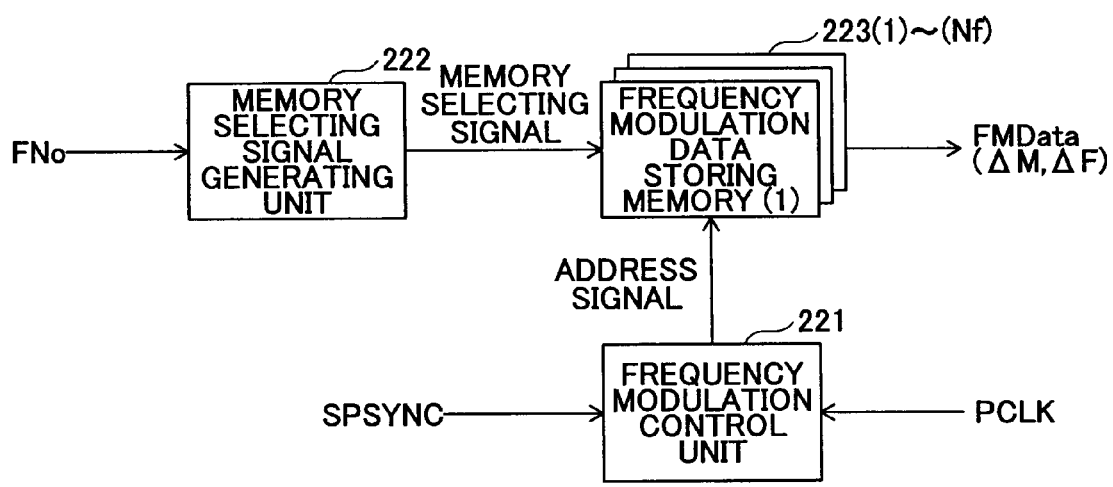
FIG. 32 is a block diagram illustrating another exemplary configuration of the exemplary frequency modulation data generating unit.

FIG. 32 is a block diagram illustrating another exemplary configuration of the frequency modulation data generating unit 203 that enables the above method. The frequency modulation control unit 221 shown in FIG. 32 generates the address signal from the number of each segment (Δn) in a scan line in substantially the same manner as the frequency modulation control unit 221 shown in FIG. 31. Each of frequency modulation data storing memories 223 (1) through (Nf) corresponds to one of the reflecting surfaces (Nf is the number of the reflecting surfaces) of a polygon mirror and stores the frequency modulation data FMData for each segment (Δn) in a scan line. The frequency modulation data FMData is associated with an address that is the number of the corresponding segment. Each of the frequency modulation data storing memories 223 (1) through (Nf) outputs the frequency modulation data FMData in response to a corresponding address signal. One of the frequency modulation data storing memories 223 (1) through (Nf) corresponding to the current reflecting surface is selected by a memory selecting signal. A memory selecting signal generating unit 222 converts the surface selecting signal FNo from the frequency calculation unit 201 into the memory selecting signal and outputs the memory selecting signal. The surface selecting signal FNo contains a relative reflecting surface number. The memory selecting signal generating unit 222 links the relative reflecting surface number to the absolute reflecting surface number and outputs the result as the memory selecting signal.

An exemplary method of linking the relative reflecting surface number to the absolute reflecting surface number is described below. When obtaining frequency modulation data, the deviation Δ from desired position is measured at each scan position for each reflecting surface while performing scanning with a certain pixel clock frequency (without controlling the pixel clock frequency). Since the scanning speed varies depending on the reflecting surface, the line error Lerr from the comparing unit 5 also varies depending on the reflecting surface. The absolute reflecting surface numbers can be identified based on the order of the line errors Lerr. The line error Lerr of each reflecting surface is stored and assigned the address that is assigned to the corresponding frequency modulation data FMData calculated from the deviation Δ from desired position. In the next normal operation, after the rotational speed of the polygon mirror becomes stable, the surface selecting signals FNo and the corresponding line errors Lerr are obtained together while performing scanning with a certain pixel clock frequency (without controlling the pixel clock frequency). The surface selecting signals FNo and the addresses can be linked by comparing the line errors Lerr obtained the first time and the line errors Lerr obtained the second time. The pixel clock frequency control is preferably performed after linking the surface selecting signals FNo and the addresses as described above. Meanwhile, the pixel clock frequency control can be performed more accurately by using a value obtained by averaging the line errors Lerr of multiple scan lines. With the above method, even when the nonlinear error in scanning speed varies depending on the reflecting surface of a polygon mirror, the pixel clock frequency control can be performed accurately according to the nonlinear error in scanning speed of each reflecting surface and therefore a highly accurate pixel clock signal can be generated.

Figure 33:
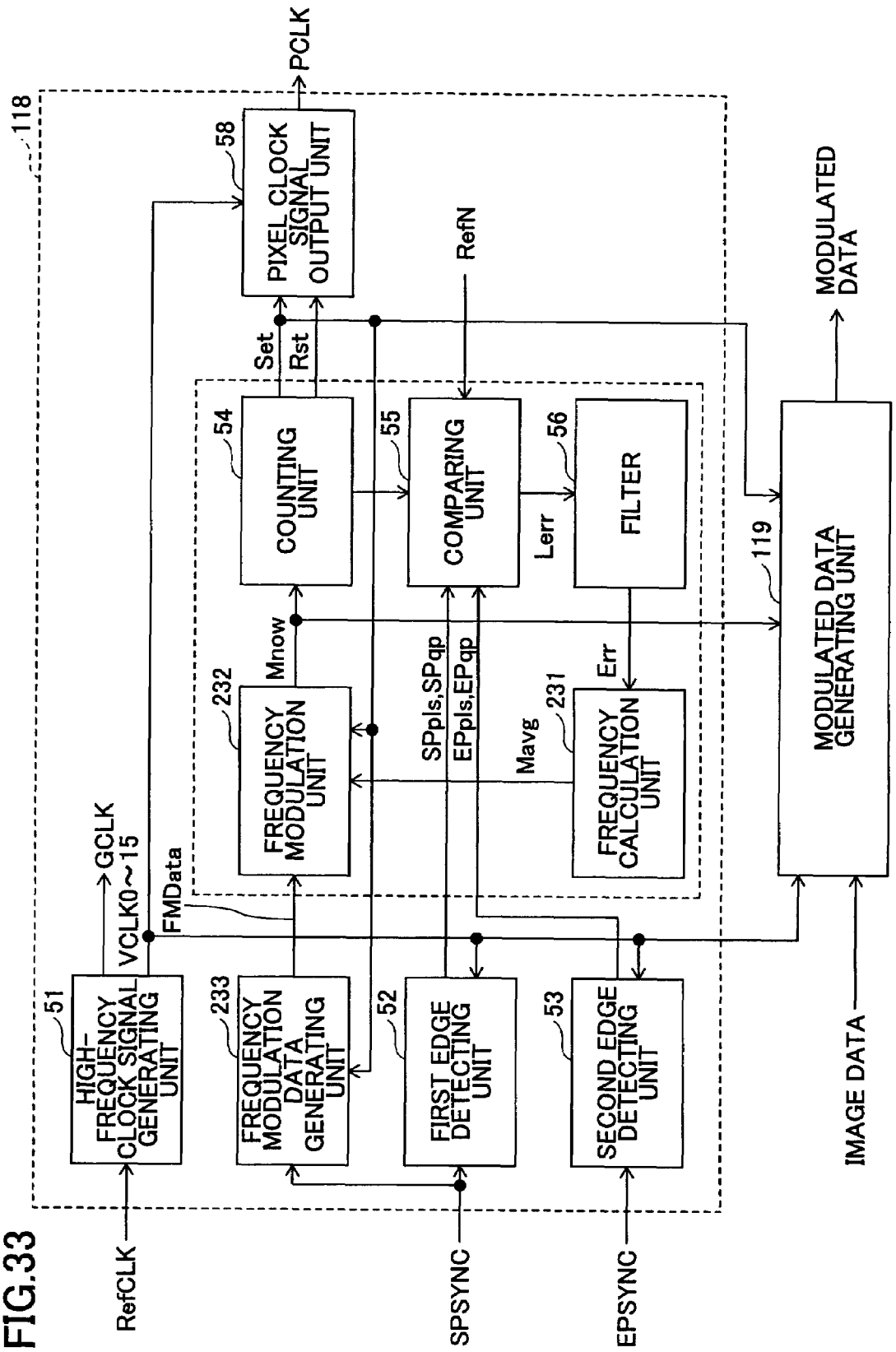
FIG. 33 is a block diagram illustrating a fourth exemplary configuration of a pixel clock signal generating unit.

Still another configuration of a pixel clock signal generating unit is described below. FIG. 33 is a block diagram illustrating a fourth exemplary configuration of a pixel clock signal generating unit. A pixel clock signal generating unit 118 shown in FIG. 33 may be used as the pixel clock signal generating unit of each of the exemplary image forming apparatuses shown in FIGS. 1, 22, 24A, and 24B. In FIG. 33, the same reference numbers are used for parts corresponding to those shown in FIG. 12, and descriptions of those parts are omitted. A frequency calculation unit 231 calculates an appropriate pixel clock frequency based on the error data Err in substantially the same manner as the frequency calculation unit 57 shown in FIG. 12 and outputs the calculated pixel clock frequency as an average pixel clock frequency signal Mavg. A frequency modulation unit 232 and a frequency modulation data generating unit 233 have substantially the same functions and configurations as those of the frequency modulation unit 202 and the frequency modulation data generating unit 203 shown in FIG. 28. Therefore, detailed descriptions of the frequency modulation unit 232 and the frequency modulation data generating unit 233 are omitted here. In this example, the frequency modulation unit 232 and the frequency modulation data generating unit 233 operate based on the internal operation clock signal GCLK instead of the pixel clock signal PCLK and obtain the scan position (n)

by counting the cycles of a set pulse Set. The frequency modulation unit 232 and the frequency modulation data generating unit 233 may also be configured to operate based on the pixel clock signal PCLK. The pixel clock signal generating unit with the fourth configuration has the same advantages as those of the pixel clock signal generating unit with the second configuration. In addition, the pixel clock signal generating unit with the fourth configuration makes it possible to generate a highly accurate pixel clock signal that can correct even the nonlinear error in scanning speed. Also, using the pixel clock generating unit with the fourth configuration in an image forming apparatus makes it possible to form a high-quality image based on a pixel clock signal that can accurately correct the error in scanning speed.

As described above, the fourth embodiment of the present invention makes it possible to generate a pixel clock signal that can accurately correct the scanning speed errors described in (1) through (5) in "2. Description of the Related Art". In the fourth embodiment, a modulated data generating unit described below modulates image data into modulated data based on the pixel clock signal generated by the pixel clock signal generating unit 118 with the fourth configuration and thereby causes a laser driving unit to drive a semiconductor laser. Thus, the fourth embodiment of the present invention makes it possible to form a high-quality image by accurately correcting the error in scanning speed.

Figure 34:
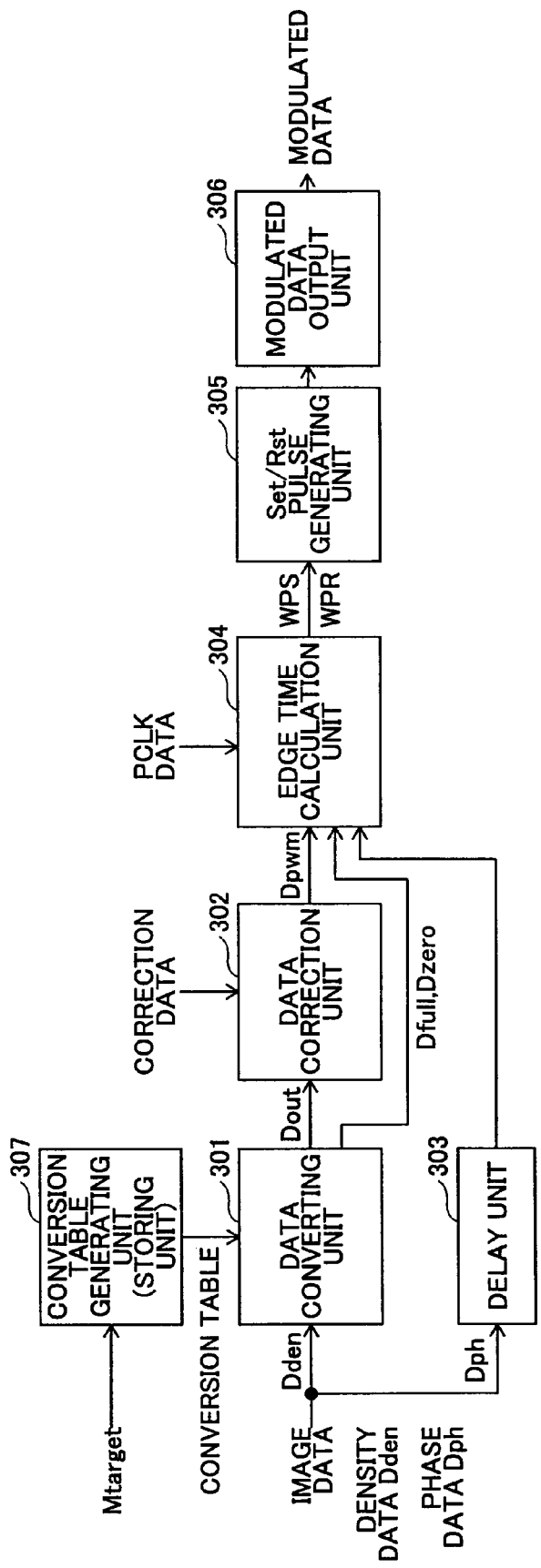
FIG. 34 is a block diagram illustrating an exemplary configuration of an exemplary modulated data generating unit.

FIG. 34 is a block diagram illustrating an exemplary configuration of a modulated data generating unit 119. The modulated data generating unit 119 generates modulated data for driving the semiconductor laser by modulating image data including density data Dden and phase data Dph. The modulated data generating unit 119 modulates the pulse width of a dot (performs pulse width modulation). The density data Dden indicates the pulse width of a dot and the phase data Dph indicates the pulse position in the dot. The modulated data generating unit 119 shown in FIG. 34 may be used as the modulated data generating unit shown in FIG. 12, 22, 24A, 24B, or 33.

Figure 35:
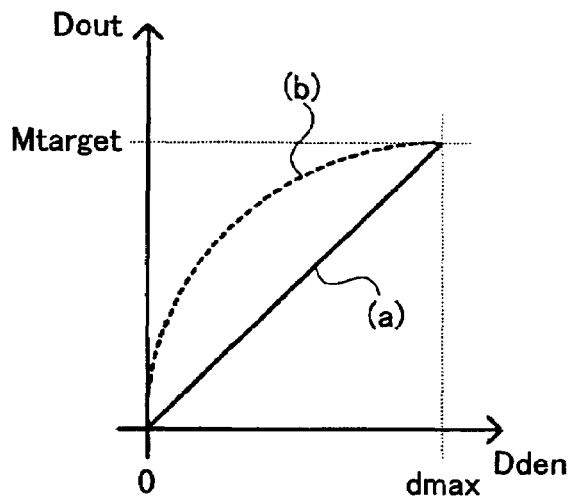
FIG. 35 is a graph showing exemplary correspondences between density data and PWM-modulation pulse width data.

A data converting unit 301 shown in FIG. 34 converts the density data Dden into PWM-modulation pulse width data Dout. As described above, the width of one dot or one cycle of the pixel clock signal PCLK is expressed by the value M based on the phase difference Tv between the high-frequency clock signals VCLK0 through VCLK15. Also, Mtarget indicates a target pixel clock frequency. When the maximum value of the density data Dden is dmax (for example, when the density data Dden are four-bit data, the maximum value dmax=15), the PWM-modulation pulse width data Dout are obtained by the following formula: Dout=Mtarget*Dden/dmax. The calculation may be performed for each dot. However, in this example, a conversion table generating unit 307 prepares a conversion table defining correspondences between the density data Dden and the PWM-modulation pulse width data Dout and supplies the conversion table to the data converting unit 301. The data converting unit 301 converts the density data Dden into the PWM-modulation pulse width data Dout according to the conversion table. Also, the conversion table generating unit 307 may be configured to just store the conversion table prepared by another unit. FIG. 35 is a graph showing exemplary correspondences between the density data Dden and the PWM-modulation pulse width data Dout. The data converting unit 301 also generates a zero-density signal Dzero that becomes high when the density data Dden equal 0 and a maximum density signal Dfull that becomes high when the density data Dden equal dmax. In an actual operation, the pixel clock frequency is changed every time when the scanning speed changes. Therefore, there is a case where the actual pixel clock frequency does not match the target pixel clock frequency Mtarget. In such a case, the difference between the actual pixel clock frequency and the target pixel clock frequency Mtarget is supplied to a data correction unit 302 as correction data. The data correction unit 302 corrects the PWM-modulation pulse width data Dout according to the correction data and outputs the PWM-modulation pulse width data Dpwm. When the pixel clock signal generating unit 118 shown in FIG. 33 that can correct the nonlinear error in scanning speed is used with the modulated data generating unit 119, the frequency modulation data FMData can be also supplied to the data correction unit 302. With the frequency modulation data FMData, the data correction unit 302 can correct the PWM-modulation pulse width data Dout according to the pixel clock frequency modulation. The configurations and operations of the above units in the modulated data generating unit 119 are described later in more detail. When the difference between the actual pixel clock frequency and the target pixel clock frequency Mtarget is very small, since such a small difference does not affect the quality of an image with the maximum density, the data correction unit 302 may be omitted.

A delay unit 303 delays the phase data Dph for a period of time taken for the calculations by the data converting unit 301 and the data correction unit 302 to synchronize the phase data Dph with the PWM-modulation pulse width data Dpwm. Also, in FIG. 34, it is assumed that the signals Dfull and Dzero are delayed for synchronization.

An edge time calculation unit 304 generates modulated data rise timing information WPS and modulated data fall timing information WPR according to the PWM-modulation pulse width data Dpwm, the maximum density signal Dfull, the zero-density signal Dzero, and the phase data Dph and based on PCLK data including the PCLK rise timing information supplied from the pixel clock generating unit 118. The calculations performed by the edge time calculation unit 304 are described below.

A Set/Rst pulse generating unit 305 generates a set pulse WPSpls (set signal), a reset pulse WPRpls (reset signal), phase information WPSqp (set phase signal) of the set pulse WPSpls, and phase information WPRqp (reset phase signal) of the reset pulse WPRpls from the modulated data rise timing information WPS and the modulated data fall timing information WPR.

A modulated data output unit 306 generates a modulated data pulse from the set pulse WPSpls, the reset pulse WPRpls, the phase information WPSqp, and the phase information WPRqp and outputs the modulated data pulse.

Figure 36:
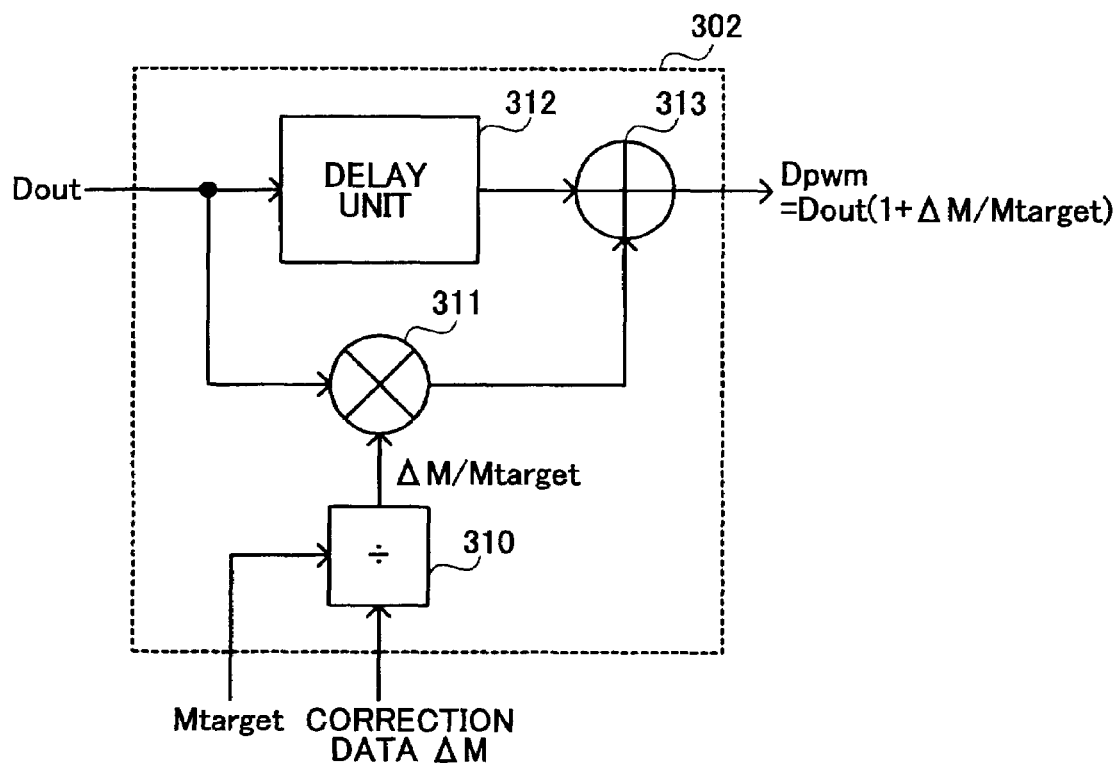
FIG. 36 is a drawing illustrating an exemplary configuration of an exemplary data correction unit.

Exemplary configurations and operations of the above units in the modulated data generating unit 119 shown in FIG. 34 are described below in more detail. FIG. 36 is a drawing illustrating an exemplary configuration of the data correction unit 302. When the difference between the target pixel clock frequency Mtarget and the current pixel clock frequency M is ΔM (correction data), the data Correction unit 302 performs the following calculation to correct the PWM-modulation pulse width data Dout: Dpwm=Dout(1+ΔM/Mtarget). Also, as described above, the frequency modulation data FMData (or a part of the frequency modulation data FMData) may be added to the difference ΔM. In the data correction unit 302, a divider 310 performs the calculation ΔM÷Mtarget. Since it is generally difficult to form a high-speed divider, the divider 310 may be implemented as a multiplier that performs the calculation ΔM×1/Mtarget. A multiplier 311 multiplies the PWM-modulation pulse width data Dout and the output from the divider 310 (Dout·ΔM/Mtarget). A delay unit 312 delays the PWM-modulation pulse width data Dout for a period of time taken for the calculation by the multiplier 311. An adder 313 adds the output from the delay unit 312 and the output from the multiplier 311 and outputs the PWM-modulation pulse width data Dpwm (=Dout(1+ΔM/Mtarget)).

Figure 38:
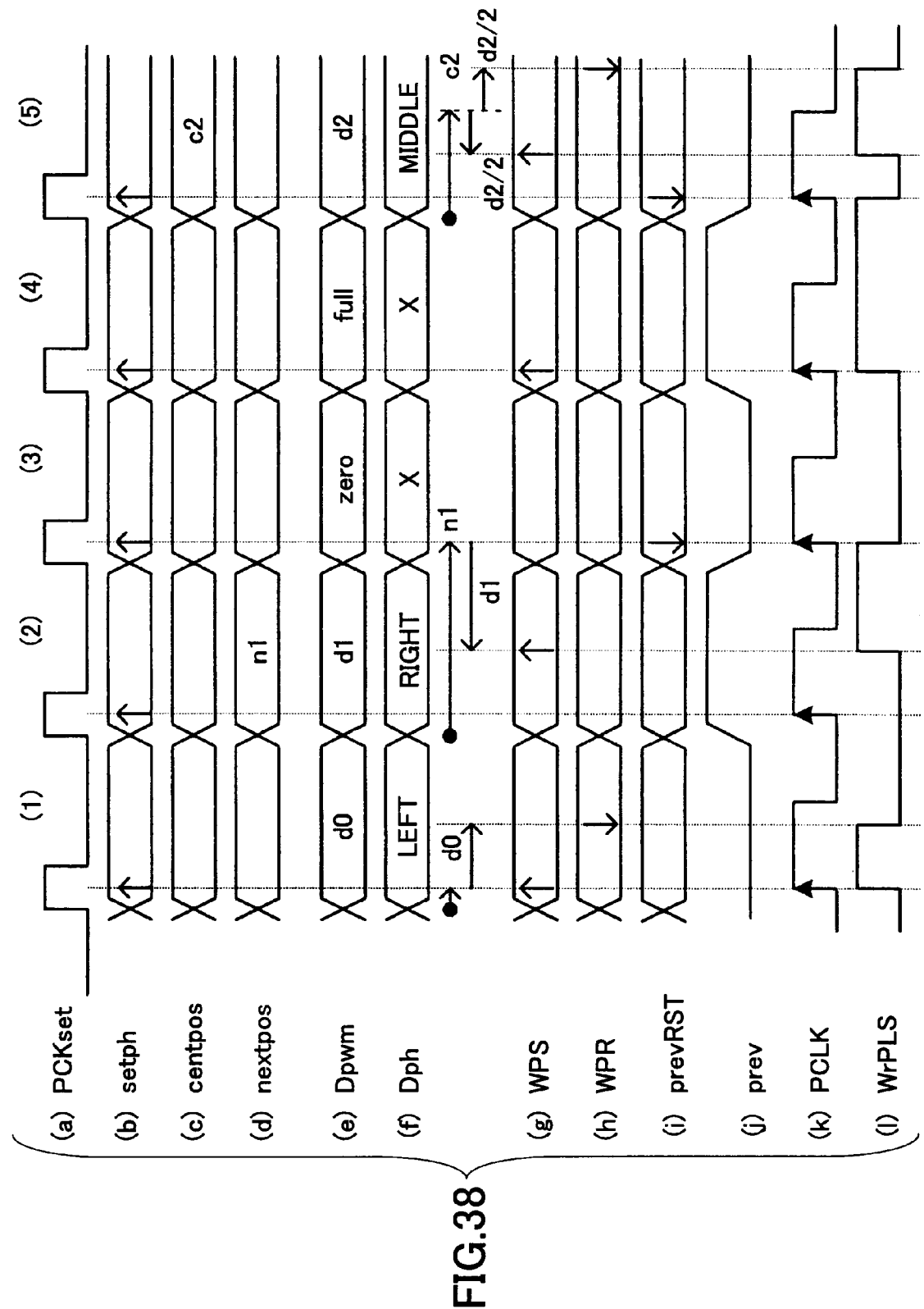
FIG. 38 is a signal waveform diagram used to describe the exemplary calculations.

FIG. 37 is a table used to describe exemplary calculations performed by the edge time calculation unit 304. FIG. 38 is a signal waveform diagram used to describe the exemplary calculations. The PCLK data supplied to the edge time calculation unit 304 includes a set pulse PCKset generated based on the internal operation clock signal GCLK and indicating the rise of the pixel clock signal, phase information setph of the set pulse PCKset, center position data centpos indicating the center position of the pixel clock signal relative to the rising edge of the set pulse PCKset, and next position data nextpos indicating the next rise position of the pixel clock signal relative to the rising edge of the set pulse PCKset.

As shown in FIG. 37, the edge time calculation 304 generates the modulated data rise timing information WPS, the modulated data fall timing information WPR, previous dot fall timing information prevRST, and a signal prev (used as a signal prev' for the next dot) indicating whether a dot signal is high at the end according to the maximum density signal Dfull indicating that the density of a dot is maximum (H indicates that the density is maximum), the zero-density signal Dzero indicating that the density of a dot is 0 or the dot is white (H indicates that the density is 0), the phase data Dph (in this example, the phase of a dot signal is indicated by left, right, or middle), and the states (S1 through S10) of the signal prev' indicating whether a previous dot signal was high at the end. In FIG. 37, X indicates that the signal can be in any state and "-" indicates that the signal is not available (N/A) for the dot. For example, when the maximum density signal Dfull is H and the signal prev' is H, the signal prev becomes H regardless of the states of other signals, and WPS, WPR, and prevRST are not output. When the maximum density signal Dfull is H and the signal prev' is L, the signal prev becomes H regardless of the states of other signals, and WPS=setph is output.

Exemplary calculations performed by the edge time calculation unit 304 are further described with reference to FIG. 38. In FIG. 38, Dpwm=full indicates Dfull=H and Dpwm=zero indicates Dzero=H. Other symbols in (e) Dpwm indicate the values of the PWM-modulation pulse width data Dpwm. The dot cycle (1), where Dpwm=d0 (in other words, Dfull=L, Dzero=L), Dph=left, and prev'=L, corresponds to S5 shown in FIG. 37. In this case, WPS=setph, WPR=setph+d0, prevRST=N/A, and prev=L. In FIG. 38, arrows indicate time information and cycles with no symbols correspond to "-" (N/A) in FIG. 37. The dot cycle (2) corresponds to S7 where WPS=n1−d1, WPR=N/A, prevRST=N/A, and prev=H. The dot cycle (3) corresponds to S4 where WPS=N/A, WPR=N/A, prevRST=setph, and prev=L. Descriptions of the remaining dot cycles are omitted.

(k) PCLK indicates the pixel clock signal and (l) WrPLS indicates modulated data. (k) PCLK and (l) WrPLS are expressed in real time and provided for descriptive purposes.

The modulated data rise timing information WPS output from the edge time calculation unit 304 includes a GCLK cycle count WPScnt and phase information WPSqp (for example, lower 6 bits are assigned to WPSqp and the remaining upper bits are assigned to WPScnt). The Set/Rst pulse generating unit 305 delays the PCKset pulse for a period of time corresponding to the GCLK cycle count WPScnt and outputs the delayed pulse as a set pulse WPSpls. When outputting the set pulse WPSpls, the Set/Rst pulse generating unit 305 also outputs the phase information WPSqp. Similarly, the modulated data fall timing information WPR includes GCLK cycle count WPRcnt and phase information WPRqp. When the previous dot fall timing information prevRST is not available, the Set/Rst pulse generating unit 305 delays the PCKset pulse for a period of time corresponding to the GCLK cycle count WPRcnt and outputs the delayed pulse as a reset pulse WPRpls together with the phase information WPRqp. When the previous dot fall timing information prevRST is available, the Set/Rst pulse generating unit 305 outputs the reset pulse WPRpls and the phase information setph in the same cycle as that of the PCKset pulse, and then generates signals based on the modulated data fall timing information WPR.

Figure 39:
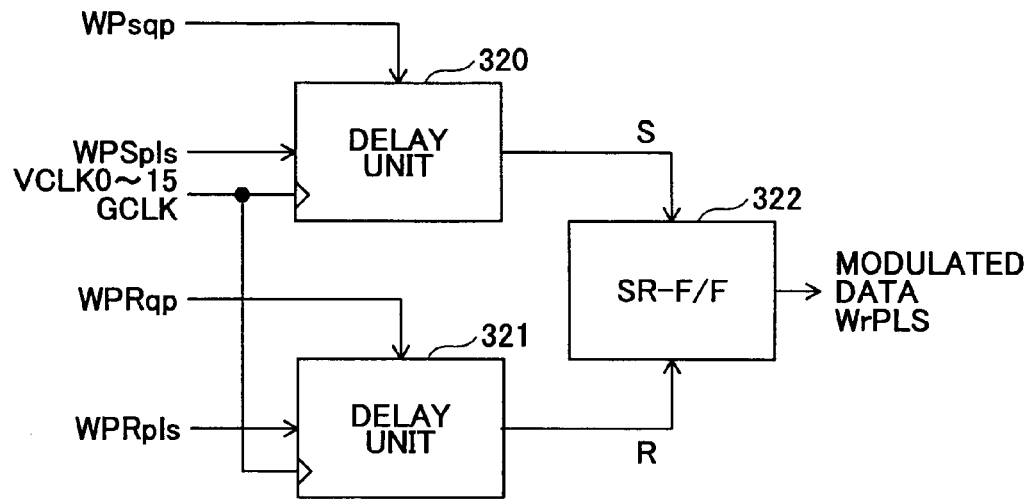
FIG. 39 is a block diagram illustrating an exemplary configuration of a modulated data output unit 306 shown in FIG. 34.

FIG. 39 is a block diagram illustrating an exemplary configuration of the modulated data output unit 306. In FIG. 39, a delay unit 320 delays WPSpls supplied from the Set/Rst pulse generating unit 305 according to the phase information WPSqp and outputs the delayed WPSpls as a pulse S (setting pulse) based on the multi-phase clock signals VCLK0 through VCLK15. The delay unit 320 also receives the internal operation clock GCLK to identify a period QT in a GCLK cycle. Also, the delay unit 320 may be configured to receive a signal QT indicating the period QT. In this case, the signal QT is generated by the high-frequency clock generating unit 51. In other words, the pulse S is generated by delaying WPSpls for a period of time corresponding to WPSqp·Tv. A delay unit 321 delays WPRpls supplied from the Set/Rst pulse generating unit 305 according to the phase information WPRqp and outputs the delayed WPRpls as a pulse R (resetting pulse) based on the multi-phase clock signals VCLK0 through VCLK15. In other words, the pulse R is generated by delaying WPRpls for a period of time corresponding to WPRqp·Tv. An SR-F/F 322 is a Set-Reset flip-flop that outputs modulated data WrPLS that is changed (set) to high at the rise of the pulse S and changed (reset) to low at the rise of pulse R.

As described above, using the maximum density signal Dfull makes it possible to generate pulses of the maximum density without dropping a pulse even when the current pixel clock frequency M does not match the target pixel clock frequency Mtarget (for example, when Dpwm=M−1). This, in turn, eliminates the need to supply the current pixel clock frequency as the correction data and makes it possible to simplify the configuration of the modulated data generating unit 119 and to increase its processing speed.

Normally, in an image forming apparatus, gamma correction is performed on density data to correct apparatus-dependent nonlinearity of gradation and thereby to improve the image reproducibility. The data converting unit 301 shown in FIG. 34 may be configured to perform the gamma correction. In this case, to reduce the circuit size, it is preferable to prepare and store gamma correction data with which the maximum value dmax becomes the target pixel clock frequency Mtarget as shown by the curved line (b) shown in FIG. 35.

Figure 40:
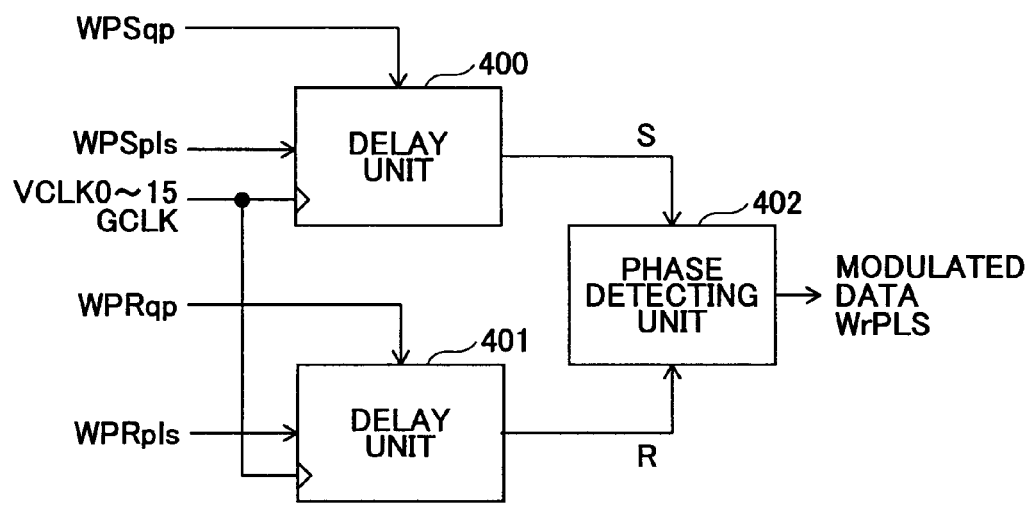
FIG. 40 is a block diagram illustrating another exemplary configuration of the modulated data output unit 306.

FIG. 40 is a block diagram illustrating another exemplary configuration of the modulated data output unit 306. In FIG. 40, a delay unit 400 delays WPSpls supplied from the Set/Rst pulse generating unit 305 according to the phase information WPSqp for a period of time corresponding to WPSqp·Tv and outputs the delayed WPSpls as a pulse S based on the multi-phase clock signals VCLK0 through VCLK15. The delay unit 400 also receives the internal operation clock GCLK to identify a period QT in a GCLK cycle. Also, the delay unit 400 may be configured to receive a signal QT indicating the period QT. In this case, the signal QT is generated by the high-frequency clock generating unit 51. A delay unit 401 delays WPRpls supplied from the Set/Rst pulse generating unit 305 according to the phase information WPRqp for a period of time corresponding to WPRqp·Tv and outputs the delayed WPRpls as a pulse R based on the multi-phase clock signals VCLK0 through VCLK15. A phase detecting unit 402 outputs modulated data WrPLS which signal is changed (set) to high at the rise of the pulse S and changed (reset) to low at the rise of pulse R. In the case of the SR-F/F 322 shown in FIG. 39, if both of the pulse S and the pulse R become high at the same time, the modulated data WrPLS become indeterminate. Therefore, it is not possible to supply WPSpls and WPRpls to the SR-F/F 322 in the same GCLK cycle. In the case of the phase detecting unit 402, since it detects only the rising edges of the pulse S and the pulse R, the modulated data WrPLS are not affected even when the pulses S and R become high at the same time.

Figure 41:
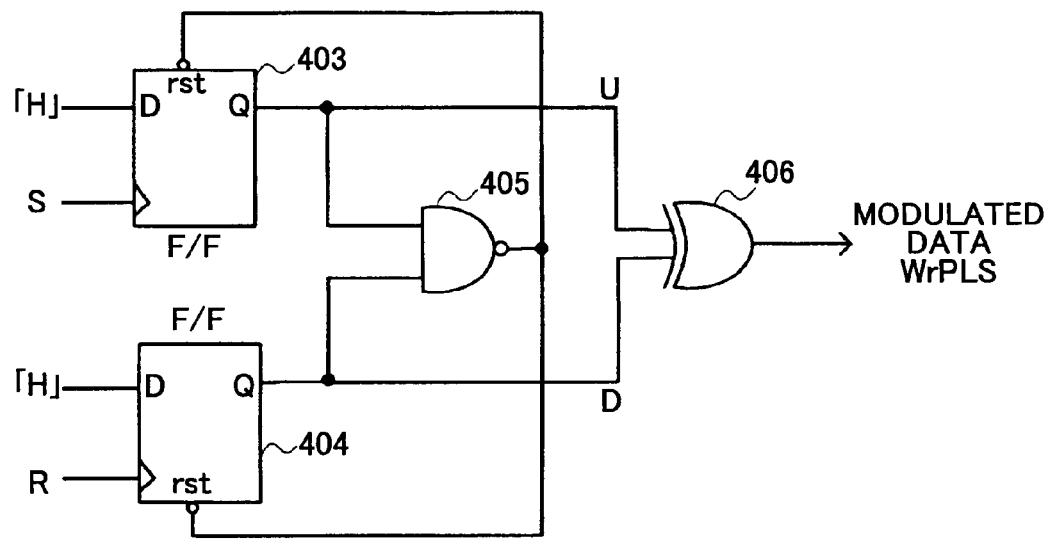
FIG. 41 is a drawing illustrating an exemplary configuration of a phase detecting unit 402.

FIG. 41 is a drawing illustrating an exemplary configuration of the phase detecting unit 402. The phase detecting unit 402 includes a F/F 403 supplied with the pulse S as a clock signal, a F/F 404 supplied with the pulse R as a clock signal, an NAND gate 405, and an EXOR gate 406. The F/F 403 and the F/F 404 are flip-flops having the same configuration. Signals H at data input terminals D of the F/F 403 and the F/F 404 are both high. An rst terminal in each of the F/F 403 and the F/F 404 is a low active (negative logic).

Figure 42A:
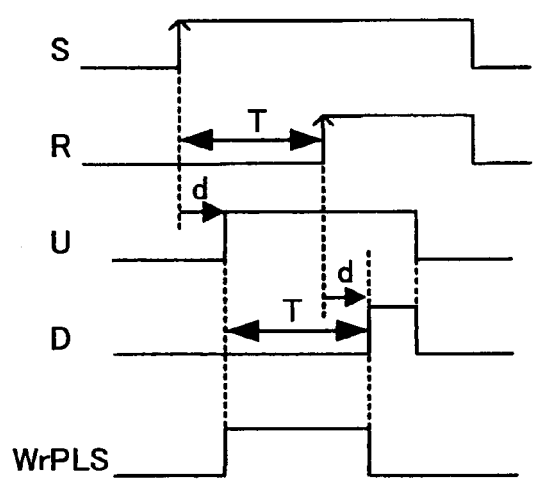
FIGS. 42A and 42B are timing charts of signals in the phase detecting unit 402.

FIG. 42A is a timing chart of signals in the phase detecting unit 402 shown in FIG. 41. In FIG. 42A, initial states of pulses at a node U and a node D are both low. When the pulse S rises, the F/F 403 takes in the signal H from the data input terminal D. Then, the pulse at the node U becomes high after a delay d caused by the F/F 403. When the pulse R rises after a period of time T from the rise of the pulse S, the F/F 404 takes in the signal H from the data input terminal D. Then, the pulse at the node D becomes high after a delay d caused by the F/F 404. When both of the pulses at the nodes U and D become high, the output of the NAND gate 405 becomes low. The output from the NAND gate 405 is input to the rst terminal of each of the F/F 403 and the F/F 404. As a result, the F/F 403 and the F/F 404 are reset and the pulses at the nodes U and D become low. The pulses appearing at the nodes U and D are input to the EXOR gate 406. The ExOR gate 406 performs an exclusive OR operation on the pulses and outputs the modulated data WrPLS. Since the F/F 403 and the F/F 404 have the same configuration, it can be assumed that the time between the rising edge of the pulse S and the signal output from the F/F 403 and the time between the rising edge of the pulse R and the signal output from the F/F 404 are the same. Therefore, a difference T between the rising edges of the pulses S and R becomes the difference between the rising edges of the pulses at the nodes U and D, and the modulated data WrPLS are output as a pulse with the pulse width T. In FIG. 42A, a gate delay by the ExOR gate 406 is ignored. Thus, the phase detecting unit 402 shown in FIG. 41 is able to generate a pulse with the pulse width T based on the difference T between the rising edges of the pulses S and R. Also, with the phase detecting unit 402, the modulated data WrPLS are not affected even when the pulses S and R become high at the same time. Therefore, it is possible to supply WPSpls and WPRpls to the phase detecting unit 402 in the same GCLK cycle.

Figure 42B:
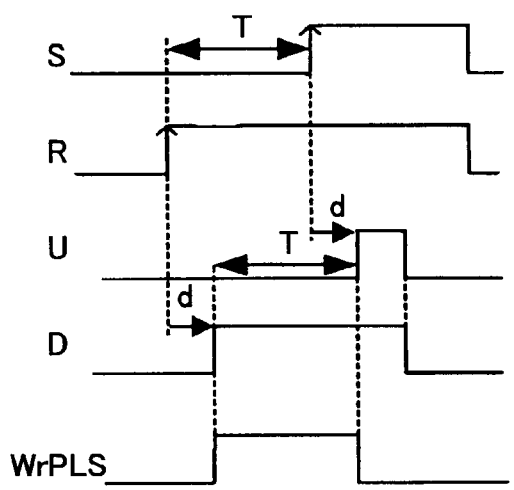

One disadvantage of the phase detecting unit 402 with the configuration shown in FIG. 42 is that the modulated data WrPLS become inverted when the order of the pulses S and R is reversed for some reason and remain inverted thereafter. FIG. 42B shows the case where the modulated data WrPLS are inverted. In FIG. 42B, initial states of the pulses at the node U and the node D are both low and the pulse R is input before the pulse S is input. When the pulse R rises, the pulse at the node D rises; and when the pulse S rises, the pulse at the node U rises. Accordingly, the modulated data WrPLS rises at a timing when it is normally reset and falls at a timing when it is normally set. Thus, the modulated data WrPLS are inverted.

Figure 43:
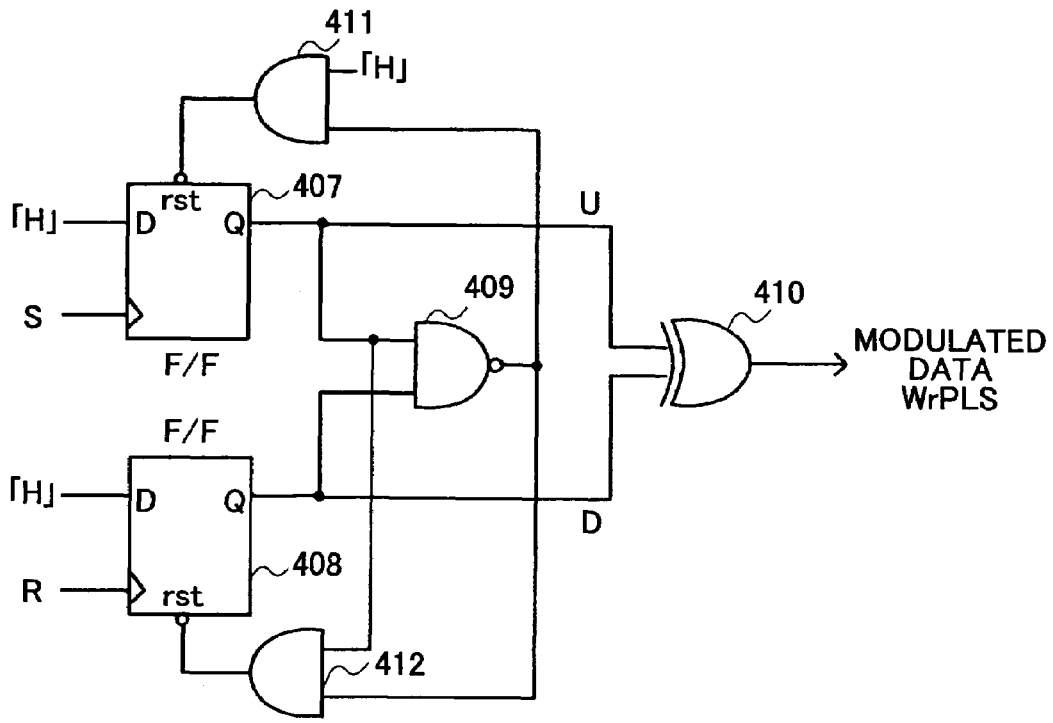
FIG. 43 is a drawing illustrating another exemplary configuration of the phase detecting unit 402.

The phase detecting unit 402 with the configuration shown in FIG. 43 solves the above problem. The phase detecting unit 402 shown in FIG. 43 includes AND gates 411 and 412 in addition to the parts in the phase detecting unit 402 shown in FIG. 42. As shown in FIG. 43, the AND gate 411 performs an AND operation on the output from the NAND gate 409 and a signal H (signal that is high) and outputs the result to the rst terminal of the F/F 407. The AND gate 412 performs an AND operation on the output from the NAND gate 409 and the pulse at the node U and outputs the result to the rst terminal of the F/F 408. In the above configuration, when the pulse S is not yet input, the pulse at the node U is low. Therefore, the output from the AND gate 412 becomes low and the F/F 408 is reset. In this case, even when the pulse R is input, the pulse at the node D remains low. Thus, with the configuration shown in FIG. 43, the modulated data WrPLS are not inverted even when the order of the pulses S and R is reversed. In other words, the phase detecting unit 402 shown in FIG. 43 is configured so as not to accept the pulse R unless the pulse S is input first.

Figure 44:
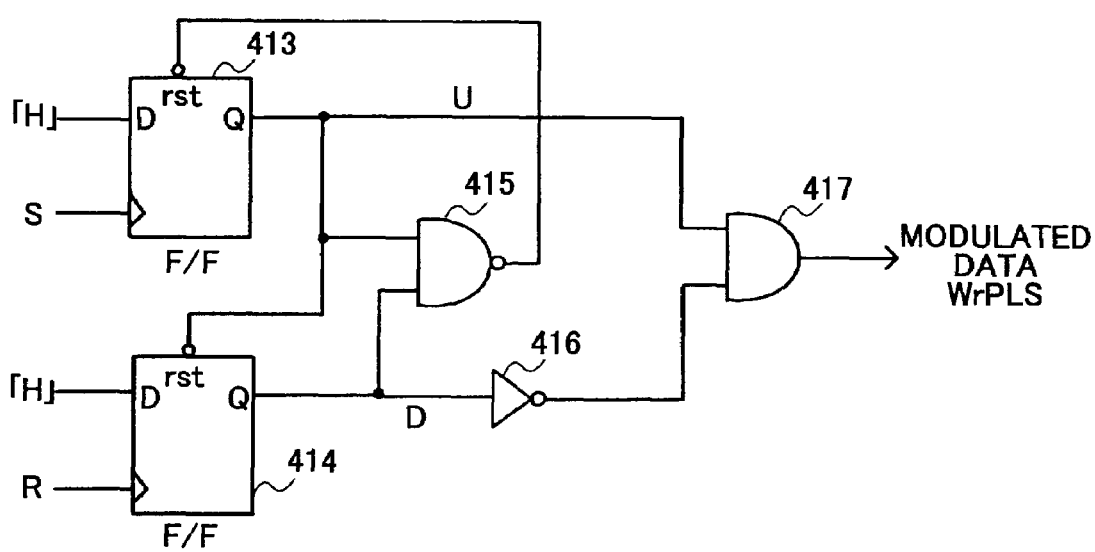
FIG. 44 is a drawing illustrating still another exemplary configuration of the phase detecting unit 402.
Figure 45A:
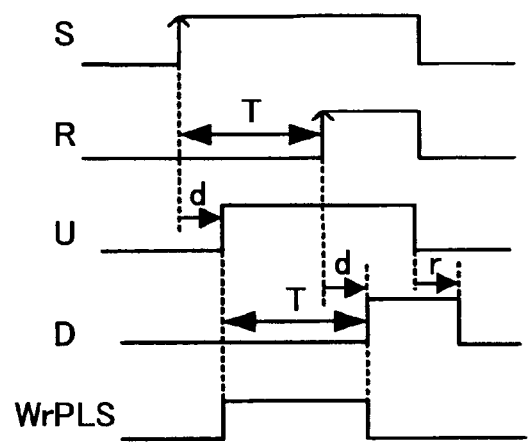
FIGS. 45A and 45B are timing charts of signals in the phase detecting unit 402.
Figure 45B:
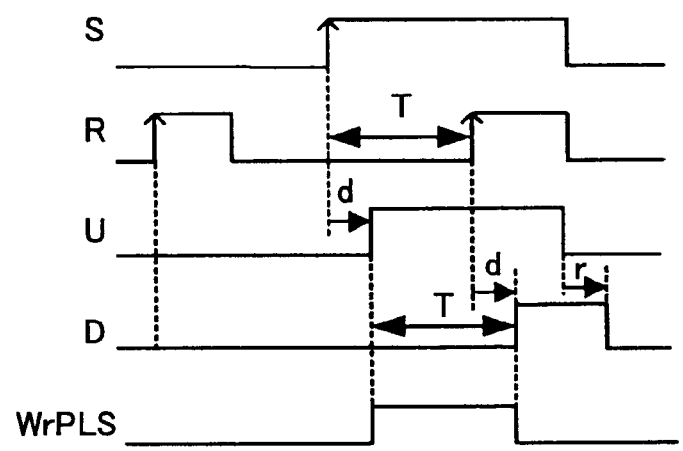

FIG. 44 is a drawing illustrating still another exemplary configuration of the phase detecting unit 402. The phase detecting unit 402 shown in FIG. 44 includes a F/F 413 supplied with the pulse S as a clock signal, a F/F 414 supplied with the pulse R as a clock signal, an NAND gate 415, an inverter 416, and an AND gate 417. The F/F 413 and the F/F 414 are flip-flops having the same configuration. Signals H at data input terminals D of the F/F 413 and the F/F 414 are both high. An rst terminal in each of the F/F 413 and the F/F 414 is a low active (negative logic). FIG. 45A is a timing chart of signals in the phase detecting unit 402 shown in FIG. 44. In FIG. 45A, initial states of pulses at the node U and the node D are both low. When the pulse S rises, the F/F 413 takes in the signal H from the data input terminal D. Then, the pulse at the node U becomes high after a delay d caused by the F/F 413. At this point, since the pulse at the node U is high, the F/F 414 is set. Therefore, when the pulse R rises after a period of time T from the rise of the pulse S, the F/F 414 takes in the signal H from the data input terminal D. Then, the node D becomes high after a delay d caused by the F/F 414. When both of the pulses at the nodes U and D become high, the output of the NAND gate 415 becomes low. The output from the NAND gate 415 is input to the rst terminal of the F/F 413. As a result, the F/F 413 is reset and the node U becomes low. Also, when the pulse at the node U becomes low, the F/F 414 connected to the node U is reset and the pulse at the node D becomes low. The inverter 416 inverts the pulse at the node D. The AND gate 417 performs an AND operation on the inverted pulse and the pulse at the node U and outputs the result as the modulated data WrPLS with a pulse width T. In this configuration, there is a delay r, which is a period of time needed to reset the F/F 414, between the fall of the pulse at the node U and the fall of the pulse at the node D. Therefore, in this case, the modulated data WrPLS are obtained by obtaining the difference between the rising edges of the pulses at the nodes U and D instead of by performing an exclusive OR on the pulses at the nodes U and D. In FIG. 45A, a gate delay by the AND gate 417 is ignored. FIG. 45B shows a case where the pulse R is input before the pulse S is input. Since the initial states of the pulses at the nodes U and D are both low, the F/F 414 is reset. Therefore, even when the pulse R is input, the pulse at the node D remains low. When the pulse S is input, the pulse at the node U becomes high. As a result, the F/F 414 is set and enabled to accept the pulse R. Thus, with the phase detecting unit 402 shown in FIG. 44, the modulated data WrPLS are not affected even when the pulses S and R become high at the same time. Therefore, it is possible to supply WPSpls and WPRpls to the phase detecting unit 402 in the same GCLK cycle.

Figure 46:
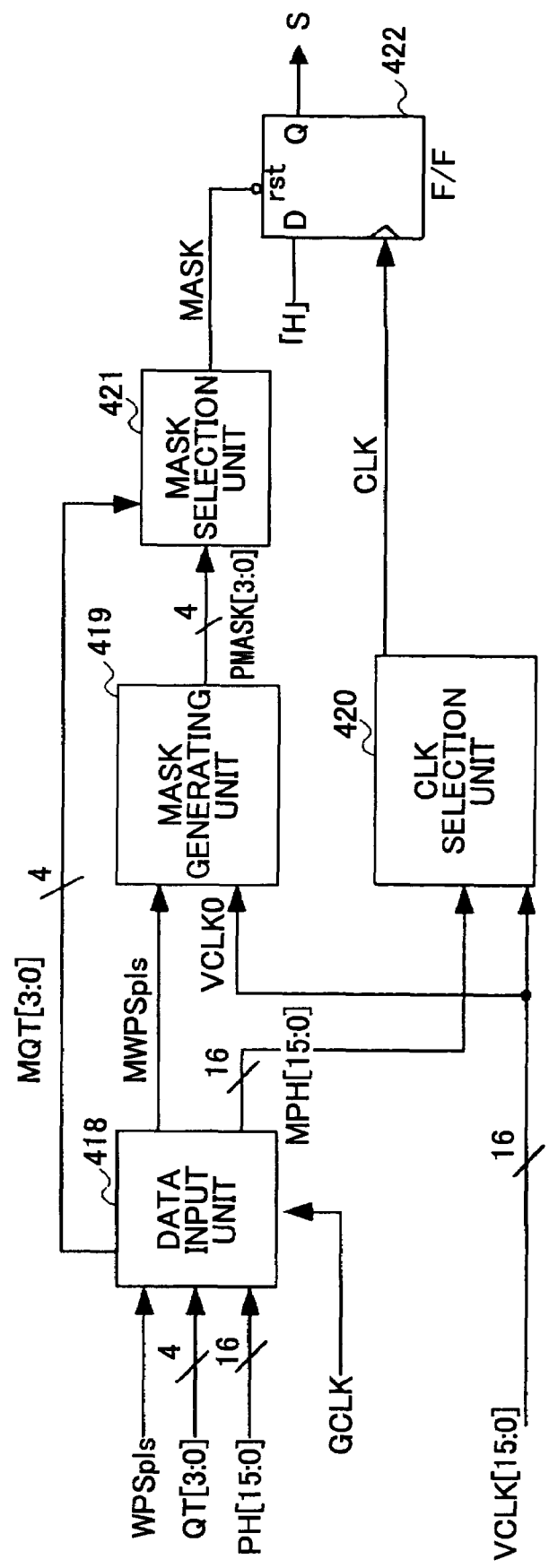
FIG. 46 is a block diagram illustrating an exemplary configuration of delay units 320 and 321 shown in FIG. 39.

FIG. 46 is a block diagram illustrating an exemplary configuration of the delay units 320 and 321 shown in FIG. 39. Although FIG. 46 shows an exemplary configuration of the delay unit 320 that receives WPSpls and outputs the pulse S, the exemplary configuration can be applied to the delay unit 321. In FIG. 46, QT[3:0] (QT3 through QT0) and PH[15:0] (PH15 through PH0) are input as the phase information WPSqp. QT is one fourth of a GCLK cycle and indicates a position in the GCLK cycle and PH indicates one-sixteenth of QT and indicates a position in QT. For example, when the frequency of GCLK is 500 MHz, QT specifies a phase by 500 ps and PH specifies a phase by 31.25 ps that is one-sixteenth of 500 ps. Among QT3 through QT0, only one bit becomes high in one GCLK cycle. Similarly, among PH15 through PH0, only one bit becomes high in one GCLK cycle.

The delay unit 320 shown in FIG. 46 includes a data input unit 418, a MASK generating unit 419, a CLK selection unit 420, a MASK selection unit 421, and a F/F 422. The data input unit 418 inputs WPSpls, QT[3:0], and PH[15:0] in synchronization with GCLK. MWPSpls indicates WPSpls output from the data input unit 418. Similarly, MQT[3:0] indicates QT[3:0] and MPH[15:0] indicates PH[15:0] output from the data input unit 418. The MASK generating unit 419 receives MWPSpls and VCLK0 and outputs PMASK[3:0]. VCLK0 is one phase of the multi-phase clock signals VCLK. The phase is not limited to 0-phase and any one of the multi-phase clock signals VCLK may be selected according to need. The phase difference between PMASK3 through PMASK0 corresponds to the cycle of VCLK0. In other words, when the frequency of GCLK is 500 MHz, the phase difference is 500 ps. The MASK selection unit 421 selects one of PMASK3 through PMASK0 specified by MQT[3:0] and outputs the selected PMASK as MASK. The CLK selection unit 420 selects one of VCLK15 through VCLK0 specified by MPH [15:0] and outputs the selected VCLK as CLK. The F/F 422 is a flip-flop with a reset terminal and is supplied with CLK as a clock signal. MASK is input to an rst terminal and a signal H at a data input terminal D is always high. The F/F 422 becomes active only when MASK is high. When CLK rises while MASK is high, an output S rises. In other words, the F/F 422 can pick up one of VCLK15 through VCLK0 specified by PH in a period specified by QT as the rise timing of the output S. When MASK becomes low, the output S becomes low.

Figure 47:
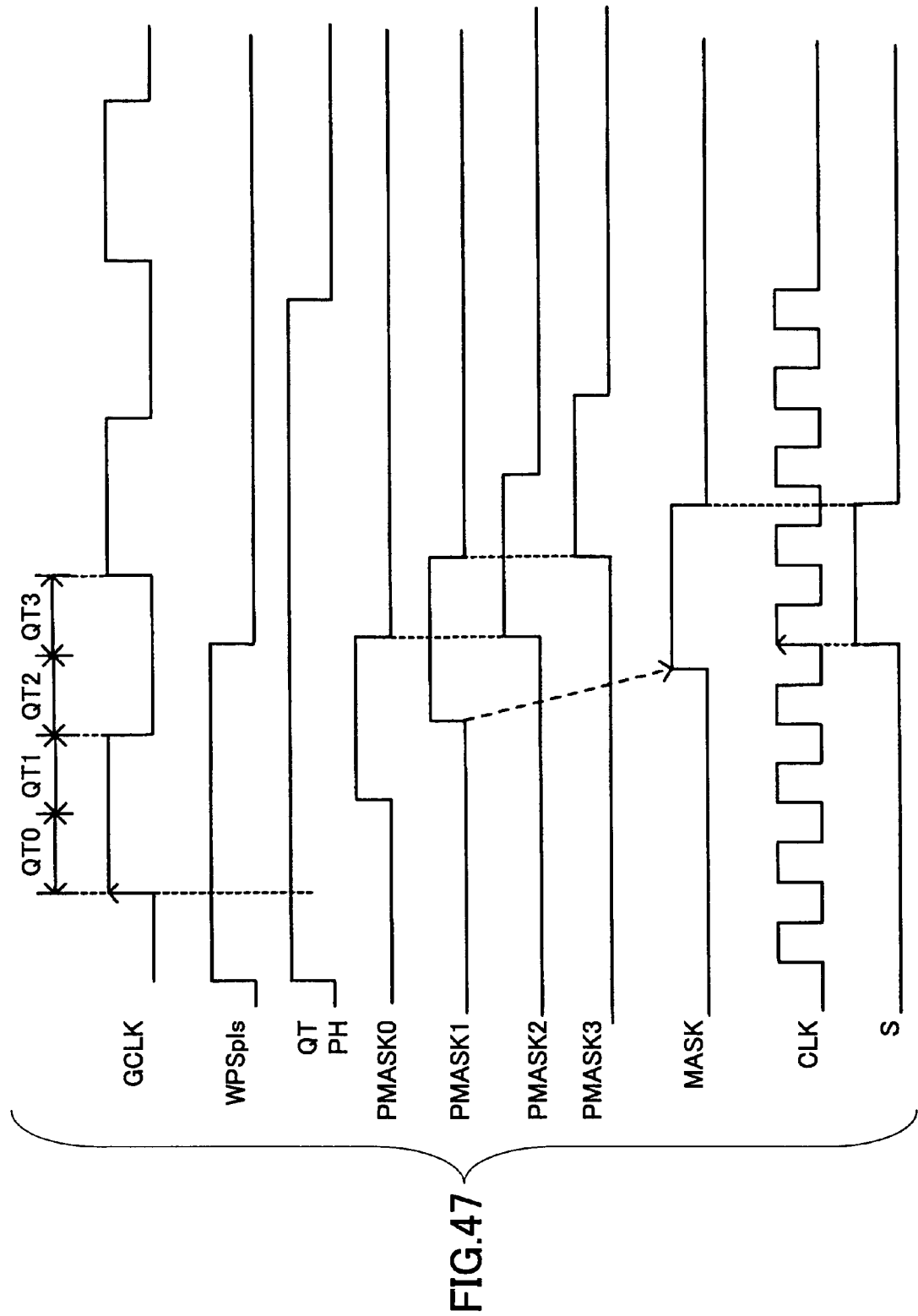
FIG. 47 is a timing chart of signals in the delay unit 320 shown in FIG. 46.

FIG. 47 is a timing chart of signals in the delay unit 320 shown in FIG. 46. In the example shown in FIG. 47, WPSpls is high for one GCLK cycle and QT/PH is high for two GCLK cycles. QT indicates one of 4 bits and PH indicates one of 16 bits. When GCLK rises, the data input unit 418 takes in WPSpls, QT, and PH. The MASK generating unit 419 receives MWPSpls and outputs PMASK0 through PMASK3 synchronized with VCLK0. The pulse width of each of PMASK0 through PMASK3 is one-half of a GCLK cycle and the phase difference between PMASK0 through PMASK3 is one-fourth of a GCLK cycle. In this example, PMASK1 is selected by the MASK selection unit 421. In other words, QT1 is high and QT0, QT2, and QT3 are low. One of VCLK0 through VCLK15 is specified by PH[15:0] and supplied as CLK. The pulse S rises at the first rise of CLK during a period when MASK is high. When MASK becomes low, the pulse S becomes low. Thus, the delay unit 320 (or the delay unit 321) can output a pulse that is delayed for a period of time corresponding to specified phase information.

Figure 48:
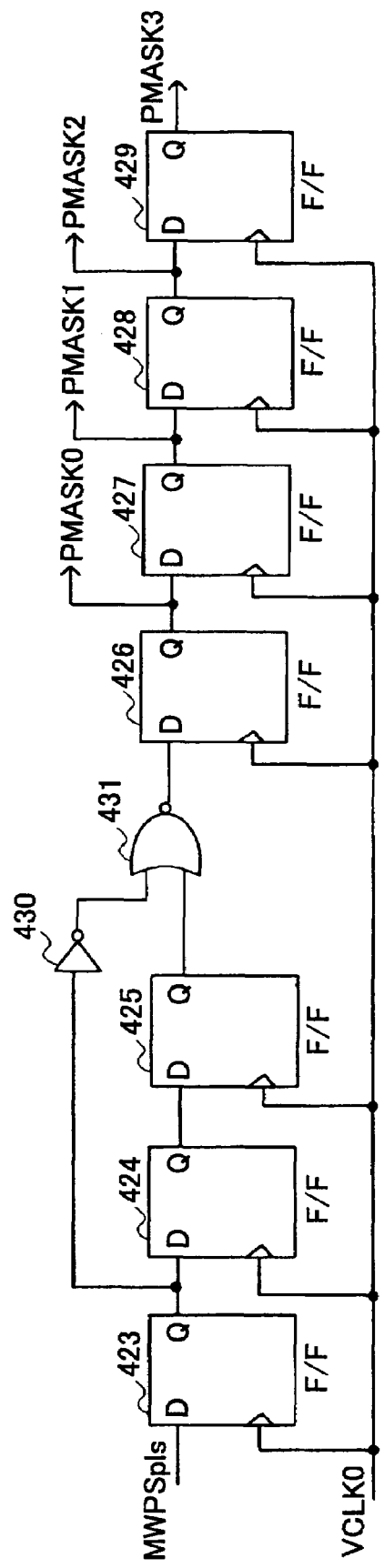
FIG. 48 is a drawing illustrating an exemplary configuration of a MASK generating unit 419.

FIG. 48 is a drawing illustrating an exemplary configuration of the MASK generating unit 419. The MASK generating unit 419 includes F/Fs 423 through 429, an inverter 430, and a NOR gate 431. The F/Fs 423 through 429 operate based on VCLK0. When MWPSpls is input into the F/F 423, an inverted signal of an output signal from the F/F 423 and an output signal from the F/F 425 are input into the NOR gate 431. When MWPSpls rises, the NOR gate 431 output a pulse equivalent to two VCLK0 cycles. Each of the F/Fs 426 through 429 delays the pulse for one VCLK0 cycle. As a result, PMASK0 through PMASK3 are generated.

Figure 49:
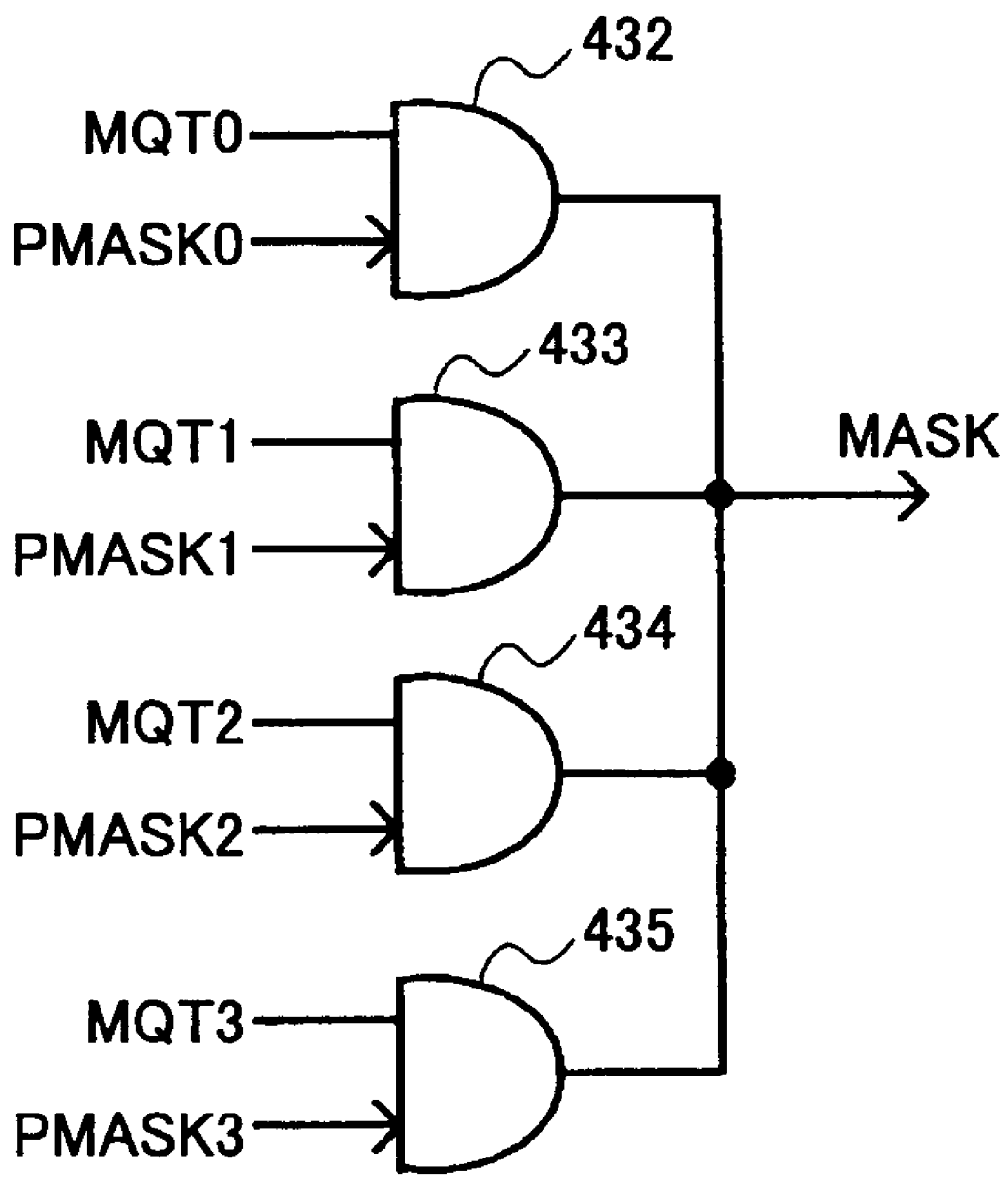
FIG. 49 is a drawing illustrating an exemplary configuration of a MASK selection unit 421.

FIG. 49 is a drawing illustrating an exemplary configuration of the MASK selection unit 421. The MASK selection unit 421 shown in FIG. 49 includes AND gates 432 through 435 connected in parallel. MQT[3:0] and PMASK[3:0] are input into the AND gates 432 through 435 and one of PMASK0 through PMASK3 specified by MQT[3:0] is output as MASK.

Figure 50:
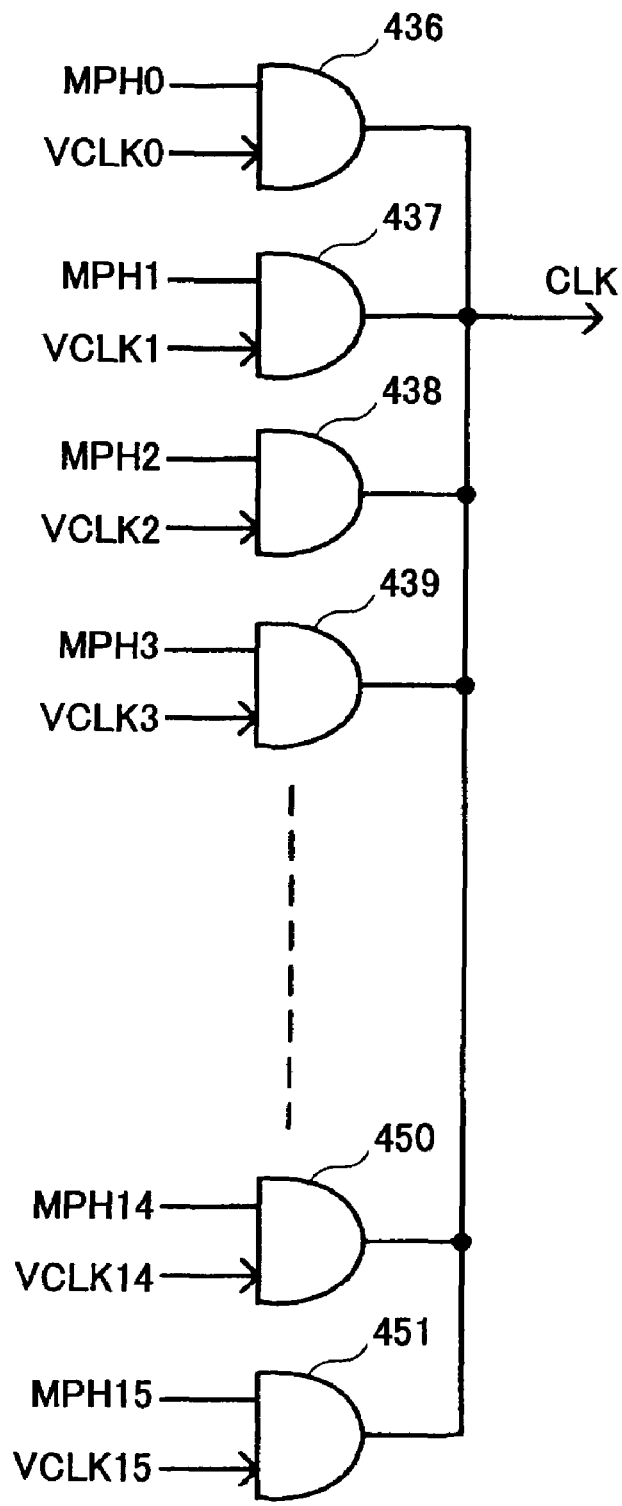
FIG. 50 is a drawing illustrating an exemplary configuration of a CLK selection unit 420.

FIG. 50 is a drawing illustrating an exemplary configuration of the CLK selection unit 420. The CLK selection unit 420 shown in FIG. 50 includes AND gates 436 through 451 connected in parallel. MPH[15:0] and VCLK[15:0] are input into the AND gates 436 through 451 and one of VCLK0 through VCLK15 specified by MPH[15:0] is output as CLK.

Figure 51:
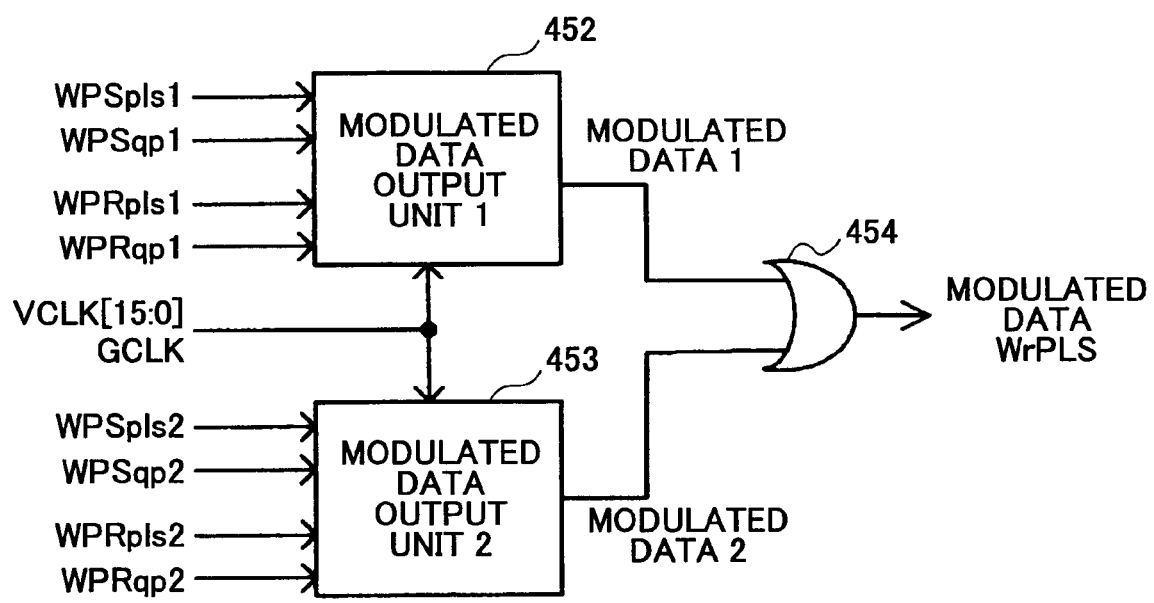
FIG. 51 is a block diagram illustrating still another exemplary configuration of the modulated data output unit 306.

FIG. 51 is a block diagram illustrating still another exemplary configuration of the modulated data output unit 306. The modulated data output unit 306 shown in FIG. 51 includes a modulated data output unit 1 (452), a modulated data output unit 2 (453), and an OR gate 454. The modulated data output unit 1 (452) receives a set pulse WPSpls1, a reset pulse WPRpls1, phase information WPSqp1 and WPRqp1, GCLK, and VCLK[15:0], and outputs modulated data 1. The modulated data output unit 2 (453) receives a set pulse WPSpls2, a reset pulse WPRpls2, phase information WPSqp2 and WPRqp2, GCLK, and VCLK[15:0], and outputs modulated data 2. The OR gate 454 performs an OR operation on the modulated data 1 and the modulated data 2 and outputs the result as the modulated data WrPLS. Each of the modulated data output unit 1 (452) and the modulated data output unit 2 (453) has a configuration as shown in FIG. 40.

Figure 52:
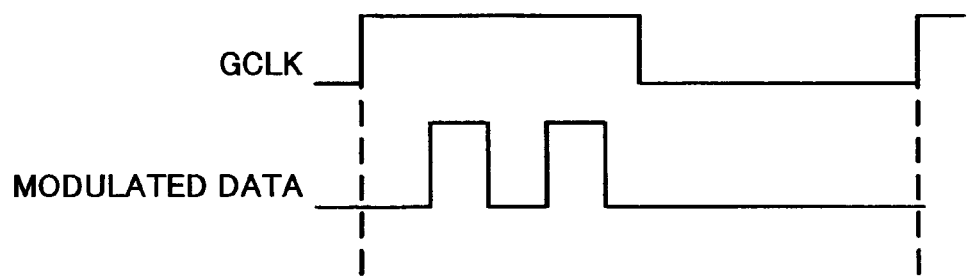
FIGS. 52 is a drawing used to describe exemplary operations of the modulated data output unit 306 shown in FIG. 51.
Figure 53:
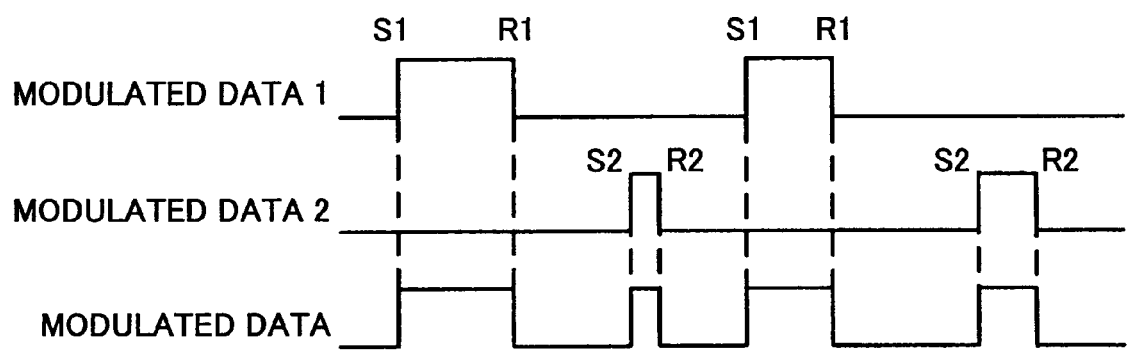
FIGS. 53 is a timing chart of signals in the modulated data output unit 306 shown in FIG. 51.

Arranging two modulated data output units as shown in FIG. 51 makes it possible to output modulated data having two pulses in one GCLK cycle as shown in FIG. 52. FIG. 53 is a timing chart of signals in the modulated data output unit 306 shown in FIG. 51. As shown in FIG. 53, the modulated data WrPLS is obtained by performing an OR operation on the modulated data 1 and the modulated data 2. In FIG. 53, a gate delay by the OR gate 454 is ignored. The phase information WPSqp, the phase information WPRqp, the set pulse WPSpls, and the reset pulse WPRpls are input in such a manner that the pulses of the modulated data 1 and the modulated data 2 are output alternately. This makes it possible to output the modulated data WrPLS having two pulses in one GCLK cycle.

As described above, embodiments of the present invention provide a compact and simple modulated data generating unit that can perform pulse width modulation at high resolution. Also, an image forming apparatus including such a modulated data generating unit makes it possible to form a high quality image based on a pixel clock signal that can accurately correct the errors in scanning speed. Also, embodiments of the present invention provide a pulse width modulation device that can accurately control the pixel clock frequency taking into account the nonlinear errors in scanning speed. An image forming apparatus including such a pulse width modulation device can form a high quality image without causing color shift and without reducing color reproducibility and image resolution.

The present invention may be applied to image forming apparatuses such as a laser printer and a digital copier.

As described above, in a pixel clock generating unit according to an embodiment of the present invention, a pixel clock signal is generated based on highly accurate multi-phase clock signals VCLK0 through VCLK15 and the pixel clock frequency is controlled taking into account the variation in scanning time. Thus, a pixel clock generating unit according to an embodiment of the present invention can generate a pixel clock signal that accurately corrects the errors in average scanning speed. Also, the disclosed pixel clock signal generating unit controls the pixel clock frequency for each reflecting surface of a polygon mirror and is therefore able to generate a pixel clock signal that can accurately correct the errors in scanning speed for each reflecting surface. Also, according to an embodiment of the present invention, the frequency of a pixel clock signal is modulated to correct nonlinear errors in scanning speed and a pulse-width modulated signal is generated based on the pixel clock signal. This, in turn, makes it possible to form a high-quality image. An embodiment of the present invention makes it possible to provide a compact and simple pulse width modulation device that can perform pulse width modulation at high resolution. According to an embodiment of the present invention, since the pixel clock frequency is accurately controlled on the time scale of the phase difference Tv between the multi-phase clock signals VCLK0 through VCLK15, it is not necessary to increase the oscillation frequency of the multi-phase clock signals. This makes it easier to design a pulse width modulation device and makes it possible to reduce its power consumption. Also, most parts of a pixel clock signal generating unit according to an embodiment of the present invention operate based on the internal operation clock signal GCLK obtained by dividing the frequency of one of the multi-phase clock signals VCLK0 through VCLK15. This means that the disclosed pixel clock signal generating unit operates based on a low clock frequency and requires low power.

The present invention is not limited to the specifically disclosed embodiments, and variations and modifications may be made without departing from the scope of the present invention.

The present application is based on Japanese Priority Application No. 2006-059010, filed on Mar. 6, 2006, the entire contents of which are hereby incorporated herein by reference.

What is claimed is:

1. A device for generating a pulse-width modulated signal according to image data and based on a pixel clock signal, comprising:
    a pixel clock generating unit that is configured to generate the pixel clock signal and includes
        a multi-phase clock signal generating unit configured to generate multi-phase clock signals each having a cycle T, wherein a number of the multi-phase clock signals is P and a phase difference between each adjacent pair of the multi-phase clock signals is T/P,
        a comparing unit configured to measure a period of time between a time when a first synchronizing signal is detected and a time when a second synchronizing signal is detected, to compare the measured period of time with a target value, and to output a difference between the measured period of time and the target value,
        a frequency calculation unit configured to calculate a pixel clock frequency setting value based on the difference between the measured period of time and the target value and to generate a frequency specifying signal based on the calculated pixel clock frequency setting value which frequency specifying signal specifies a frequency of the pixel clock signal,
        a counting unit configured to calculate a rise timing and a fall timing of the pixel clock signal by counting a number of time units each corresponding to the phase difference T/P according to the frequency specifying signal, and
        a pixel clock signal output unit configured to generate the pixel clock signal according to the rise timing and the fall timing of the pixel clock signal and based on the multi-phase clock signals; and
    a modulated data generating unit that is configured to generate the pulse-width modulated signal and includes
        a data converting unit configured to convert density data specifying density of a dot in the image data into pulse width data expressed in units of the phase difference T/P according to one of conversion rules predetermined based on the frequency of the pixel clock signal,
        an edge time calculation unit configured to calculate a rise timing and a fall timing of the pulse-width modulated signal according to the pulse width data and the rise timing of the pixel clock signal,
        a set/reset signal generating unit configured to generate a set signal and a set phase signal according to the rise timing of the pulse-width modulated signal and to generate a reset signal and a reset phase signal according to the fall timing of the pulse-width modulated signal, and
        a modulated data output unit configured to delay the set signal according to the set phase signal, to delay the reset signal according to the reset phase signal, and to generate the pulse-width modulated signal according to the delayed set signal and the delayed reset signal and based on the multi-phase clock signals.

2. The device as claimed in claim 1, wherein the modulated data output unit includes
    a first set/reset signal delay unit configured to generate a setting pulse by delaying the set signal according to the set phase signal;
    a second set/reset signal delay unit configured to generate a resetting pulse by delaying the reset signal according to the reset phase signal; and
    a phase detecting unit configured to generate the pulse-width modulated signal based on the setting pulse and the resetting pulse.

3. The device as claimed in claim 2, wherein the phase detecting unit is a set-reset flip-flop.

4. The device as claimed in claim 1, wherein the modulated data output unit includes
    a first modulated data output unit configured to generate a first pulse-width modulated signal according to the set signal, the reset signal, the set phase signal, and the reset phase signal,
    a second modulated data output unit configured to generate a second pulse-width modulated signal according to the set signal, the reset signal, the set phase signal, and the reset phase signal, and
    a pulse-width modulated signal combining unit configured to generate the pulse-width modulated signal based on the first pulse-width modulated signal and the second pulse-width modulated signal; and the first modulated data output unit and the second modulated data output unit generate the first pulse-width modulated signal and the second pulse-width modulated signal alternately.

5. The device as claimed in claim 1, wherein
the image data includes phase data specifying a phase of the dot; and
the edge time calculation unit is configured to calculate the rise timing and the fall timing of the pulse-width modulated signal according to the pulse width data, the phase data, and the rise timing of the pixel clock signal.

6. The device as claimed in claim 1, wherein
the conversion rules of the data converting unit include a rule specifying that when the density data indicate maximum density, the density data are converted into a predetermined target value of the frequency of the pixel clock signal which target value is expressed in units of the phase difference T/P;
the data converting unit is configured to generate a maximum density signal when the density data indicate the maximum density; and
the edge time calculation unit is configured to calculate the rise timing and the fall timing of the pulse-width modulated signal taking into account the maximum density signal.

7. The device as claimed in claim 1, further comprising:
a data correction unit configured to correct the pulse width data according to a difference between a target value of the frequency of the pixel clock signal based on which target value the conversion rules are determined and an actual value of the frequency of the pixel clock signal at a time when the density data are converted by the data converting unit so that the pulse width data correspond to the actual value of the frequency of the pixel clock signal;
wherein the edge time calculation unit is configured to calculate the rise timing and the fall timing of the pulse-width modulated signal according to the pulse width data corrected by the data correction unit.

8. The device as claimed in claim 7, wherein the frequency calculation unit includes
a frequency modulation data generating unit configured to generate frequency modulation data indicating a difference from the pixel clock frequency setting value for each of segments of the period of time between the time when the first synchronizing signal is detected and the time when the second synchronizing signal is detected, and
a frequency modulation unit configured to add the pixel clock frequency setting value and the frequency modulation data and to generate the frequency specifying signal based on a result of the addition; and
the data correction unit is configured to correct the pulse width data according to the frequency modulation data.

9. An image forming apparatus that forms an image by driving a light source with a pulse-width modulated signal and by scanning a target object with a light beam emitted from the light source driven with the pulse-width modulated signal, said image forming apparatus comprising:
a pulse width modulation device that is configured to generate the pulse-width modulated signal according to image data and includes
a multi-phase clock signal generating unit configured to generate multi-phase clock signals each having a cycle T, wherein a number of the multi-phase clock signals is P and a phase difference between each adjacent pair of the multi-phase clock signals is T/P;
a comparing unit configured to measure a period of time between a time when a first synchronizing signal is detected and a time when a second synchronizing signal is detected, to compare the measured period of time with a target value, and to output a difference between the measured period of time and the target value;
a frequency calculation unit configured to calculate a pixel clock frequency setting value based on the difference between the measured period of time and the target value and to generate a frequency specifying signal based on the calculated pixel clock frequency setting value which frequency specifying signal specifies a frequency of a pixel clock signal;
a counting unit configured to calculate a rise timing and a fall timing of the pixel clock signal by counting a number of time units each corresponding to the phase difference T/P according to the frequency specifying signal;
a data converting unit configured to convert density data specifying density of a dot in the image data into pulse width data expressed in units of the phase difference T/P according to one of conversion rules predetermined based on the frequency of the pixel clock signal;
an edge time calculation unit configured to calculate a rise timing and a fall timing of the pulse-width modulated signal according to the pulse width data and the rise timing of the pixel clock signal;
a set/reset signal generating unit configured to generate a set signal and a set phase signal according to the rise timing of the pulse-width modulated signal and to generate a reset signal and a reset phase signal according to the fall timing of the pulse-width modulated signal; and
a modulated data output unit configured to delay the set signal according to the set phase signal, to delay the reset signal according to the reset phase signal, and to generate the pulse-width modulated signal according to the delayed set signal and the delayed reset signal and based on the multi-phase clock signals.

10. The image forming apparatus as claimed in claim 9, wherein the modulated data output unit includes
a first set/reset signal delay unit configured to generate a setting pulse by delaying the set signal according to the set phase signal;
a second set/reset signal delay unit configured to generate a resetting pulse by delaying the reset signal according to the reset phase signal; and
a phase detecting unit configured to generate the pulse-width modulated signal based on the setting pulse and the resetting pulse.

11. The image forming apparatus as claimed in claim 9, wherein the modulated data output unit includes
a first modulated data output unit configured to generate a first pulse-width modulated signal according to the set signal, the reset signal, the set phase signal, and the reset phase signal,
a second modulated data output unit configured to generate a second pulse-width modulated signal according to the set signal, the reset signal, the set phase signal, and the reset phase signal, and
a pulse-width modulated signal combining unit configured to generate the pulse-width modulated signal based on the first pulse-width modulated signal and the second pulse-width modulated signal; and the first modulated data output unit and the second modulated data output unit generate the first pulse-width modulated signal and the second pulse-width modulated signal alternately.

12. An image forming apparatus that forms an image by driving a light source with a pulse-width modulated signal and by scanning a target object with a light beam emitted from the light source driven with the pulse-width modulated signal, said image forming apparatus comprising:

a pulse width modulation device that is configured to generate the pulse-width modulated signal according to image data and includes a multi-phase clock signal generating unit configured to generate multi-phase clock signals each having a cycle T, wherein a number of the multi-phase clock signals is P and a phase difference between each adjacent pair of the multi-phase clock signals is T/P;

a comparing unit configured to measure a period of time between a time when a first synchronizing signal is detected and a time when a second synchronizing signal is detected, to compare the measured period of time with a target value, and to output a difference between the measured period of time and the target value;

a frequency calculation unit configured to calculate a pixel clock frequency setting value based on the difference between the measured period of time and the target value;

a frequency modulation data generating unit configured to generate frequency modulation data indicating a difference from the pixel clock frequency setting value for each of segments of the period of time between the time when the first synchronizing signal is detected and the time when the second synchronizing signal is detected;

a frequency modulation unit configured to add the pixel clock frequency setting value and the frequency modulation data and to generate a frequency specifying signal based on a result of the addition which frequency specifying signal specifies a frequency of a pixel clock signal;

a counting unit configured to calculate a rise timing and a fall timing of the pixel clock signal by counting a number of time units each corresponding to the phase difference T/P according to the frequency specifying signal;

a data converting unit configured to convert density data specifying density of a dot in the image data into pulse width data expressed in units of the phase difference T/P according to one of conversion rules predetermined based on the frequency of the pixel clock signal;

a data correction unit configured to correct the pulse width data according to the frequency modulation data;

an edge time calculation unit configured to calculate a rise timing and a fall timing of the pulse-width modulated signal according to the rise timing of the pixel clock signal and the pulse width data corrected by the data correction unit;

a set/reset signal generating unit configured to generate a set signal and a set phase signal according to the rise timing of the pulse-width modulated signal and to generate a reset signal and a reset phase signal according to the fall timing of the pulse-width modulated signal; and a modulated data output unit configured to delay the set signal according to the set phase signal, to delay the reset signal according to the reset phase signal, and to generate the pulse-width modulated signal according to the delayed set signal and the delayed reset signal and based on the multi-phase clock signals.

13. The image forming apparatus as claimed in claim 12, wherein the modulated data output unit includes a first set/reset signal delay unit configured to generate a setting pulse by delaying the set signal according to the set phase signal;

a second set/reset signal delay unit configured to generate a resetting pulse by delaying the reset signal according to the reset phase signal; and a phase detecting unit configured to generate the pulse-width modulated signal based on the setting pulse and the resetting pulse.

14. The image forming apparatus as claimed in claim 12, wherein the modulated data output unit includes a first modulated data output unit configured to generate a first pulse-width modulated signal according to the set signal, the reset signal, the set phase signal, and the reset phase signal, a second modulated data output unit configured to generate a second pulse-width modulated signal according to the set signal, the reset signal, the set phase signal, and the reset phase signal, and a pulse-width modulated signal combining unit configured to generate the pulse-width modulated signal based on the first pulse-width modulated signal and the second pulse-width modulated signal; and the first modulated data output unit and the second modulated data output unit generate the first pulse-width modulated signal and the second pulse-width modulated signal alternately.

15. The image forming apparatus as claimed in claim 9, wherein the conversion rules of the data converting unit include a rule to correct nonlinearity between the density data and actual density of the dot formed.

* * * * *